(12) United States Patent
Bork

(10) Patent No.: US 9,365,109 B2
(45) Date of Patent: Jun. 14, 2016

(54) CAP WITH ADSORPTION MEDIA

(71) Applicant: Bemis Manufacturing Company, Sheboygan Falls, WI (US)

(72) Inventor: Kevin W. Bork, Germantown, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 189 days.

(21) Appl. No.: 13/840,682

(22) Filed: Mar. 15, 2013

(65) Prior Publication Data

US 2013/0341331 A1    Dec. 26, 2013

Related U.S. Application Data

(60) Provisional application No. 61/690,267, filed on Jun. 22, 2012.

(51) Int. Cl.
*B65D 51/16* (2006.01)
*B60K 15/04* (2006.01)
*B60K 15/035* (2006.01)

(52) U.S. Cl.
CPC ... *B60K 15/0406* (2013.01); *B60K 2015/03514* (2013.01); *B60K 2015/03547* (2013.01)

(58) Field of Classification Search
CPC ........... B60K 2015/03514; B60K 2015/03547; B60K 15/0406
USPC ........... 220/371, 373, 374, DIG. 32, DIG. 33, 220/303, 304
See application file for complete search history.

(56) References Cited

U.S. PATENT DOCUMENTS

| | | |
|---|---|---|
| 1,841,691 A | 1/1932 | Wilson |
| 2,220,328 A | 11/1940 | Grothe |
| 2,314,330 A | 3/1943 | Eshbaugh et al. |
| 2,496,883 A | 2/1950 | McKalip |
| 2,603,308 A | 7/1952 | McCall |
| 2,675,093 A | 4/1954 | McCall et al. |
| 3,172,348 A | 3/1965 | Berg |
| 3,546,853 A | 12/1970 | Claar |
| 4,028,075 A | 6/1977 | Roberge |
| 4,058,380 A | 11/1977 | King, II |
| 4,312,649 A | 1/1982 | Fujii et al. |
| 4,450,823 A | 5/1984 | Abe et al. |
| 4,598,686 A | 7/1986 | Lupoli et al. |
| 4,732,588 A | 3/1988 | Covert et al. |
| 4,829,968 A | 5/1989 | Onufer |

(Continued)

FOREIGN PATENT DOCUMENTS

| | | |
|---|---|---|
| DE | 4124653 | 1/1993 |
| GB | 1394015 | 5/1975 |

(Continued)

*Primary Examiner* — Fenn Mathew
*Assistant Examiner* — James N Smalley
(74) *Attorney, Agent, or Firm* — Reinhart Boerner Van Deuren s.c

(57) ABSTRACT

A fuel cap configured to be coupled with the opening of a fuel tank defining an interior for containing a volume of fuel. An inlet opening is configured to establish fluid communication with the fuel tank interior. An exit is in communication with a surrounding atmosphere, exterior to the fuel cap. A flow path is defined from the inlet opening to the exit. Adsorption media substantially fills the flow path and is configured to reduce the emission of VOC vapors through the exit to the surrounding atmosphere. The flow path extends spirally about an axis of the fuel cap from the inlet opening to the exit.

23 Claims, 68 Drawing Sheets

(56) References Cited

U.S. PATENT DOCUMENTS

| | | | |
|---|---|---|---|
| 4,846,135 A | | 7/1989 | Tiphaine |
| 4,884,716 A | * | 12/1989 | Steiner ................... 220/202 |
| 4,971,219 A | * | 11/1990 | Dombeck et al. ......... 220/303 |
| 5,033,517 A | | 7/1991 | Bucci |
| 5,042,678 A | | 8/1991 | Munguia |
| 5,085,266 A | | 2/1992 | Arold et al. |
| 5,272,873 A | | 12/1993 | Hamazaki |
| 5,388,611 A | | 2/1995 | Harris |
| 5,408,976 A | | 4/1995 | Reddy |
| 5,501,198 A | | 3/1996 | Koyama |
| 5,501,723 A | | 3/1996 | Andress et al. |
| 5,560,347 A | | 10/1996 | Reddy et al. |
| 5,592,922 A | | 1/1997 | Denz |
| 5,603,349 A | | 2/1997 | Harris |
| 5,632,251 A | | 5/1997 | Ishakawa |
| 5,632,808 A | | 5/1997 | Hara et al. |
| 5,641,344 A | | 6/1997 | Takahashi et al. |
| 5,649,639 A | | 7/1997 | Dolvet et al. |
| 5,653,211 A | | 8/1997 | Ishikawa |
| 5,743,943 A | | 4/1998 | Maeda et al. |
| 5,762,692 A | | 6/1998 | Dumas et al. |
| 5,875,765 A | | 3/1999 | Norton |
| 5,915,364 A | | 6/1999 | Katou et al. |
| 5,964,204 A | | 10/1999 | Freeland |
| 6,047,687 A | | 4/2000 | Ishikawa et al. |
| 6,098,601 A | | 8/2000 | Reddy |
| 6,182,693 B1 | | 2/2001 | Stack et al. |
| 6,230,693 B1 | | 5/2001 | Meiller et al. |
| 6,279,548 B1 | | 8/2001 | Reddy |
| 6,305,161 B1 | | 10/2001 | Takanohashi et al. |
| 6,446,826 B1 | | 9/2002 | Foltz et al. |
| 6,447,565 B1 | * | 9/2002 | Raszkowski et al. ....... 55/385.4 |
| 6,460,516 B2 | | 10/2002 | Kimoto et al. |
| 6,488,748 B2 | | 12/2002 | Yamafuji et al. |
| 6,579,342 B2 | | 6/2003 | Wang et al. |
| 6,769,415 B2 | | 8/2004 | Reddy et al. |
| 6,773,491 B1 | | 8/2004 | Bohl |
| 6,899,741 B2 | | 5/2005 | Nakamura et al. |
| 6,955,159 B2 | | 10/2005 | Ogawa |
| 7,008,470 B2 | | 3/2006 | Makino et al. |
| 7,021,296 B2 | | 4/2006 | Reddy |
| 7,048,140 B1 | * | 5/2006 | Caldwell .................. 220/371 |
| 7,261,093 B2 | | 8/2007 | Groom et al. |
| 7,309,381 B2 | | 12/2007 | Yamazaki et al. |
| 7,320,314 B2 | | 1/2008 | Kashima et al. |
| 7,325,577 B2 | | 2/2008 | Devall |
| 7,377,294 B2 | | 5/2008 | Handa |
| 7,383,824 B2 | | 6/2008 | Byers et al. |
| 7,395,816 B2 | | 7/2008 | Loevenbruck |
| 7,409,946 B2 | | 8/2008 | King |
| 7,472,694 B2 | | 1/2009 | King |
| 7,484,500 B2 | | 2/2009 | Terada |
| 7,493,894 B2 | | 2/2009 | Davis et al. |
| 7,507,278 B2 | | 3/2009 | Makino et al. |
| 7,677,226 B2 | | 3/2010 | Buelow et al. |
| 7,677,277 B2 | | 3/2010 | Thompson et al. |
| 7,681,557 B2 | | 3/2010 | Kim |
| 7,681,604 B2 | | 3/2010 | Handa |
| 7,743,797 B2 | | 6/2010 | Handa |
| 7,823,611 B2 | | 11/2010 | Iwami et al. |
| 7,906,078 B2 | | 3/2011 | Seki |
| 2003/0234254 A1 | * | 12/2003 | Grybush et al. ......... 220/366.1 |
| 2004/0094554 A1 | | 5/2004 | Grybush et al. |
| 2007/0108212 A1 | * | 5/2007 | Nelson ..................... 220/371 |
| 2007/0175514 A1 | | 8/2007 | Tharp et al. |
| 2012/0031824 A1 | | 2/2012 | Braunheim et al. |
| 2013/0001229 A1 | * | 1/2013 | Wang et al. ............... 220/373 |

FOREIGN PATENT DOCUMENTS

| | | |
|---|---|---|
| JP | 55149469 | 11/1980 |
| JP | 59145355 | 8/1984 |

* cited by examiner

CAP WITH ADSORPTION MEDIA

CROSS-REFERENCE TO RELATED APPLICATIONS

The present application claims priority to U.S. Provisional Patent Application No. 61/690,267, filed on Jun. 22, 2012, the entire contents of which are incorporated by reference herein.

FIELD

The present invention relates to closure devices for containers and, more particularly, to a fuel cap with adsorption media.

SUMMARY

As concern for the environment increases, regulations governing the prevention of the escape of vapors of volatile organic compounds ("VOC's") to the atmosphere are being promulgated by many governmental agencies. One source of VOC vapor emission is the fuel systems including the fuel tanks of automobiles and other engine-powered vehicles and devices using gasoline or other hydrocarbon fuels of high volatility.

Proposed new emissions regulations for small off-road engines, including those found in all-terrain vehicles, snowmobiles, personal watercraft and other recreational vehicles, lawn tractors and lawn mowers, and utility devices (e.g., string trimmers, chainsaws and other engine-powered cutting devices, blowers, pressure washers, pumps, and electrical generators) have necessitated development of methods of containing VOC vapor emissions from these small engines.

With current fuel system and fuel tank designs, VOC vapors can escape the fuel tank during filling and potentially be vented during use. Vapors may also escape the fuel tank through the tank wall. Carbon canisters have been used to contain VOC vapors from automotive fuel tanks. However, the engines utilized by small off-road vehicles, such as lawn tractors and lawn mowers, and utility devices are typically mounted in confined locations, such as integrated engine covers, and thereby any emissions components must be compact and relatively inexpensive in order for them to be compatible with current small engine applications. For example, when containing VOC vapor emissions in a gas-powered lawnmower or string trimmer, the engine fuel delivery components, storage components, and emissions components must be provided for in a compact and efficient array in order to meet both packaging and cost requirements for these applications.

The present invention generally provides fuel tank assemblies and components, which may reduce or prevent VOC vapor emissions and which may substantially meet the above packaging and cost requirements. In some independent aspects, a component of the fuel tank assembly, such as a fuel cap, a remote vent, etc., may include adsorption media to substantially contain VOC vapor emissions in the fuel tank.

More particularly, in an independent aspect, a fuel tank assembly generally has adsorption media integrated or included with a closure component or fuel cap structure of the fuel tank assembly. In some constructions, the fuel cap structure defines a flow path between the interior and exterior of the fuel tank to which it is coupled. In a first direction of the flow path, vapor including VOC vapor emissions are routed through the adsorption media to remove the VOC vapor before the "scrubbed" vapor is discharged outside of the fuel tank. The adsorption media traps hydrocarbons and other environmentally-harmful components comprising the VOC vapor emissions as the vapor emissions pass through the adsorption media. After a required percentage of hydrocarbons and other harmful components are removed, the "scrubbed" vapor or air is discharged outside the fuel tank.

In a second direction of the flow path opposite to the first direction, "clean" air from the exterior of the fuel tank moves to the interior of the fuel tank under action of a pressure differential (i.e., when the fuel level in the tank decreases). As the clean exterior air passes through the adsorption media, the trapped hydrocarbons and/or other harmful components may be desorbed from the adsorption media in a self-cleansing process. This cleansing process delays or prevents "saturation" of the adsorption media thereby increasing the adsorption media's ability to adsorb additional VOC vapor emissions and extending the useful life of the adsorption media. In some constructions of the closure component or fuel cap incorporating the adsorption media, forced convection may be used to establish a flow through the adsorption media to more effectively desorb the trapped hydrocarbons and/or other harmful components from the adsorption media.

In another independent aspect, a closure for a container, such as a gas cap for a fuel tank, may generally include a body connectable to the container, a canister assembly supported by the body, and adsorption media housed in the canister assembly. The canister assembly defines a flow path through the adsorption media, and the flow path extends at least 300 degrees about an axis of the cap. Vapor including VOC vapor emissions from the container is routed along the path through the adsorption media.

In some constructions, the path extends about 320 degrees about the axis. In other constructions, the path extends at least 360 degrees about the axis. In some constructions, the path extends over 540 degrees about the axis. In some constructions, the path may proceed in one direction about the axis. In other constructions, the path may reverse direction.

In yet another independent aspect, a closure for a container, such as a gas cap for a fuel tank, may generally include a body connectable to the container, a canister assembly supported by the body, and adsorption media housed in the canister assembly. The canister assembly may include a canister portion and a cover portion cooperating to define a volume, the adsorption media filling a substantial portion of the volume. The canister portion may include an outer wall and an interior wall cooperating to define a flow path through the adsorption media, and the interior wall may extend at least 300 degrees about an axis of the cap. Vapor including VOC vapor emissions from the container is routed along the path through the adsorption media.

In some constructions, the interior wall extends about 320 degrees about the axis. In other constructions, the interior wall extends at least 360 degrees about the axis. In some constructions, the interior wall extends over 540 degrees about the axis.

In some constructions, an entry to the path may be defined by an end of the interior wall and an intermediate portion of the interior wall. In some constructions, the canister portion may include an additional interior wall projecting into the path to direct flow in one of a radial and an axial direction.

In a further independent aspect, a closure for a container, such as a gas cap for a fuel tank, may generally include a body connectable to the container, a canister assembly supported by the body, a separator membrane, and adsorption media housed in the canister assembly. The canister assembly may include a canister portion and a cover portion cooperating to define a volume. The canister portion defines an inlet opening. The separator membrane extends across the inlet opening and divides the volume into an inlet chamber and a media chamber. The adsorption media substantially fills the media chamber. Vapor including VOC vapor emissions from the container is routed through the inlet opening, through the separator membrane and through the adsorption media.

Other independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, the terms "connected" and "coupled" are not restricted to physical or mechanical connections or couplings.

FIGS. 1-10 illustrate a cap 10 which is releasably attachable to a container C, such as a fuel tank, to sealingly enclose the contents of the container C (e.g., liquid fuel). In some constructions, the container C is a fuel tank mounted in or on a vehicle or a piece of power equipment or a stand-alone fuel tank. However, the cap 10 may be used as illustrated or in a modified form in conjunction with virtually any container, regardless of the container configuration or desired contents, to manage (e.g., control, limit, prevent, etc.) discharge of volatile organic compounds ("VOC's") from the container C.

Figure 1:
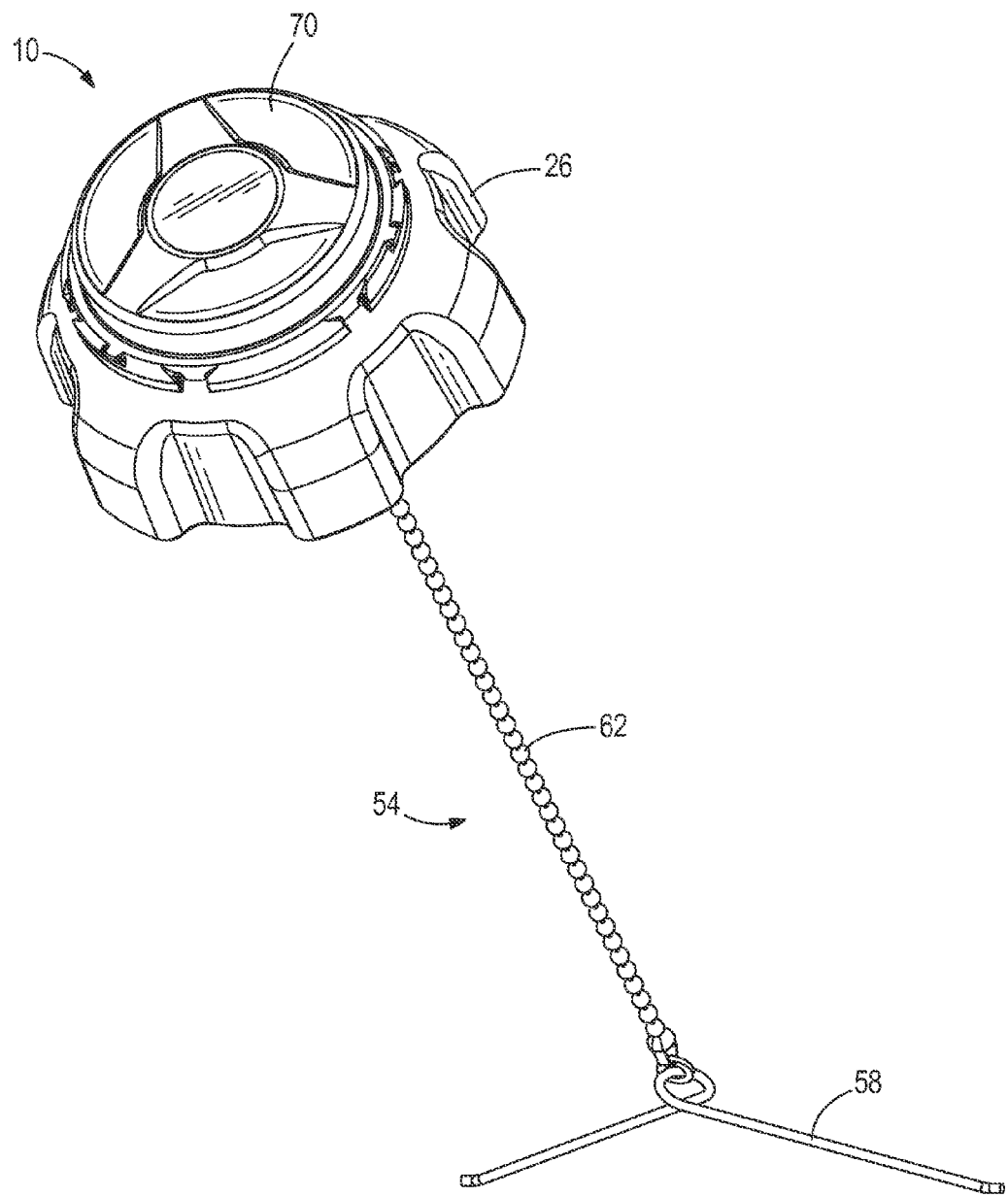
FIG. 1 is a perspective view of a cap for a container, such as a fuel tank.
Figure 2:
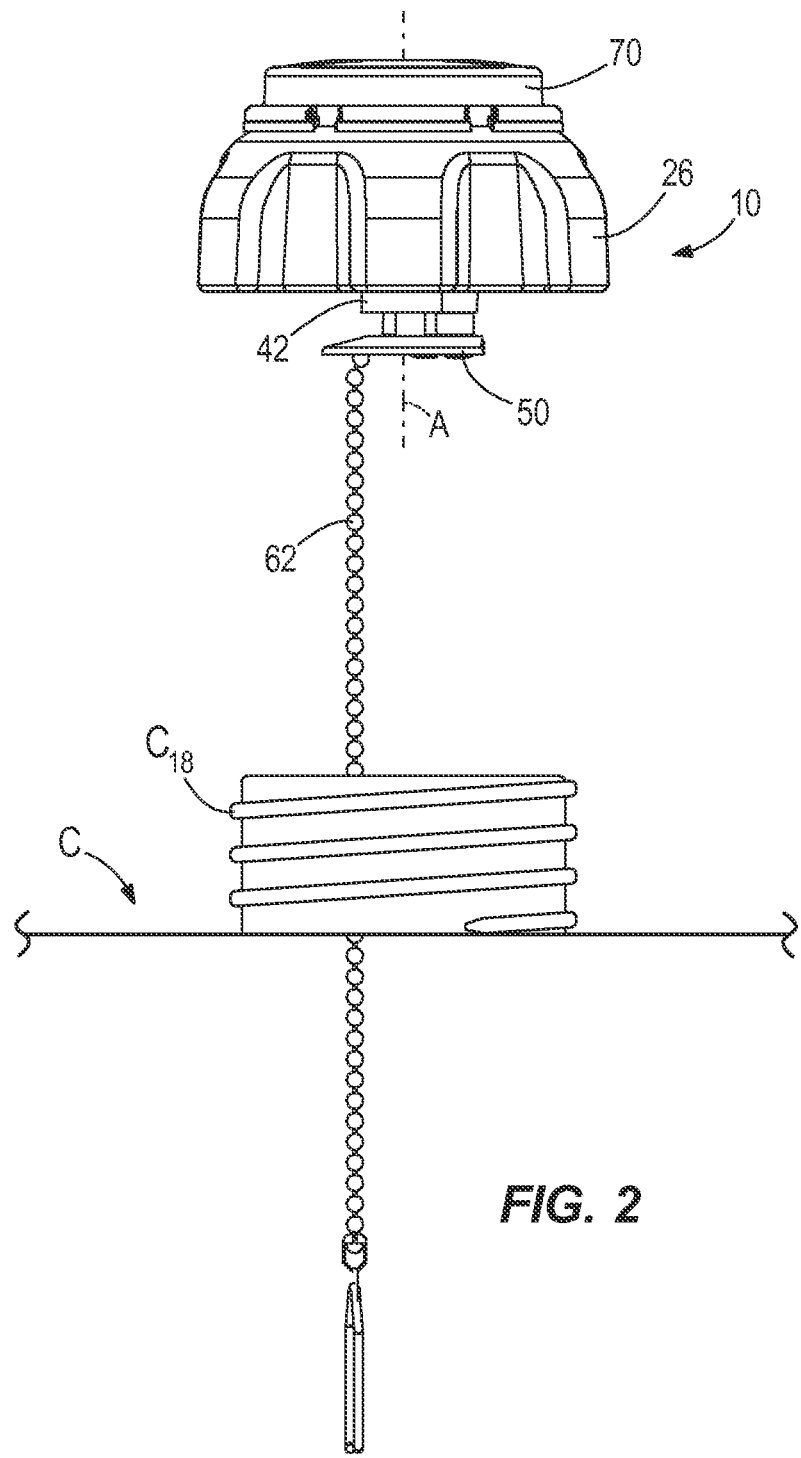
FIG. 2 is a side view of the cap shown in FIG. 1.
Figure 3:
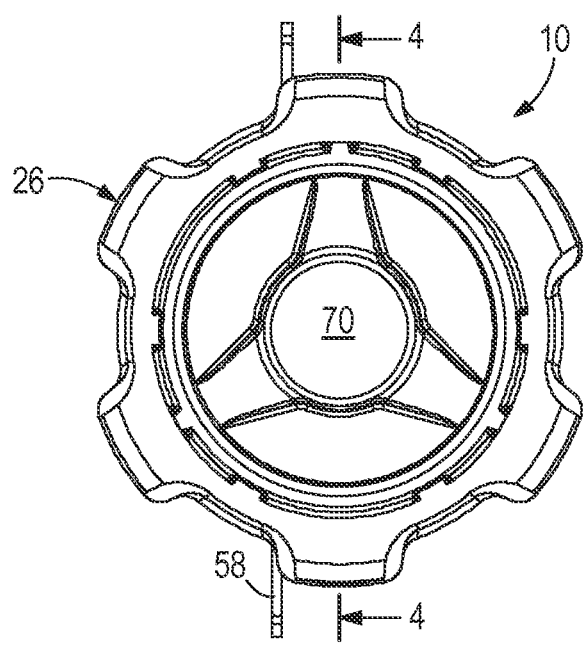
FIG. 3 is a top view of the cap shown in FIG. 1.
Figure 4:
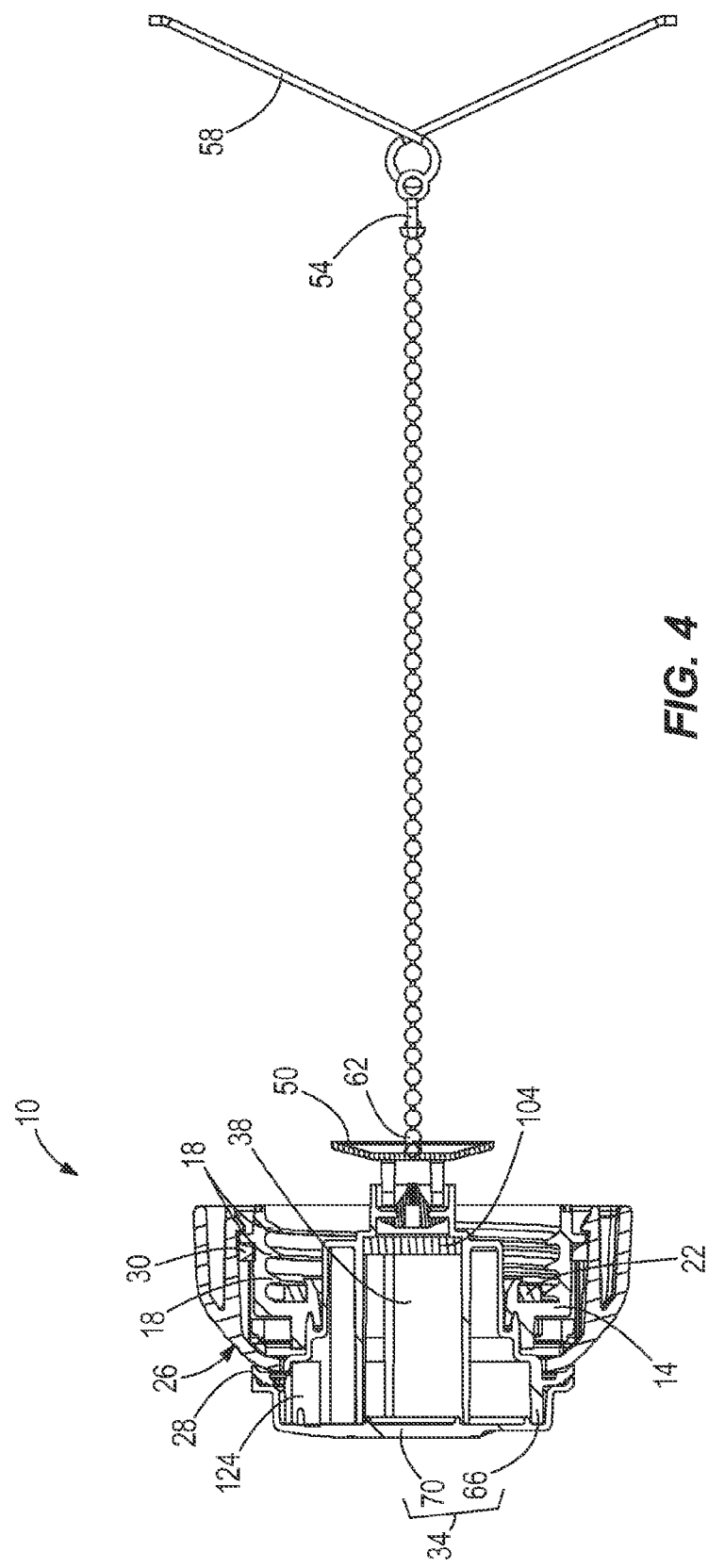
FIG. 4 is a cross-section view of the cap, taken generally along line 4-4 in FIG. 3.
Figure 5:
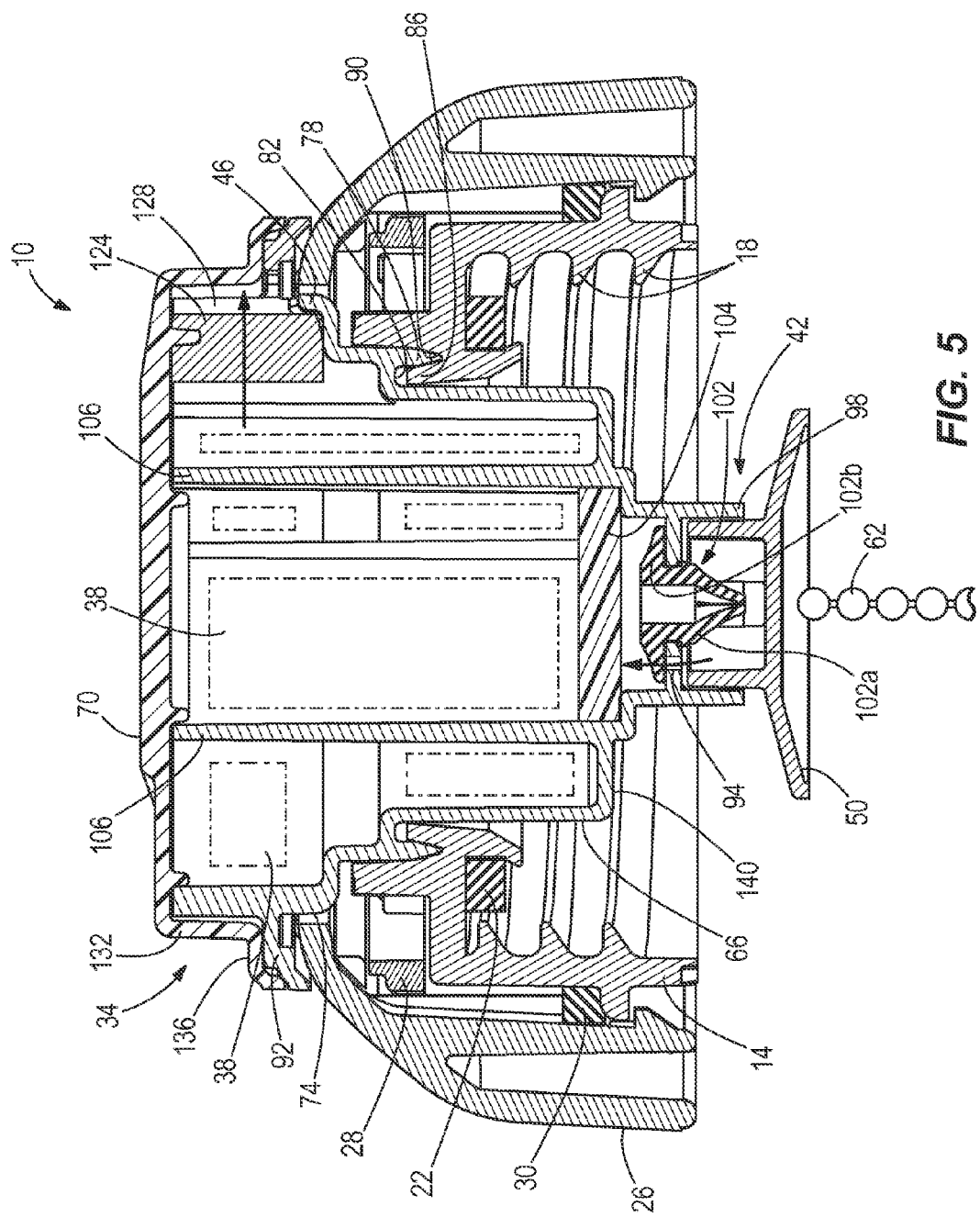
FIG. 5 is detail cross-section view of a portion of the cap as shown in FIG. 4.
Figure 6:
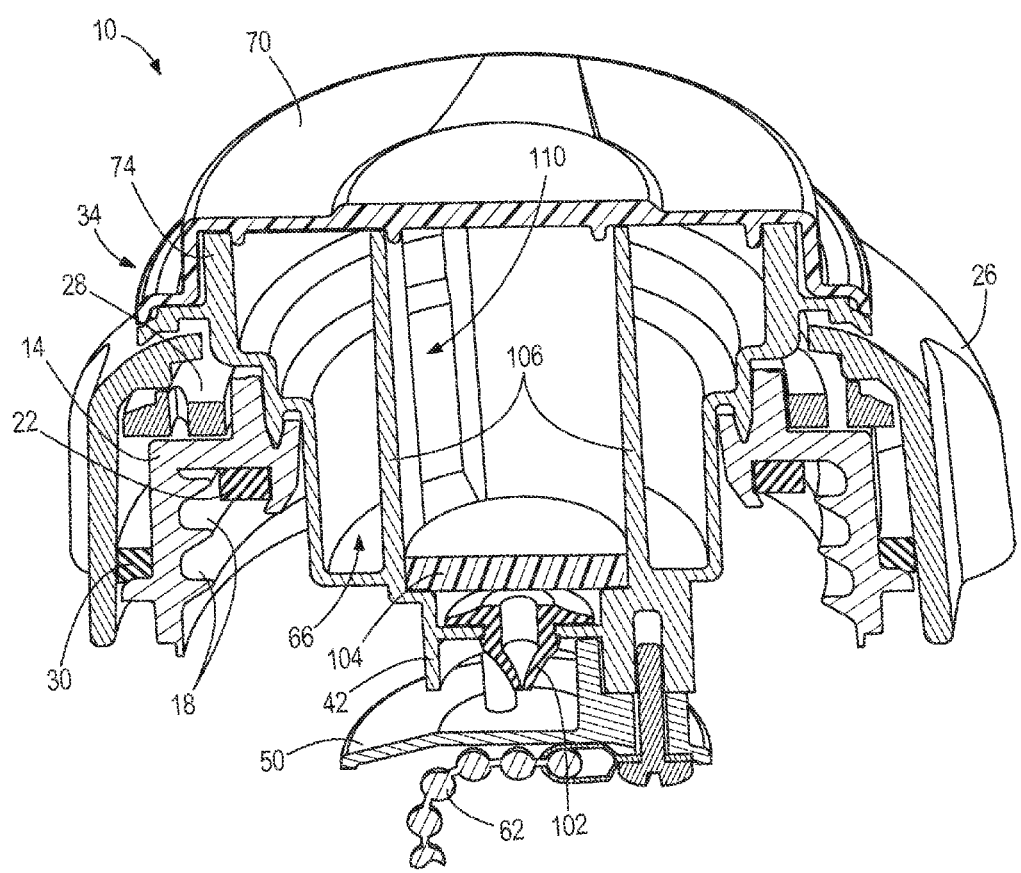
FIG. 6 is a cross-sectional perspective view of the cap as shown in FIG. 4.
Figure 7:
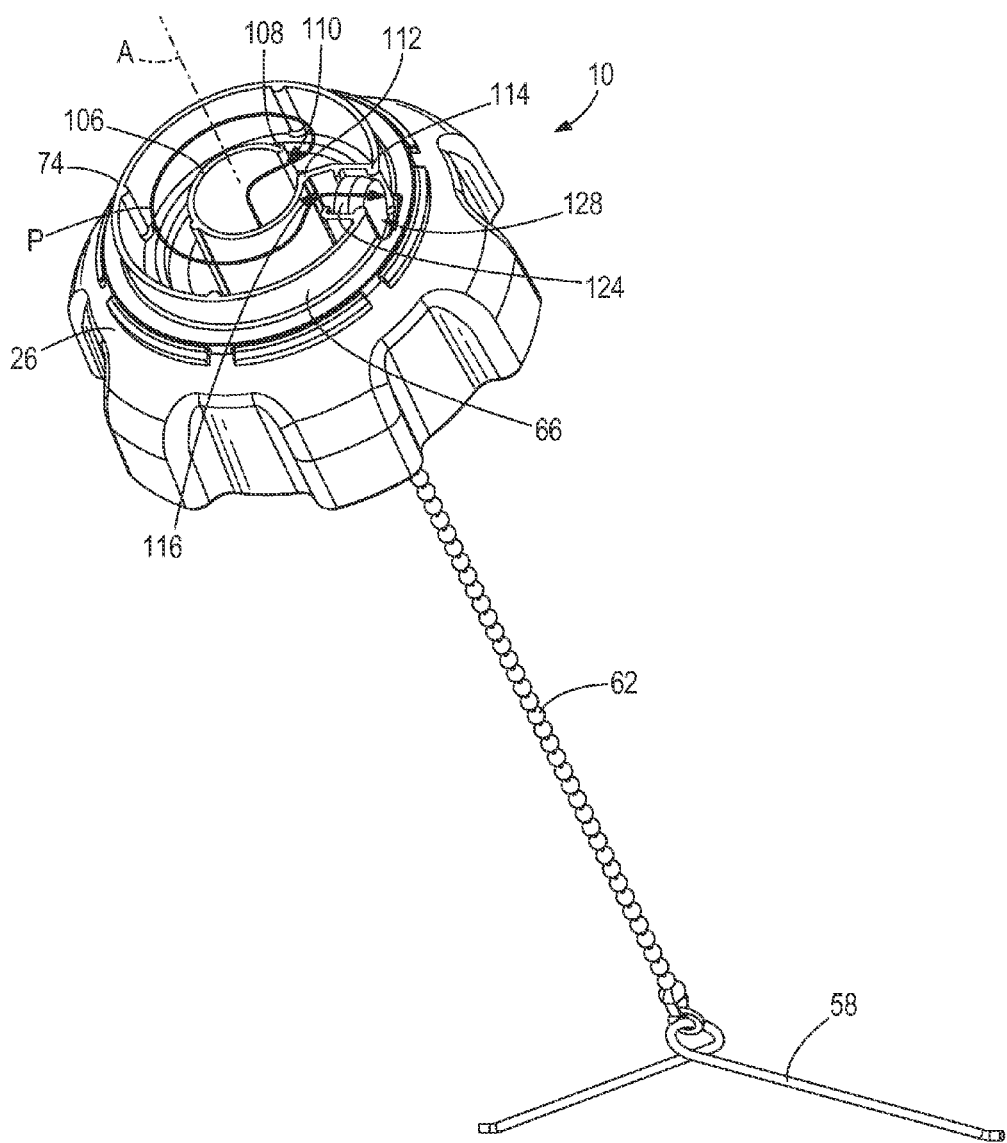
FIG. 7 is a perspective view of the cap shown in FIG. 1 with the cover portion removed.
Figure 8:
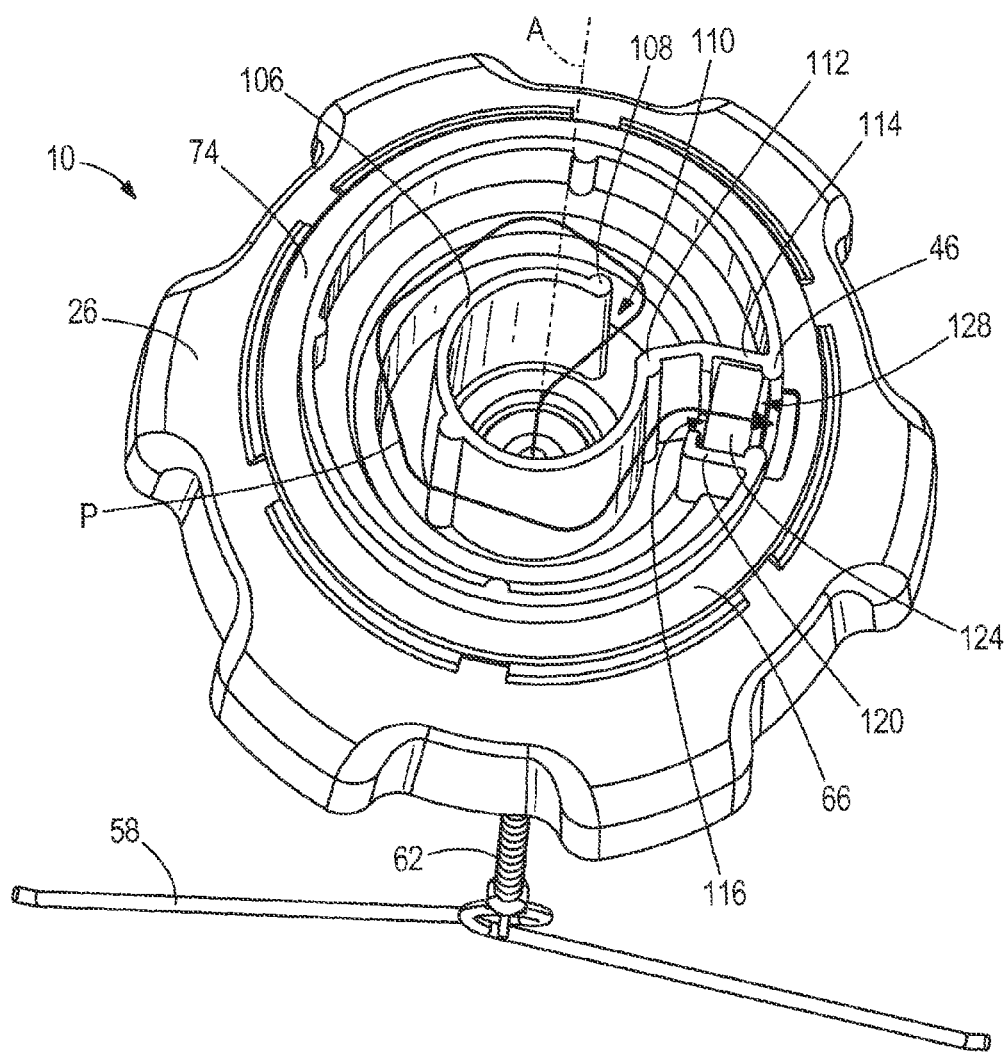
FIG. 8 is another perspective view of the portion of the cap shown in FIG. 8.
Figure 9:
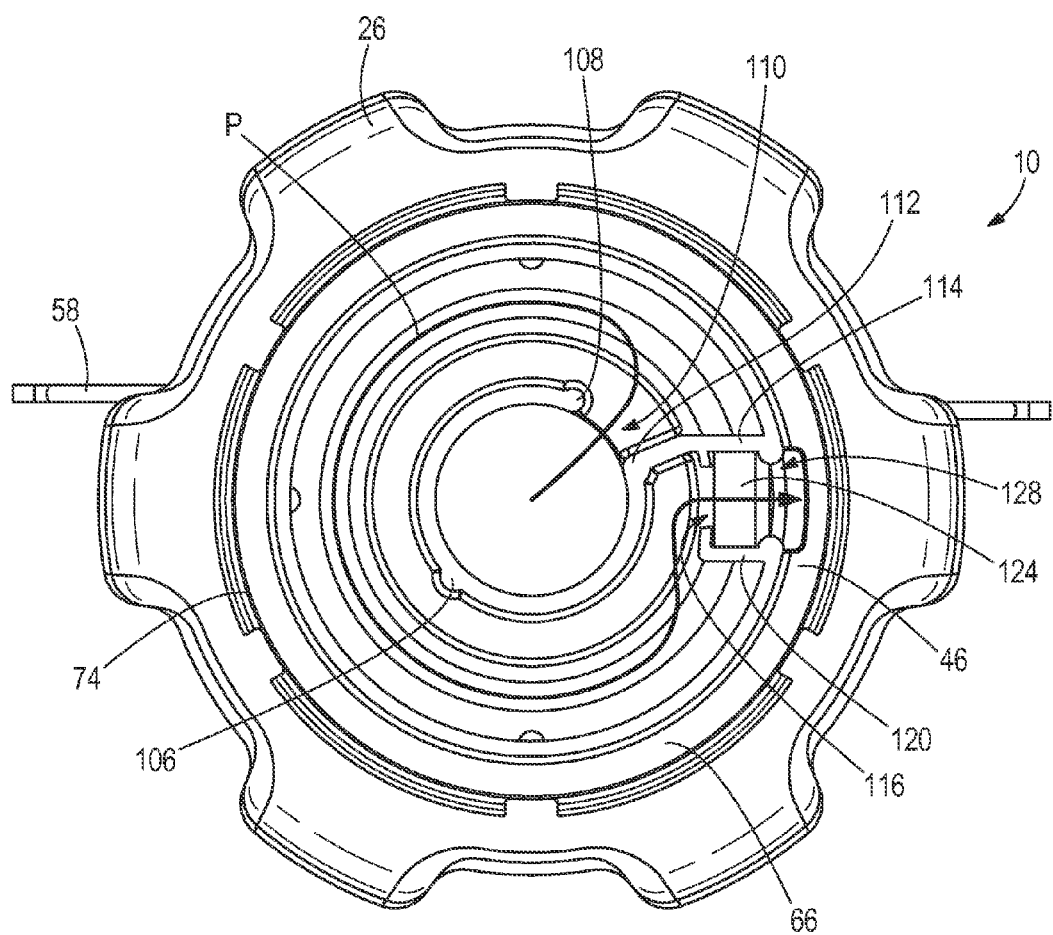
FIG. 9 is a top view of the portion of the cap shown in FIG. 8.
Figure 10:
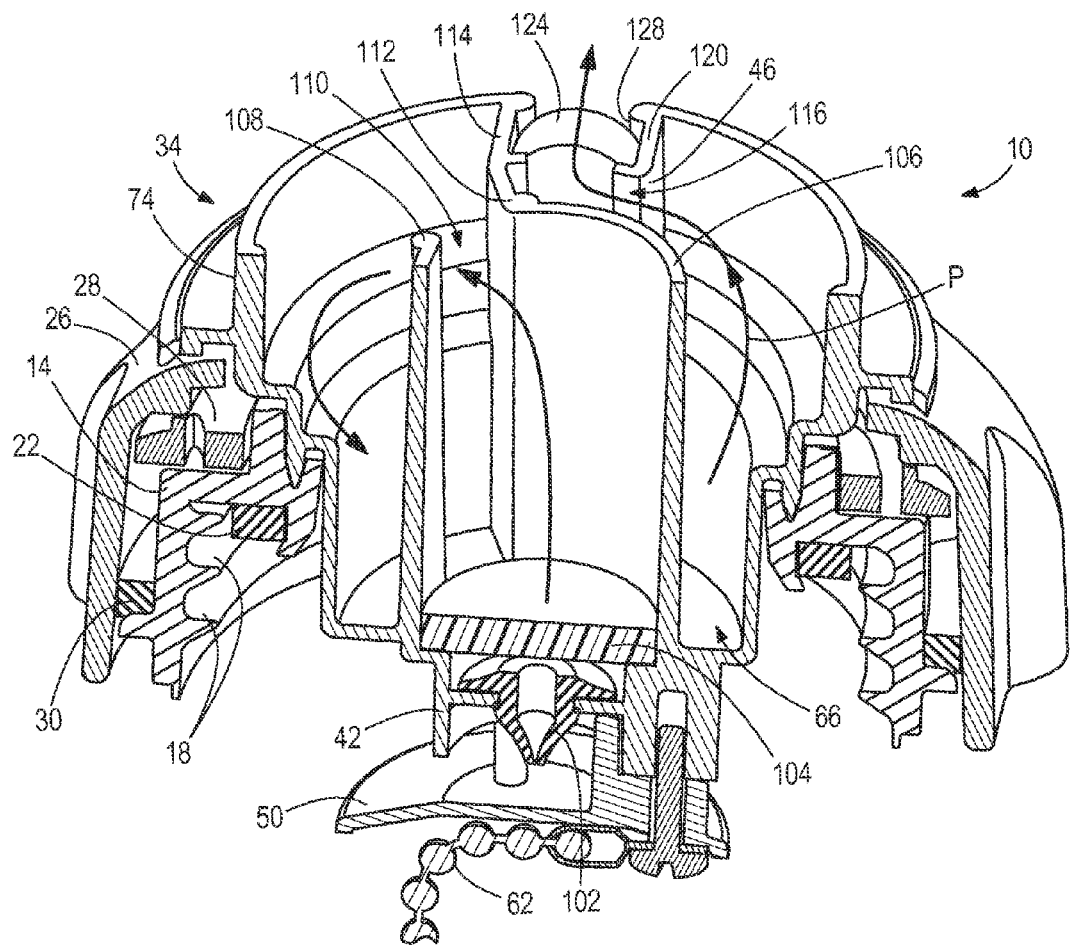
FIG. 10 is a cross-sectional perspective view of the cap as shown in FIG. 10.

The cap 10 includes a body 14 with an attachment structure for engaging the container C. In the illustrated construction, the attachment structure includes internal or female threads 18 centered about an axis A (e.g., central axis) of the cap 10 and configured to engage external or male threads $C_{18}$ on a coaxial opening of the container C (FIG. 2). The cap 10 further includes a seal ring 22 adjacent the threads 18 configured to sealingly engage with the opening of the container C when the cap 10 is threadably engaged.

An outer cover 26 is provided over the body 14 and provides an external surface by which a user may grasp and rotate the cap 10 to install and remove the cap 10 from the container C. In the illustrated construction, installation and removal torque applied to the outer cover 26 is not transmitted directly to the body 16. Rather, torque from the outer cover 26 may be transmitted to the body 14 through a ratchet arrangement (partially shown) including a ratcheting pawl 28 engaging ratchet teeth or fingers (not shown) to limit torque applied to the body 14 in the cap-installation direction. A dust seal 30 is provided between the outer cover 26 and the body 14.

As discussed below in more detail, the cap 10 also includes a canister assembly 34 connected to the body 14 and housing adsorption media 38 (schematically illustrated), such as carbon. As discussed below, the adsorption media 38 substantially fills the open volume of the canister assembly 34 and may be comprised of any material capable of adsorbing VOC vapor emissions (e.g., activated carbon, wood charcoal, coal charcoal, coconut husk, etc.). The adsorption media 38 can fill a volume, including a space positioned along the axis A. The canister assembly 34 has an inlet portion 42 in communication with an interior of the container and an outlet portion 46 in communication with an exterior of the container C (e.g., with the surrounding atmosphere). A deflector 50 is connected to the canister assembly 34 and covers at least a portion of the inlet portion 42.

In the illustrated construction, the cap 10 includes a tether assembly 54 to retain the cap 10 in proximity to the container C when removed. The tether assembly 54 includes a catch or barb portion, such as a wire-form lanyard 58, and a connector portion, such as a beaded chain 62, connected between the lanyard 58 and the deflector 50. In other constructions (not shown), the tether assembly 54 may be connected to another portion of the canister assembly 34 or to the body 14.

The illustrated canister assembly 34 includes a canister portion 66 and a cover portion 70. The canister portion 66 includes an outer wall 74 cooperating with the cover portion 70 to define a volume of the canister assembly 34. In the illustrated construction, the canister assembly 34 is formed separately from and connected to the body 14. The canister assembly 34 includes (on the outer wall 74 of the canister portion 66) an annular ridge 78 defining a groove 82, and the ridge 78 and groove 82 inter-engage with a corresponding ridge 86 and groove 90 on the body 14. The canister assembly 34 is sealingly and permanently connected to body 14 by any of a number of processes (e.g., welding, heat sealing, bonding, press-fitting, snap-fitting, etc.).

In other constructions (not shown), the canister assembly 34 may be releasably connected to the body 14 to allow removal and replacement of the canister assembly 34 in the body 14. For example, ¼-turn locking structure may allow the canister portion 34 to be releasably coupled to the body 14. In yet other constructions (not shown), the canister assembly 34 or a portion of the canister assembly 34 (e.g., the canister portion 66) may be formed integrally with the body 14.

The canister assembly 34 also includes (on the outer wall 74 of the canister portion 66) a generally radially-projecting wall 92. The wall 92 covers the interface between the canister assembly 34 and the relatively-rotatable outer cover 26 to inhibit contamination while allowing air flow through this area.

In the illustrated construction, the canister portion 66 is generally cylindrically-shaped (as a stepped cylinder). An inlet opening 94 is provided in the inlet portion 42 and communicates with the interior of the container C. The deflector 50 extends across the inlet opening 94 to deflect the contents of the container C (e.g., liquid fuel) away from the inlet opening 94, for example, when splashing. An annular wall 98 extends around the inlet opening 94 and may further inhibit liquid fuel from entering the inlet opening 94.

A valve member 102 selectively closes the inlet opening 94. The inlet portion 42 projects from a bottom wall 140 of the canister portion 66, and the inlet opening 94 and the valve member 102 are positioned in the projected portion 42.

In the illustrated construction, the valve member 102 is a combination duckbill/umbrella valve member. The duckbill portion 102a allows flow into the container through the valve member 102 when there is a negative pressure in the container C while preventing backflow. The umbrella portion 102b allows flow from the container C past the valve member 102 when a positive pressure differential (i.e., pressure in the container C greater than atmospheric pressure within the canister assembly 34) exceeds a threshold. The umbrella portion 102b closes the inlet opening 94 below the threshold pressure differential. A porous member 104 (e.g., felt, foam, etc.) is positioned over the valve member 102 to provide a space for operation of the valve member 102 without interference from the adsorption media 38. The arrangement of the deflector 50, the annular wall 98, the valve member 102 and/or the porous member 104 is configured to substantially prevent liquid fuel from entering the canister assembly 34 and thereby saturating any portion of the adsorption media 38.

The canister portion 66 also includes an interior wall 106 cooperating with the outer wall 74 to define a path P for vapor through the adsorption media 38 to an exit 116. The interior wall 106 defines a cylindrical area positioned along the axis A and forming an initial axial portion of the path P. The interior wall 106 has a first end 108, which is a free end, cooperating with an intermediate portion 112 of the interior wall 106 to define an entry 110 from the initial axial portion of the path P to the spiral portion. The entry 110 communicates with the inlet opening 94 via the initial axial portion.

The interior wall 106 has a second end 114 opposite the first end 108 at and partially defining an exit 116 from the path P. An exit wall 120 cooperates with the second end 114 of the interior wall 106 to define the exit 116. Although the interior wall 106 is continuous and extends between the first and second ends 108, 114, the first and second ends 108, 114 are spaced apart from each other and are positioned at different distances from the axis A. The path P, as defined at least in part by the continuous interior wall 106, provides a single, predetermined path for VOC vapors passing into the canister assembly 34 through the valve 102 to reach the outside atmosphere via the exit 116. In other words, all vapors passing through the exit 116 will have traveled along the same directional route through the canister assembly 34.

The path P extends at least 300 degrees and, in the illustrated construction about 320 degrees around the axis A and spirals (i.e., extends helically) upwardly between the inlet opening 94 and the exit 116, "upward" being defined in the direction from an interior end of the cap 10 toward an exterior end. Vapor (including VOC vapor emissions) exiting the container C is directed along the path P through the adsorption media 38, and the adsorption media 38 adsorbs the VOCs from the vapor. As illustrated, the inlet opening 94 and the entry 110 are positioned closer to the axis A than the exit 116.

A porous member 124 (e.g., felt, foam, etc.) is positioned at the exit 116 to retain adsorption media 38 in the canister assembly 34, and the adsorption media 38 substantially fills the volume between the felt member 104 and the foam member 124. The exit 116 of the path P communicates with an outlet opening 128 of the outlet portion 46. The illustrated outlet opening 128 is defined through the side of the outer wall 74 and communicates with the exterior of the container C. Vapor "scrubbed" of VOCs exits the outlet opening 128 and, in the illustrated construction, is discharged to the exterior of the container C in the area between the outer surface of the body 14 and the inner surface of the outer cover 26.

In the illustrated construction, the cover portion 70 is sealingly and permanently connected to the upper edge of the outer wall 74 of the canister portion 66 by any of a number of processes (e.g., welding, heat sealing, bonding, press-fitting, snap-fitting, etc.). The cover portion 70 includes an annular rim 132 which surrounds a portion of the outer wall 74. A generally radially-projecting wall 136 covers and is connected to the wall 92 of on the canister portion 66.

The interior wall 106 extends the full height from a bottom wall 140 to the cover portion 70 and is sealingly connected at its upper edge to the cover portion 70 (e.g., by the same process) such that the only passage through the canister assembly 34 is along the path P. Prior to connecting the cover portion 70, components housed in the canister assembly 34 (e.g., the felt member 104, the adsorption media 38 and the foam member 124) are installed. The adsorption media 38 substantially fills the volume of the canister assembly 34 between the porous members 106, 124.

In other constructions (not shown), the cover portion 70 may be movable or removable to open the canister assembly 34 to facilitate replacement or repair of components (e.g., adsorption media 38, porous members 106, 124, etc.).

The structure of the cap 10 defines a flow path between the interior and exterior of the container C when the cap 10 is coupled to the container C. As shown in FIGS. 7-10, the flow path P is indicated by arrows. Beginning from the interior of the container C, air with VOC vapor emissions may enter the canister assembly 34 through the inlet opening 94 when the pressure differential opens the umbrella valve 102*b*.

Once the air with VOC vapor emissions has passed through the inlet opening 94, the air with VOC vapor emissions passes through the porous member (felt member 104) and along the initial axial portion of the path P, through the entry 110, and along the spiral portion of the path P to the exit 116, all the while being made to pass through the adsorption media 38. As the air with VOC vapor emissions passes through the adsorption media 38, the adsorption media 38 chemically attaches to or traps the hydrocarbons and other environmentally-harmful components comprising the VOC vapor emissions. Upon reaching the exit 116 of the adsorption media 38, hydrocarbons and other harmful components are substantially removed, resulting in "scrubbed" vapor or air.

The scrubbed air passes through the porous member (the foam member 124) and is then allowed to exit the canister assembly 34 through the outlet opening 128 and the between the outer surface of the body 14 and the inner surface of the outer cover 26. In other constructions (not shown), a conduit (not shown) may be fluidly connected with the outlet opening 128 to receive the scrubbed air and route the scrubbed air to the engine for combustion.

A difference in pressure between the interior and exterior of the container C is the driving force behind the movement of the air with VOC vapor emissions. The pressure in the interior of the container C may become greater than the pressure acting against the exterior of the container C, which is usually atmospheric pressure. This is often the result of heating of the liquid fuel in the container C, which causes evaporation of the liquid fuel to produce the VOC vapor emissions and to cause an increase in pressure in the container C. If a path is available or becomes available to "vent" this built-up pressure, natural convection currents may develop in an attempt to equalize the difference. As a result, the VOC vapor emissions would typically be carried to a location of lesser pressure (e.g., outside the container) than the interior of the container C.

In a first direction of the flow path (indicated by arrows in FIGS. 7-10), air with VOC vapor emissions is routed through the adsorption media 38 as described above, as a result of natural convection currents transporting or carrying the air with VOC vapor emissions toward a location of lesser pressure. As described above, the adsorption media 38 chemically attaches to or traps the hydrocarbons and other environmentally-harmful components comprising the VOC vapor emissions as the air with VOC vapor emissions passes through the adsorption media 38. After the hydrocarbons and other harmful components are removed, the scrubbed vapor or air is transported or carried outside the container C by the natural convection currents.

In other constructions (not shown), an active or forced convection system, for example, utilizing a source of vacuum generated by the engine, may also be used to draw the VOC vapor emissions from the container C into the canister assembly 34, through the adsorption media 38, and into the engine intake.

"Clean" air or "make-up" air (e.g., air not containing VOC vapor emissions) from the exterior of the container C is transported or carried into the interior of the container C by passive convection or by an active or forced convection system, for example, utilizing a source of vacuum generated by the engine. The make-up air initially passes through the porous member (the foam member 124) or another filter member (not shown) in which particulate matter is substantially trapped. As the make-up air passes through the adsorption media 38, the trapped hydrocarbons and/or other harmful components may be desorbed from the adsorption media 38 in a self-cleansing process of the adsorption media 38. This cleansing process delays or prevents "saturation" of the adsorption media 38 thereby increasing the ability of the adsorption media 38 to adsorb additional VOC vapor emissions and extending the useful life of the adsorption media 38.

An active or forced convection system (not shown) utilizing a source of vacuum, for example, generated by the engine, may more effectively desorb trapped hydrocarbons and/or other harmful components from the adsorption media 38 than a solely passive convection system. When used in combination with the vacuum, a valve such as a diaphragm valve, a duckbill valve, or any one-way or two-way valve that can be activated by pressure can limit the activation of active or forced convection to known parameters and therefore scale down the operation pressure.

In some instances, the location of lesser pressure is inside the container C. One such instance occurs when fuel is discharged from the container C, and the decreasing fuel level in the container C results in a lower pressure inside the container C compared to the atmospheric pressure acting on the outside of the container C. Conventionally, a vent is designed into the container C to allow the convective currents to establish pressure equalization between the interior and exterior of the container C. However, such a conventional vent may allow the escape of VOC vapor emissions into the atmosphere. In a second direction of the flow path (opposite the direction indicated by arrows in FIGS. 7-10), the make-up air equalizes the pressure between the interior and exterior of the container C without allowing the escape of VOC vapor emissions from the container C.

In other constructions (not shown), the structure of the cap 10 may define two separate and distinct flow paths between the interior and exterior of the container C to which it is coupled. In such a construction, a first flow path allows air with VOC vapor emissions to be routed through the adsorption media 38 before scrubbed air is discharged outside of the container C, and a second flow path allows make-up air from the exterior of the container C to move to the interior of the container C under action of a pressure differential (i.e., when the fuel level in the container C decreases).

Figure 11:
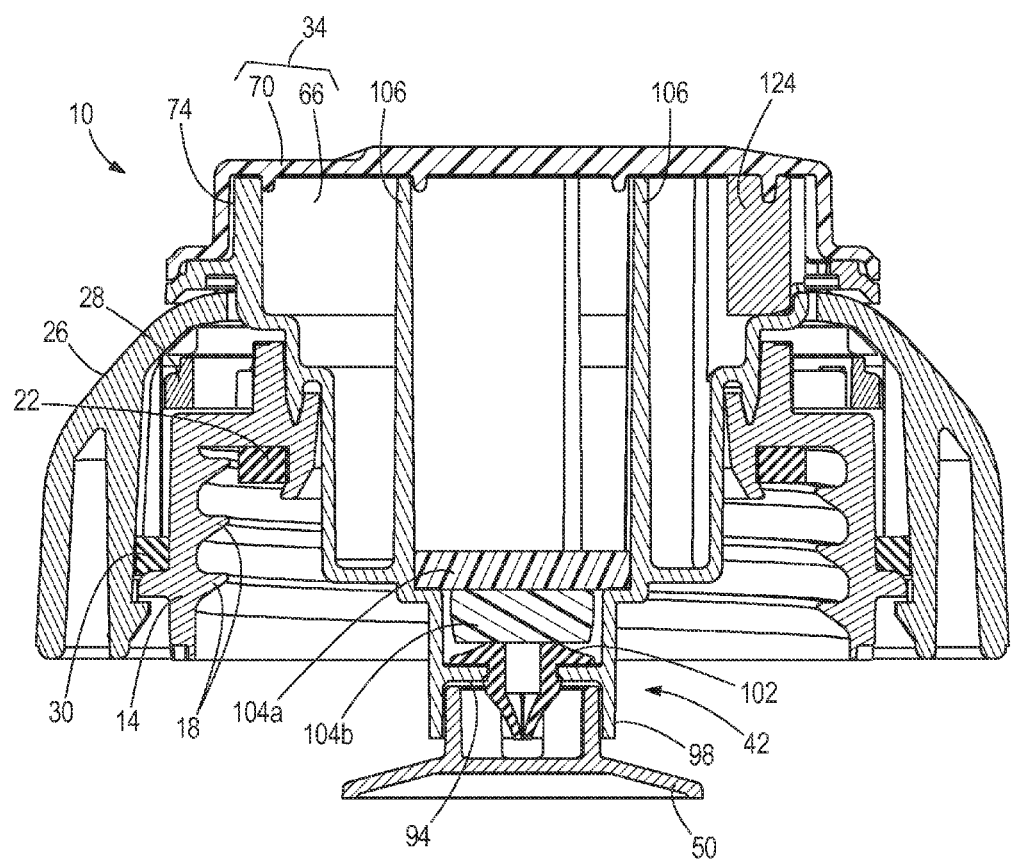
FIG. 11 is a cross-section view of an alternative construction of the cap shown in FIGS. 1-10.
Figure 12A:
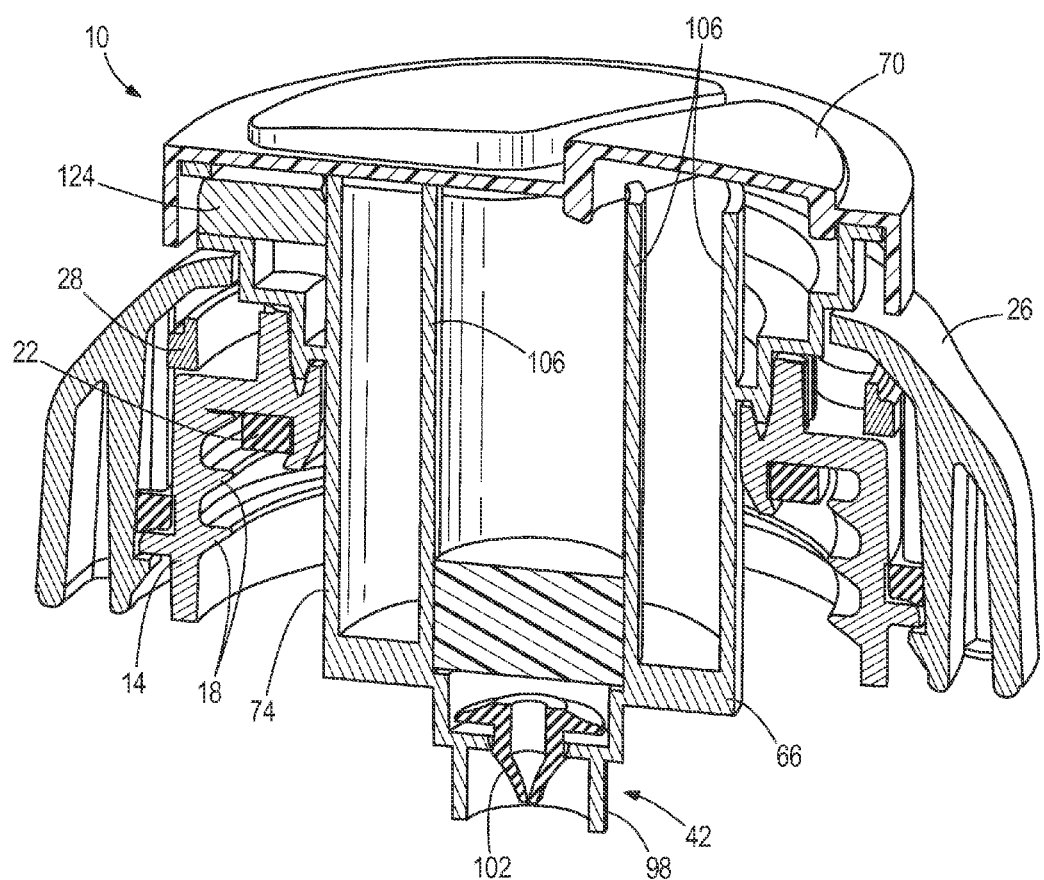
FIG. 12A is a cross-section view of a cap of another alternative construction.
Figure 12B:
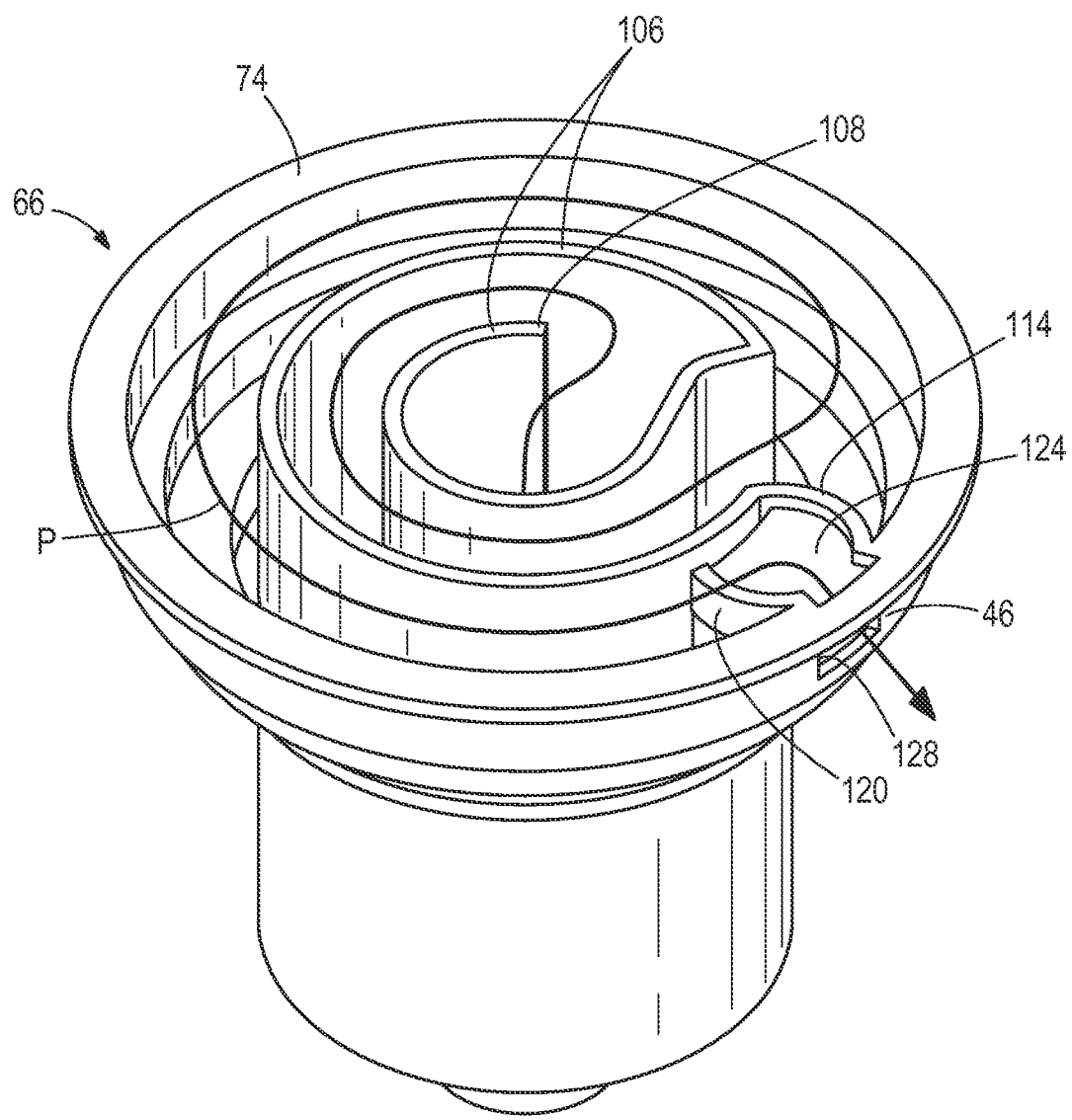
FIG. 12B is a perspective view of a canister portion of the cap of FIG. 12A.
Figure 13:
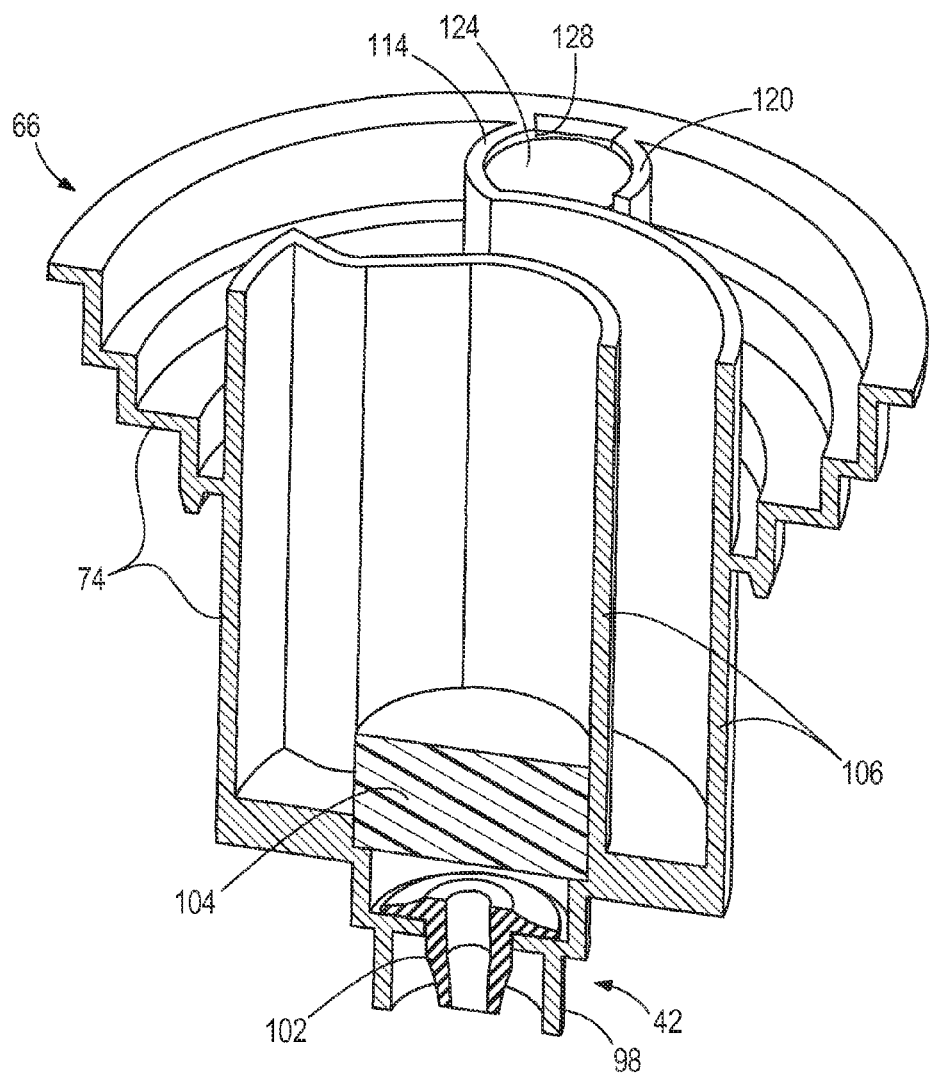
FIG. 13 is a first cross-section view of the canister portion of FIG. 12B.
Figure 14:
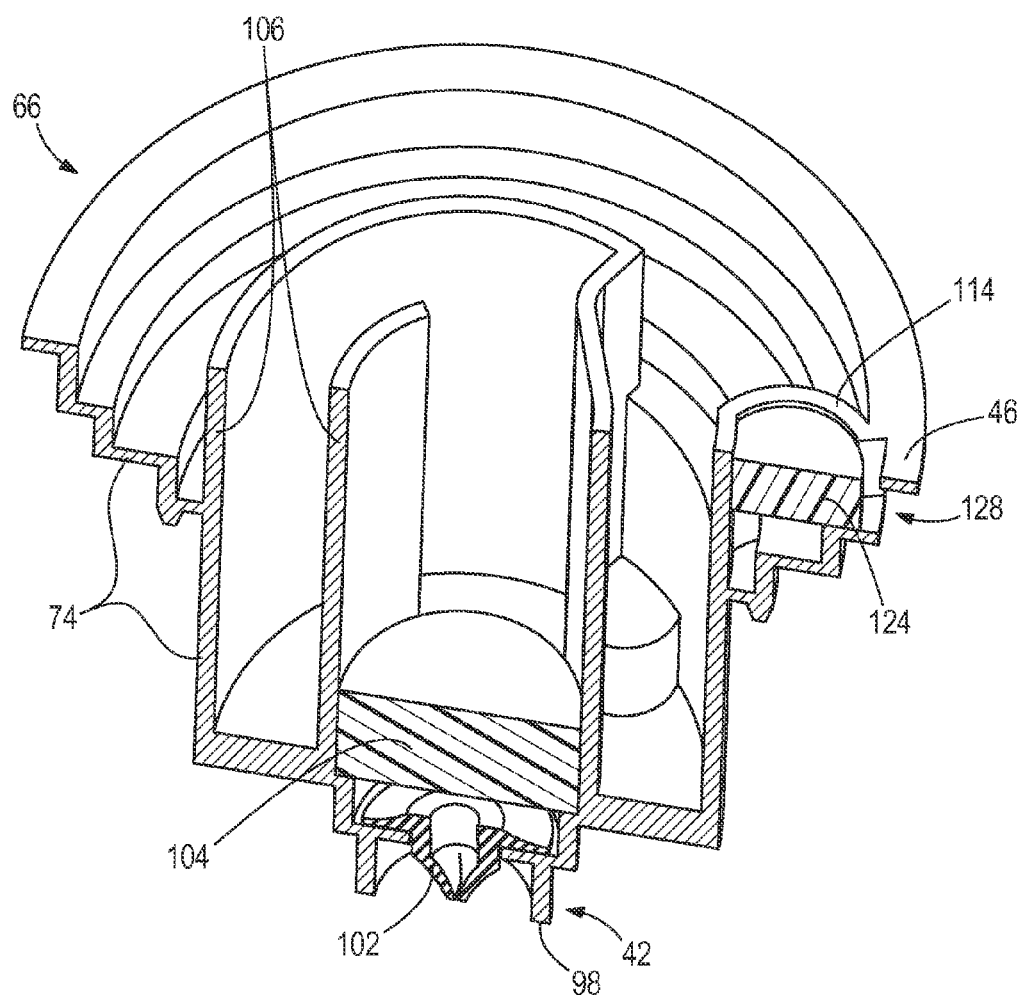
FIG. 14 is a second cross-section view of the canister portion of FIG. 12B
Figure 15A:
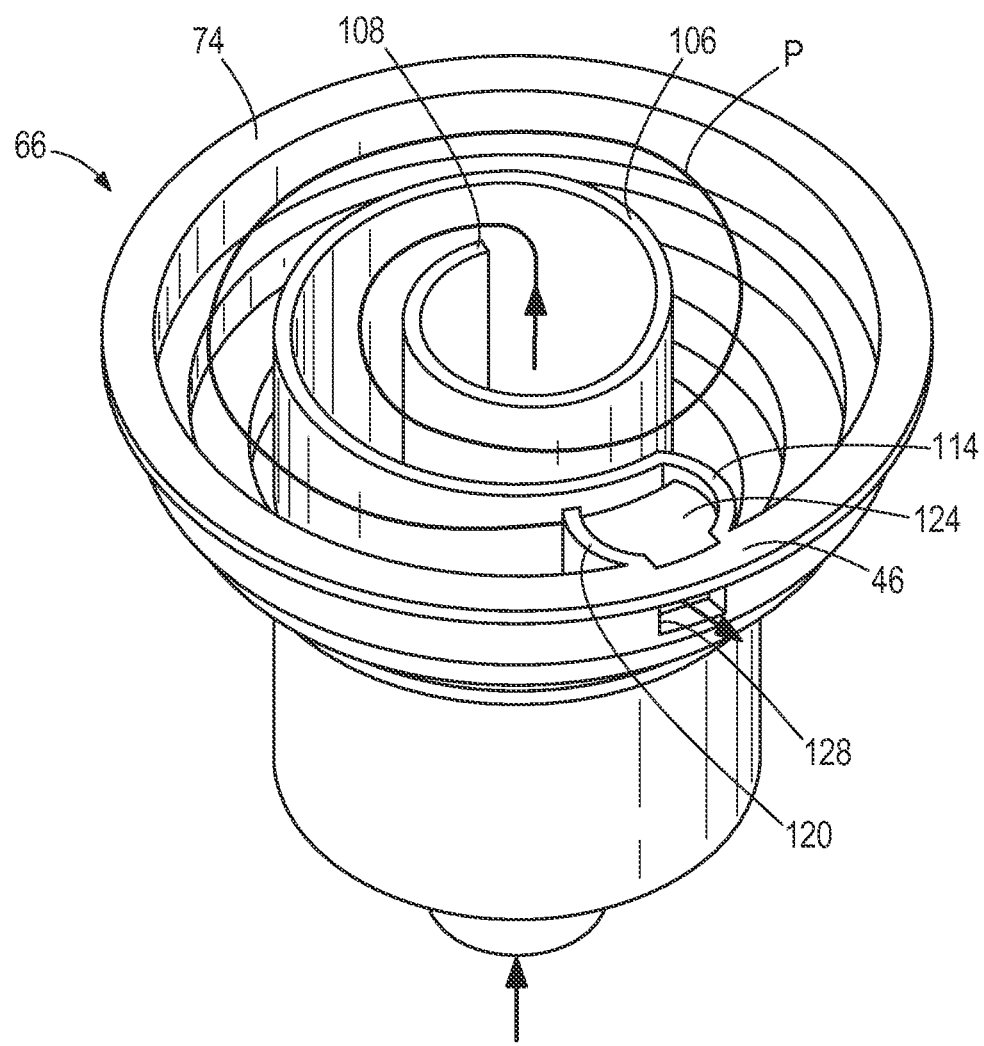
FIGS. 15A-H are views of another alternative construction of the cap shown in FIGS. 14A-D.
Figure 15B:
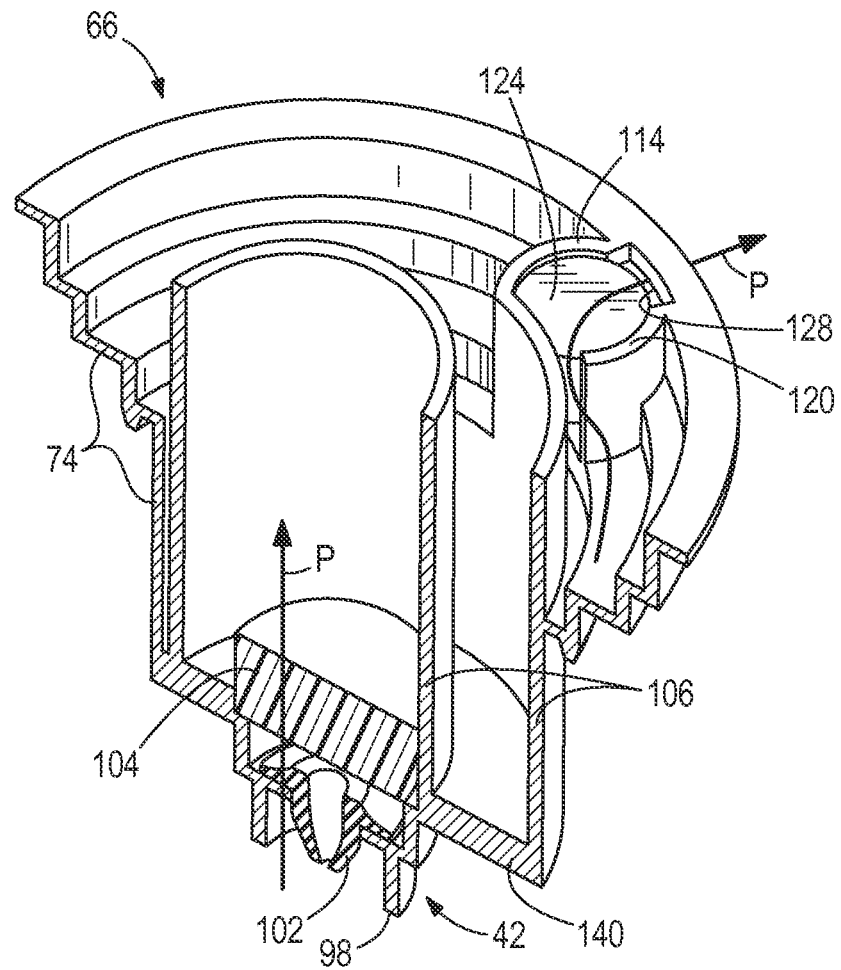
Figure 15C:
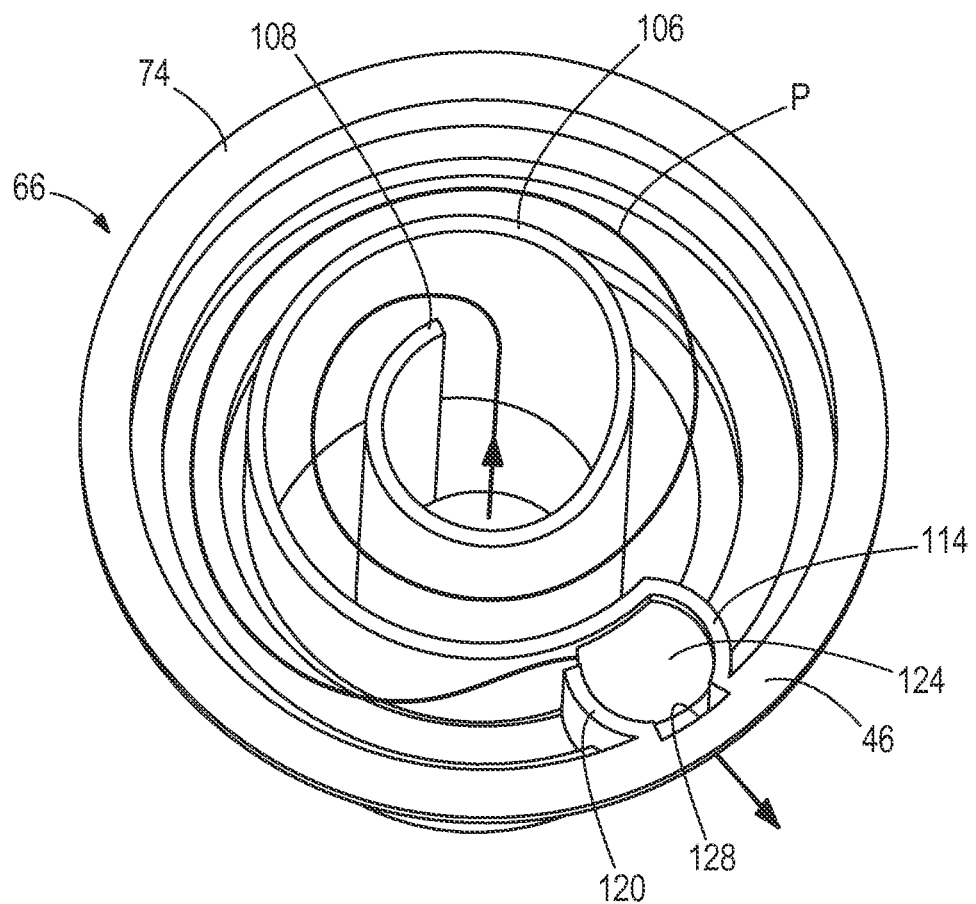
Figure 15D:
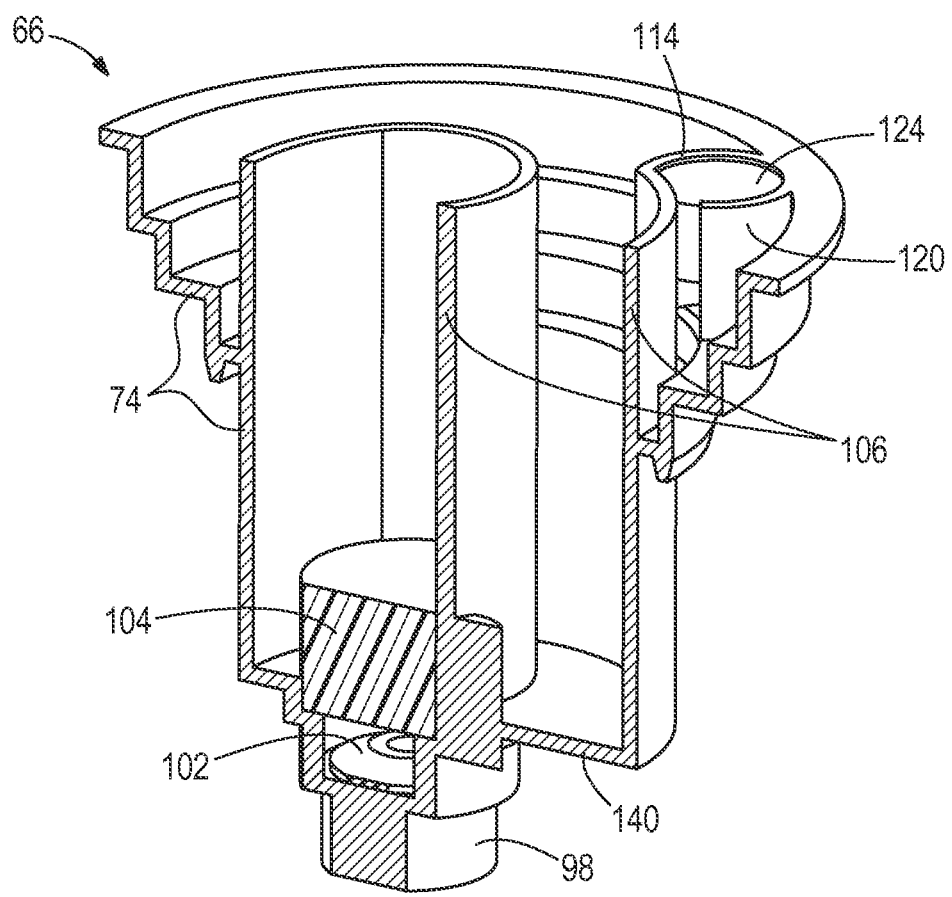
Figure 15E:
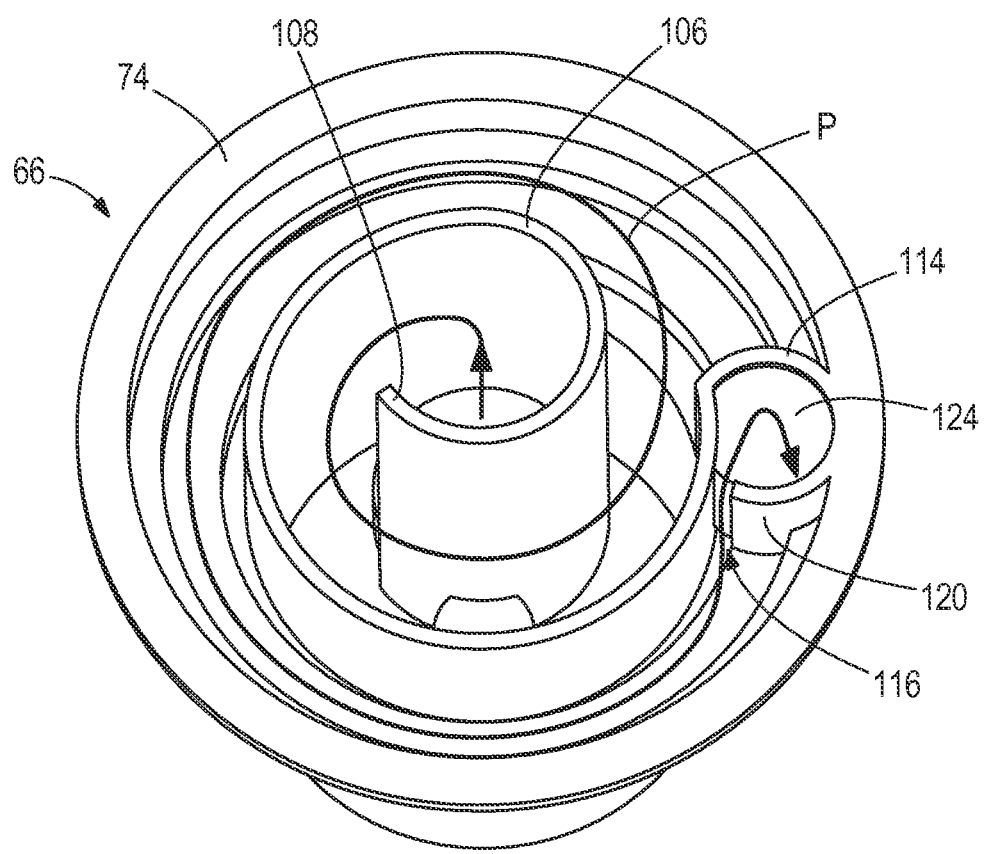
Figure 15F:
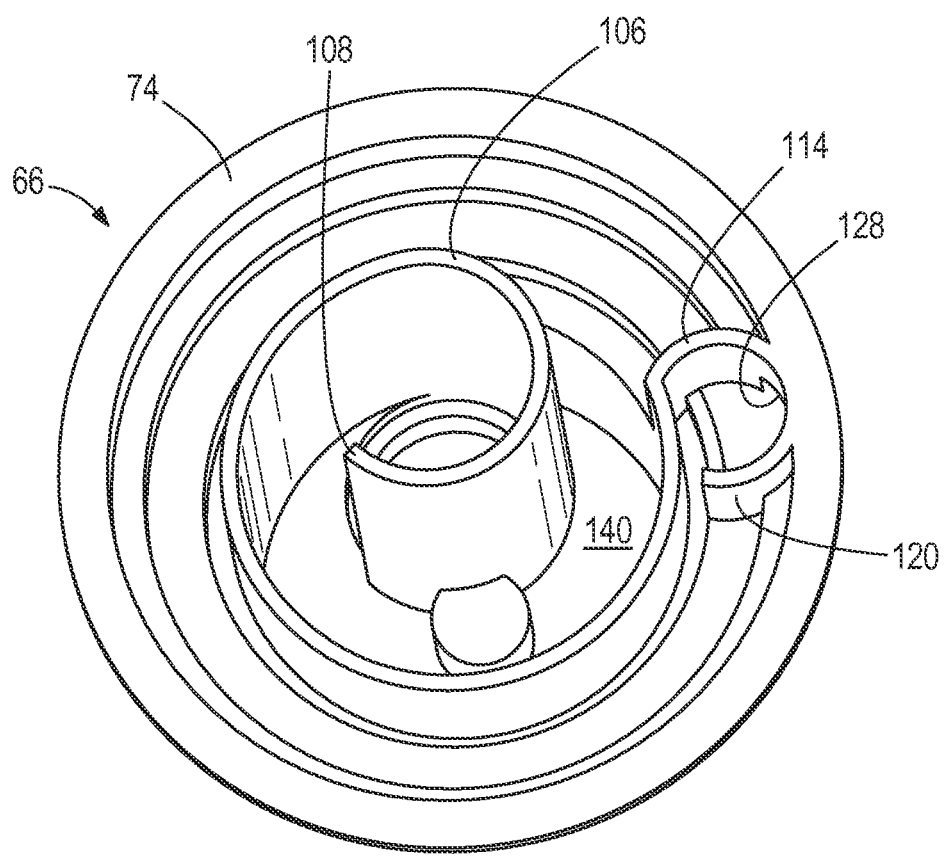
Figure 15G:
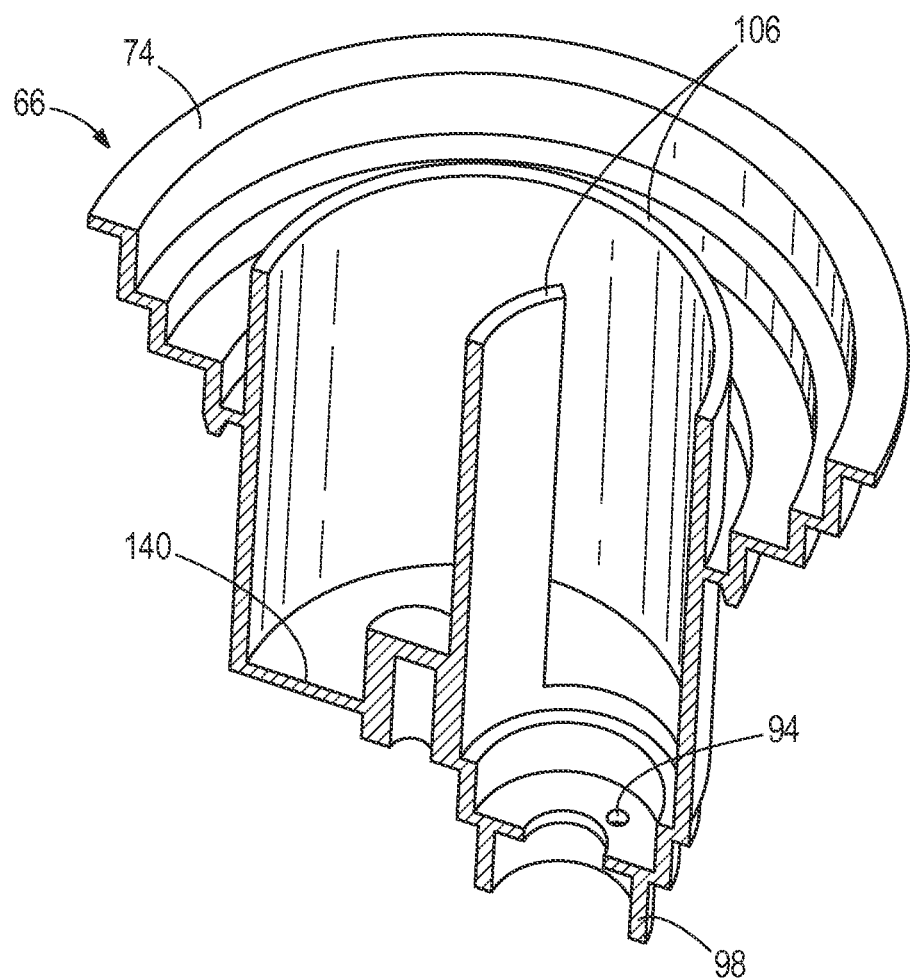
Figure 15H:
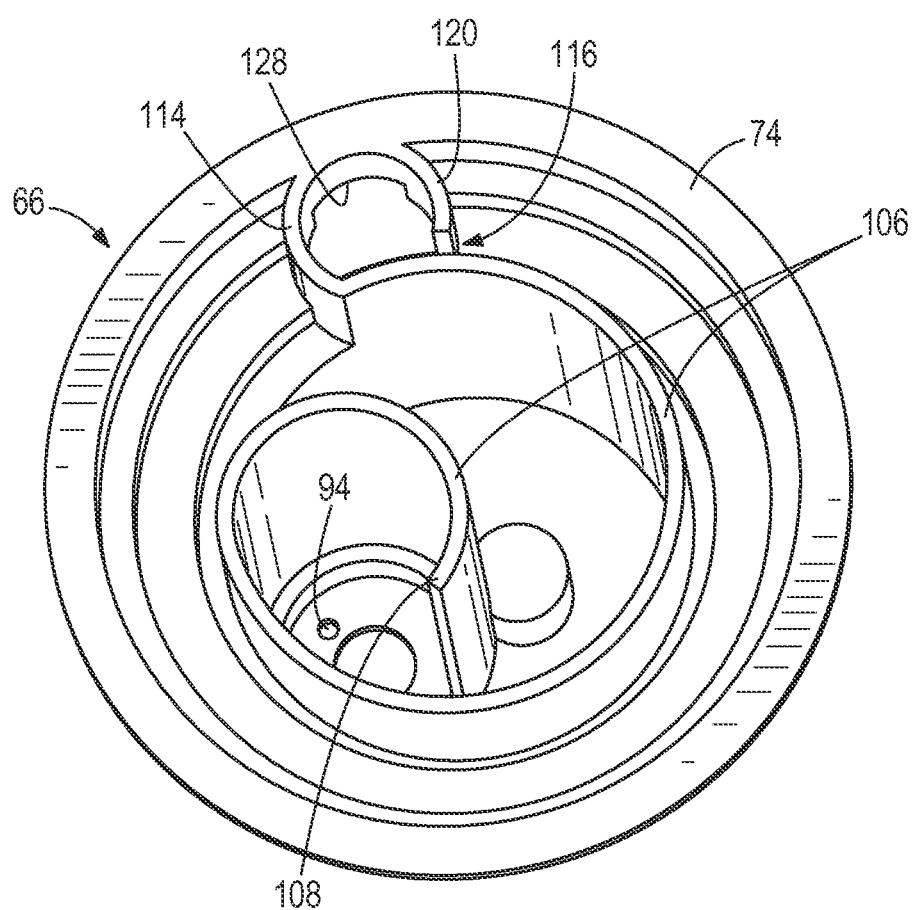
Figure 16A:
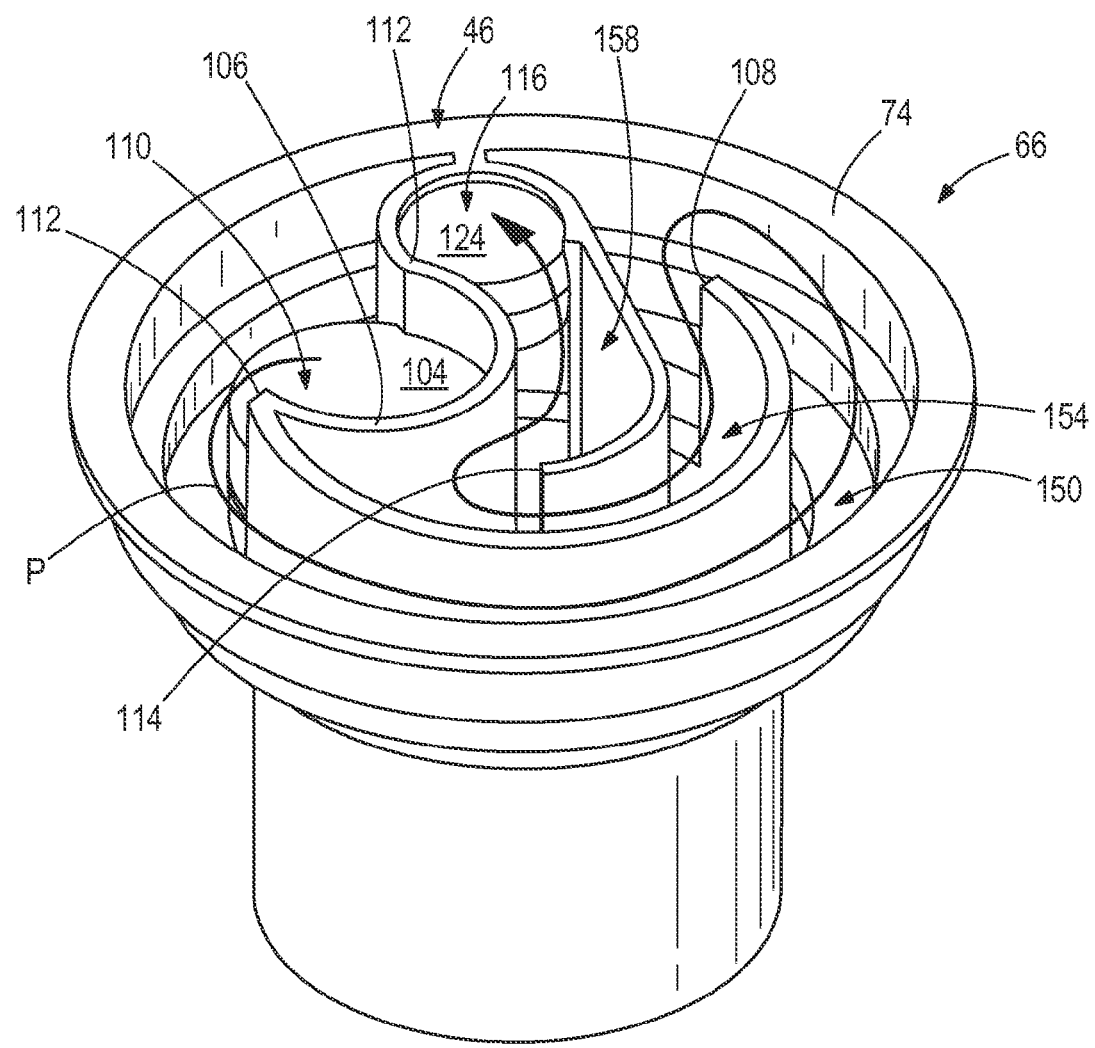
FIGS. 16A-E are views of yet another alternative construction of a cap.
Figure 16B:
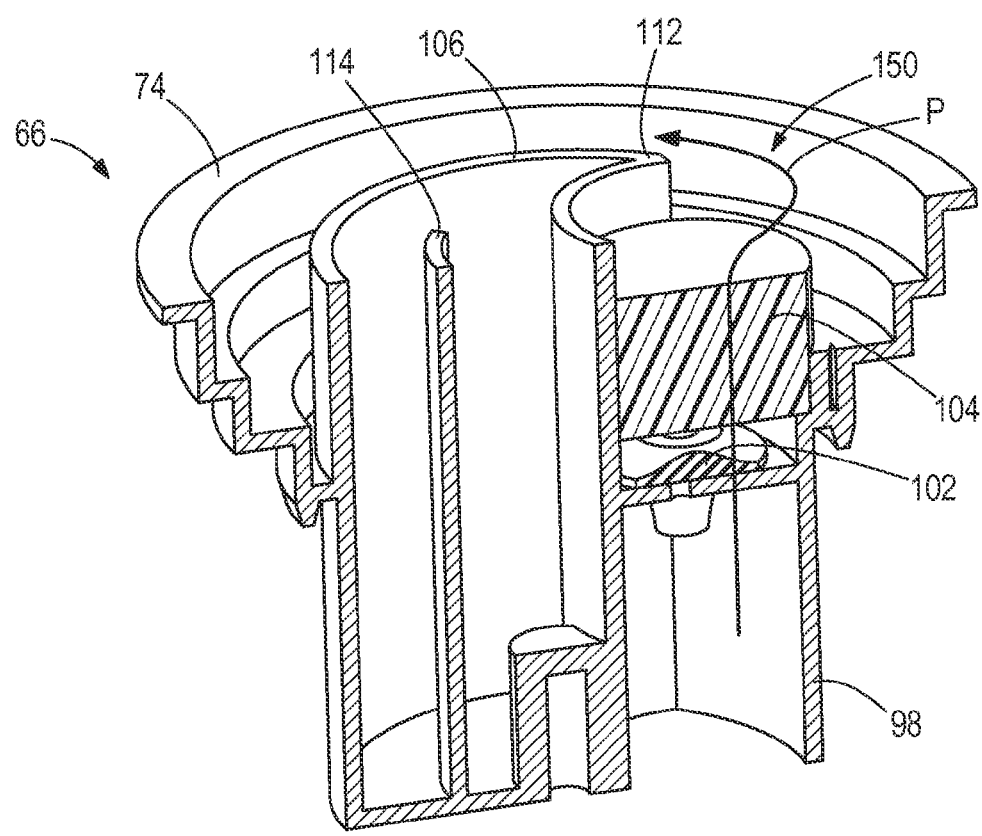
Figure 16C:
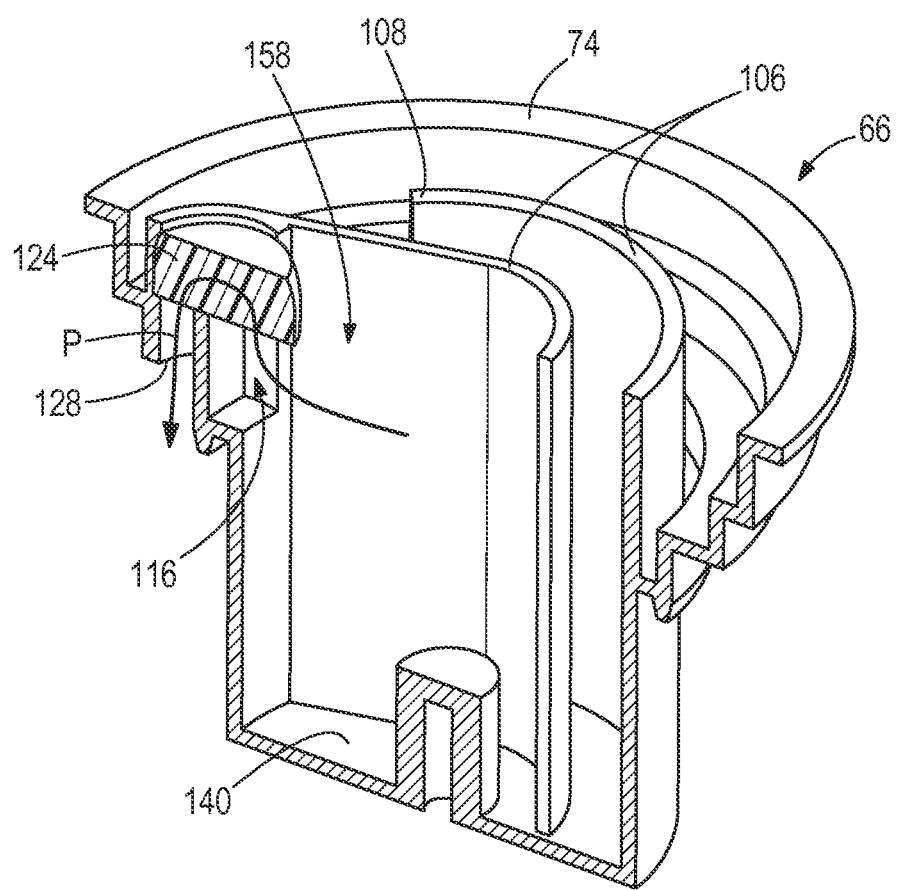
Figure 16D:
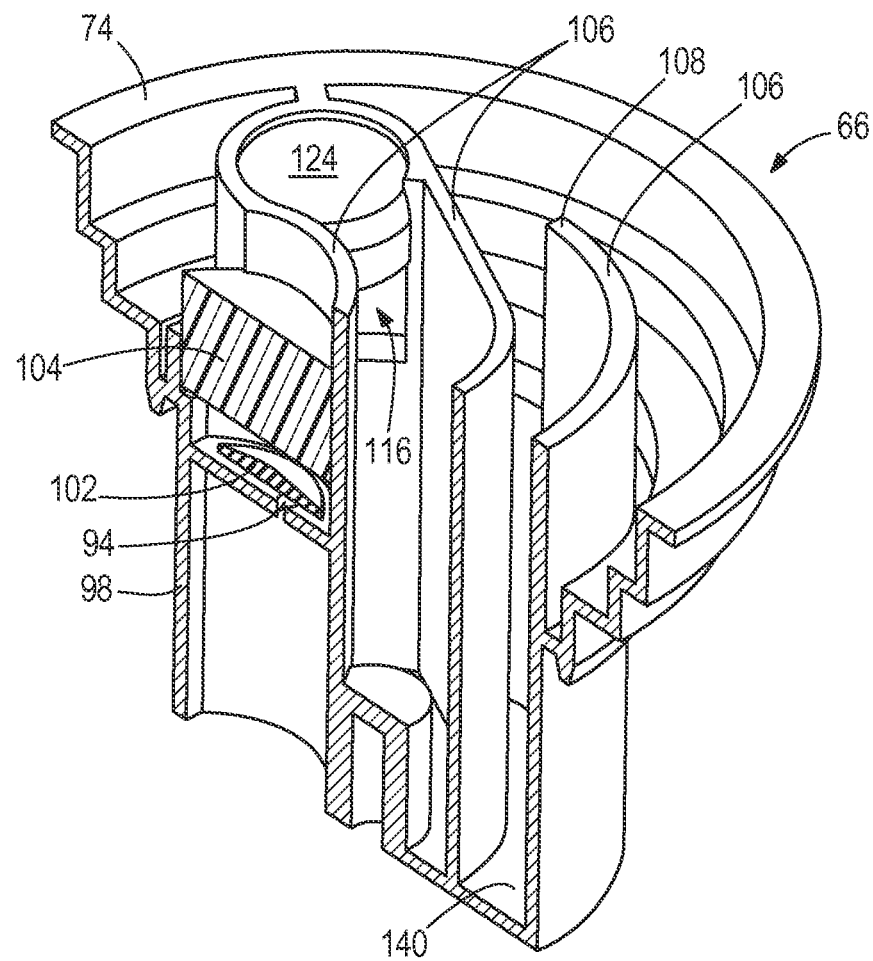
Figure 16E:
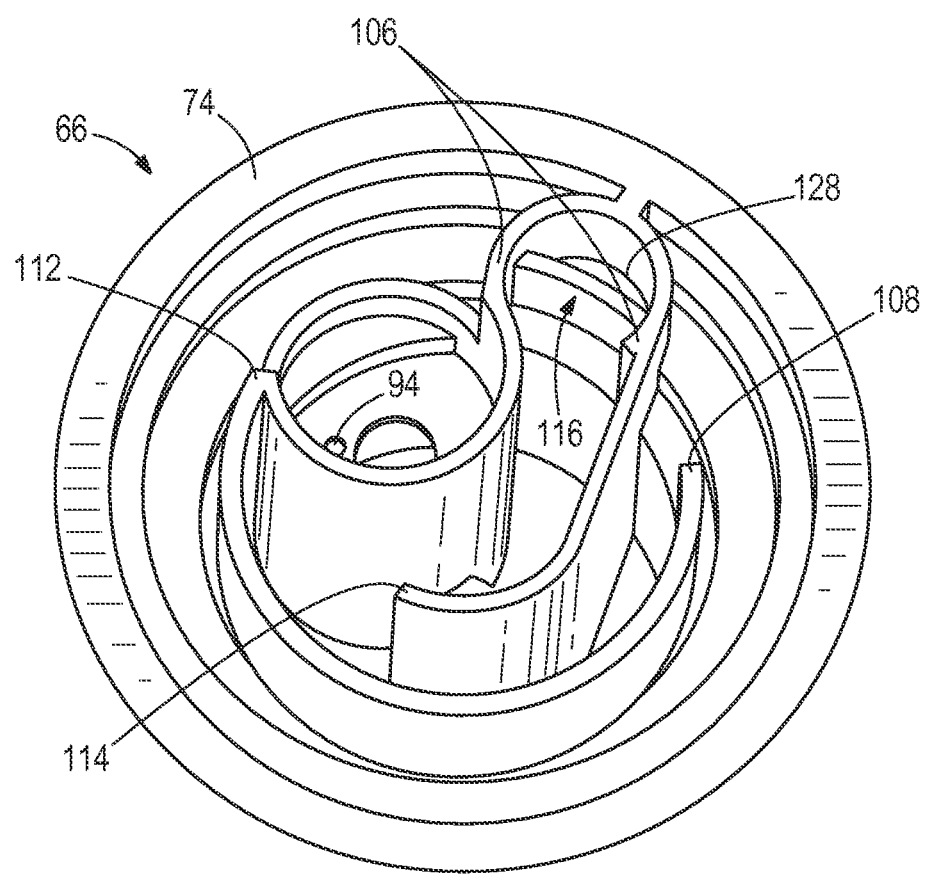
Figure 17A:
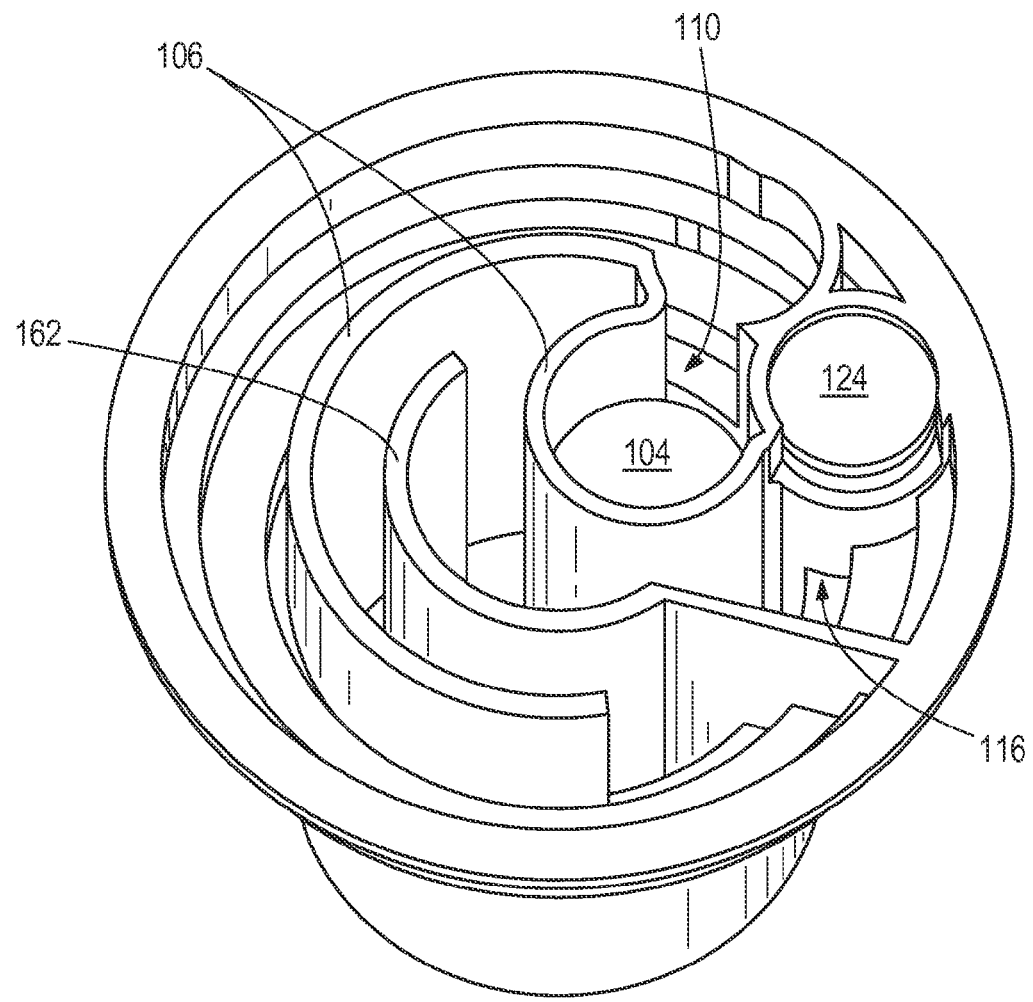
FIGS. 17A-C and FIGS. 18A-D are views of alternative constructions of the cap shown in FIGS. 16A-E.
Figure 17B:
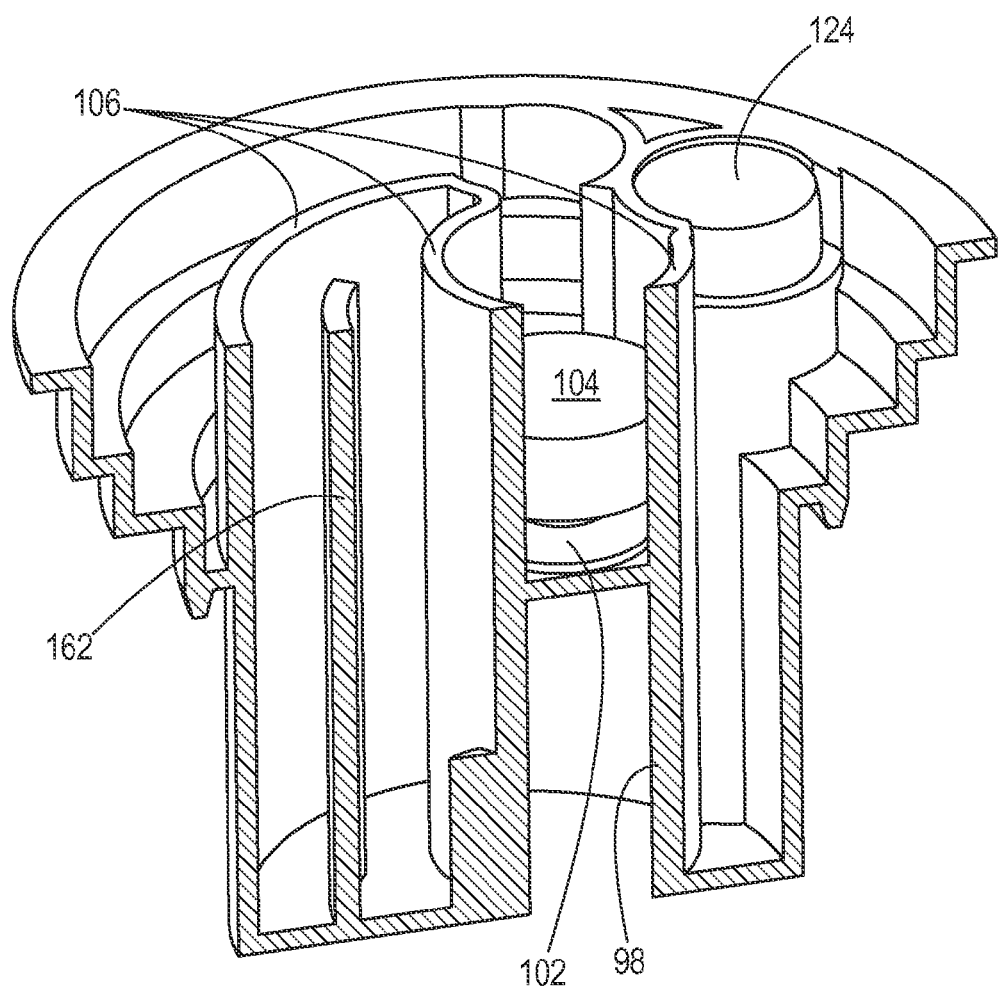
Figure 17C:
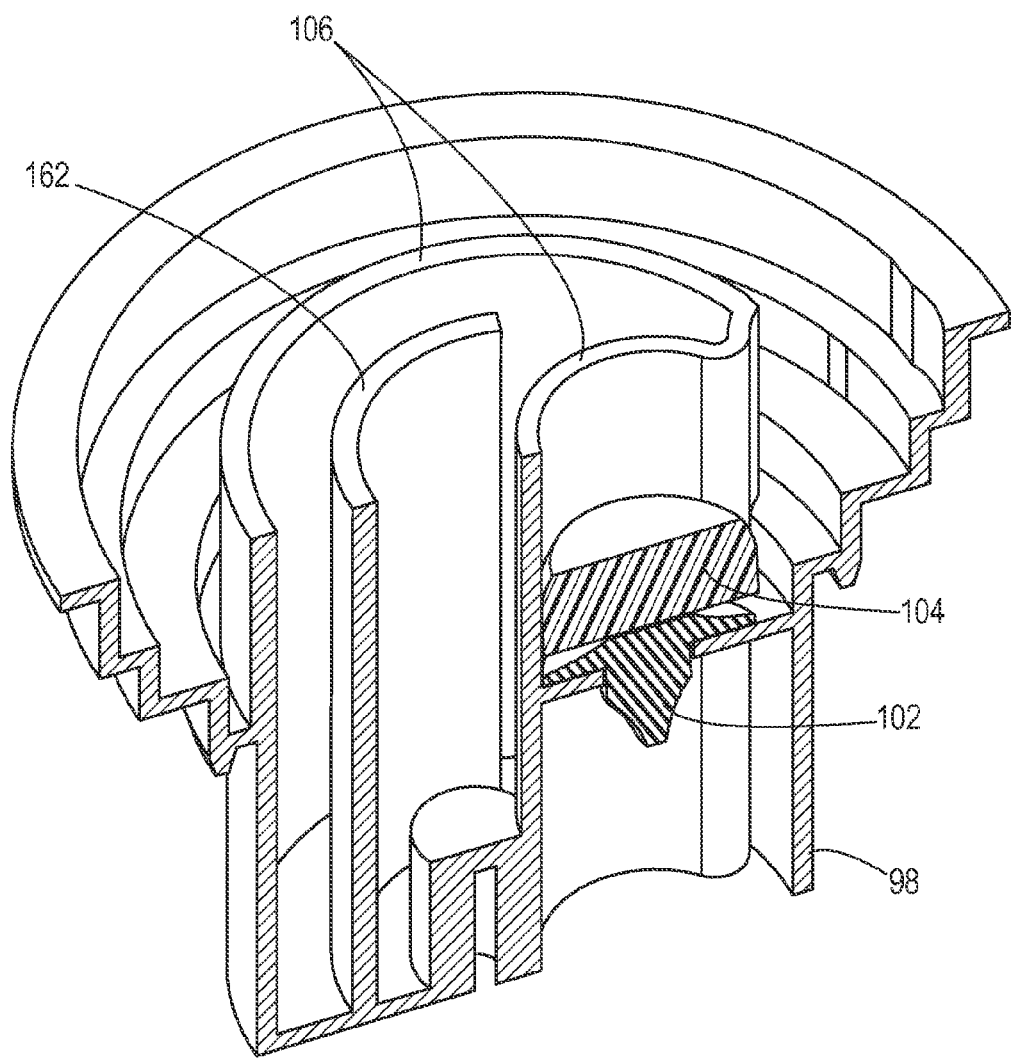
Figure 18A:
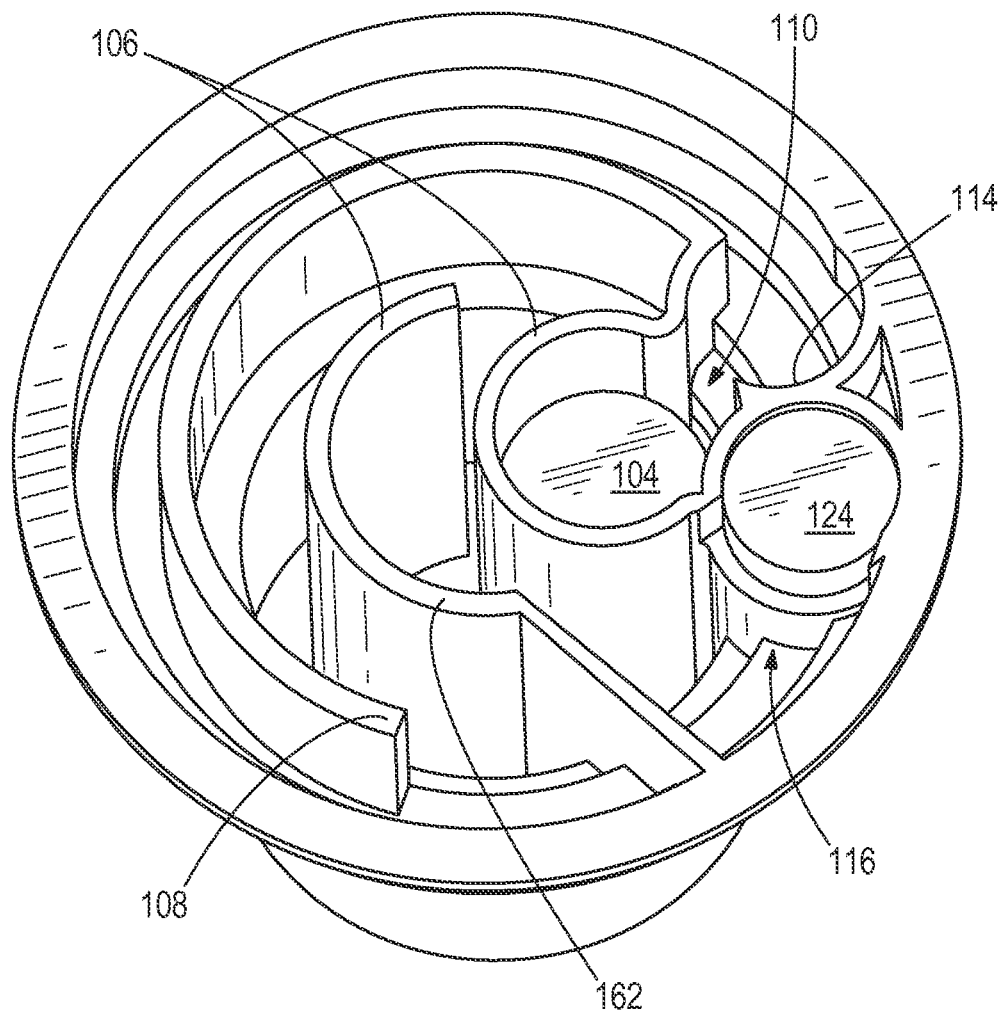
Figure 18B:
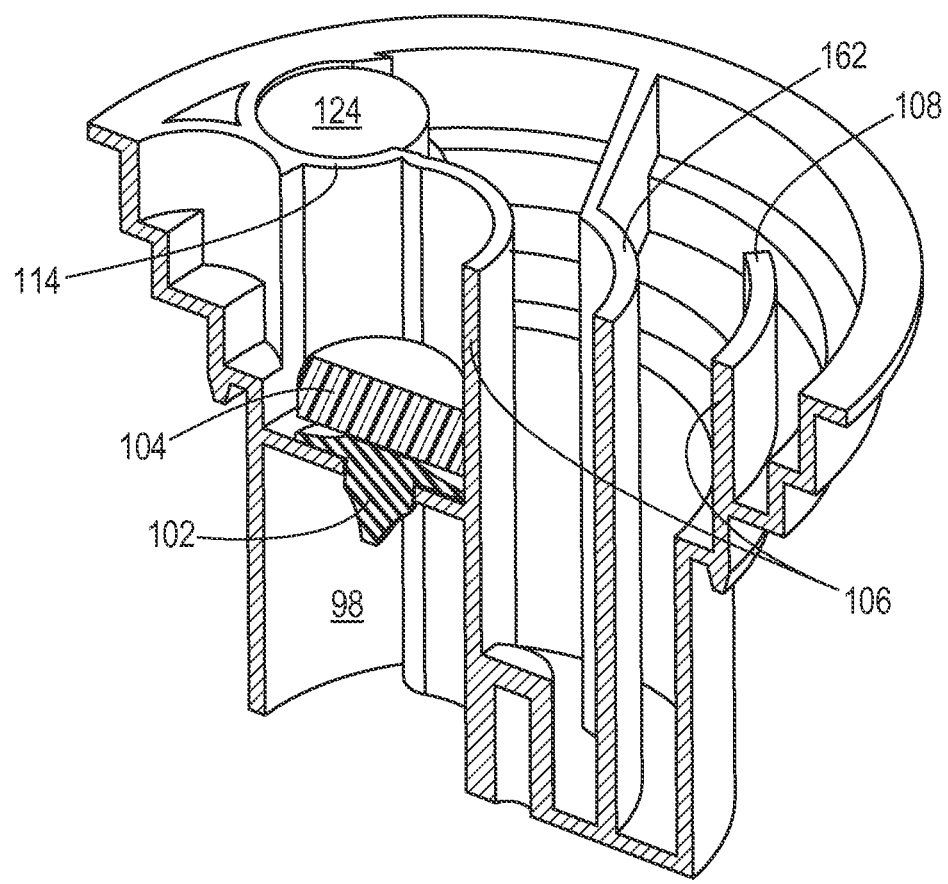
Figure 18C:
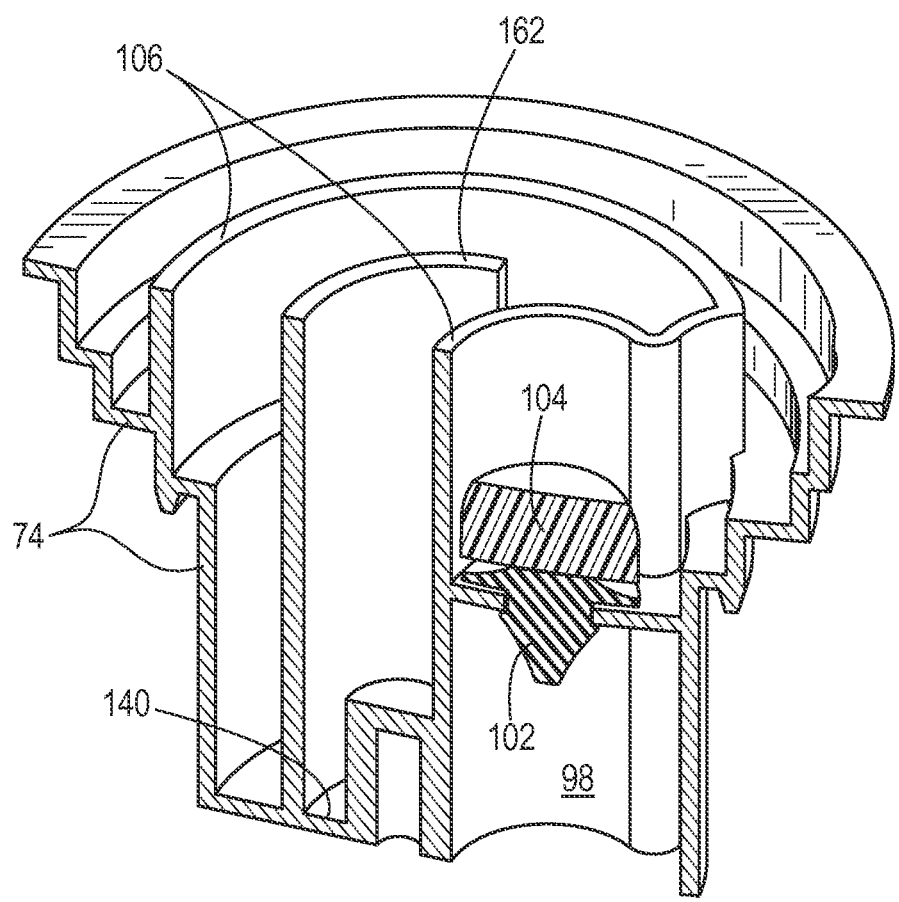
Figure 18D:
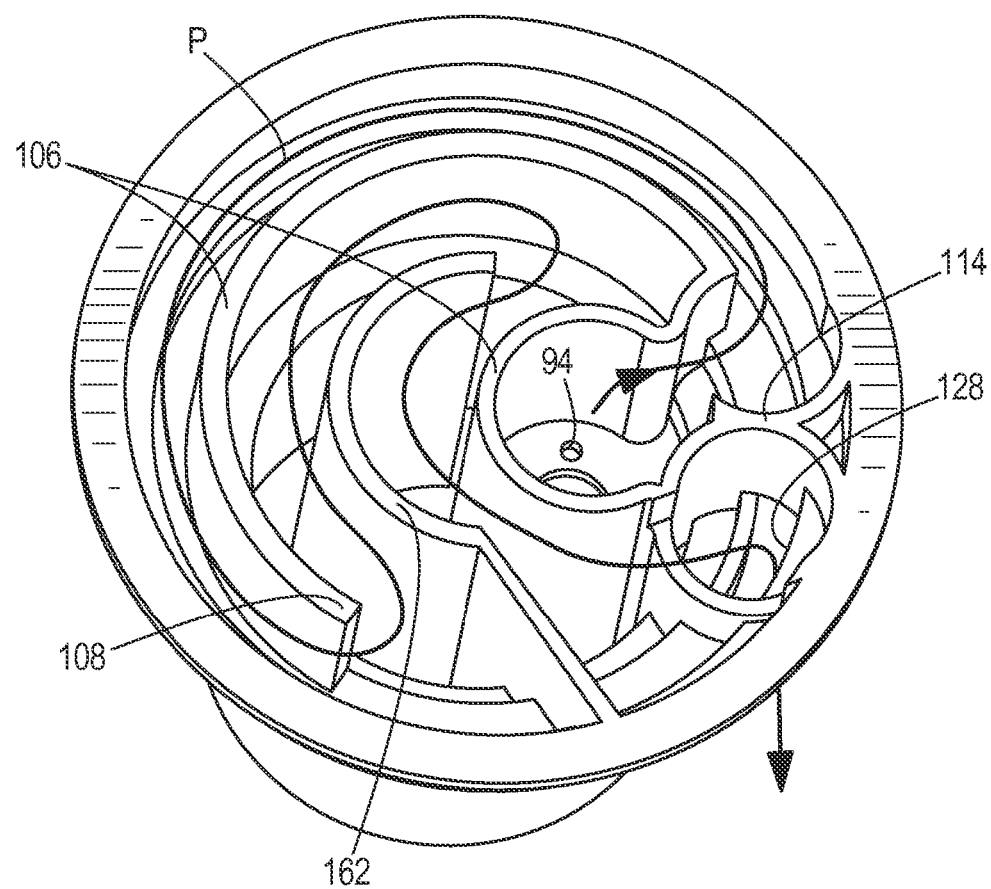

FIG. 11 illustrates an alternative construction for the cap 10. In the illustrated construction, the porous member positioned over the valve member 102 proximate the inlet opening 94 includes both a felt member 104*a* and a foam member 104*b*.

FIGS. 12A-14 illustrate another alternative construction for the cap 10. In the illustrated construction (see FIG. 12B), the interior wall 106 spirals around the inlet opening 94 and defines a path P extending at least 540 degrees (e.g., about 630 degrees) around the axis A. The interior wall 106 includes a first portion extending around the axis A at a first, substantially constant radius, and a substantially radially connector to a second portion extending around the axis A at a second, substantially constant radius larger than the first. In some outer sections, the interior wall 106 is an extension of the lower portion of the outer wall 74.

FIGS. 15A-H illustrate an alternative construction of the cap 10, which is similar to that shown in FIGS. 12A-14, but in which the interior wall 106 smoothly increases in radius toward the exit 116.

FIGS. 16A-E illustrate yet another alternative construction of a cap 10, in which the interior wall 106 defines a path P that, contrary to the above constructions in which the path P only extends in one rotational direction about the axis A, reverses direction to extend the distance air with VOC vapor emissions travels through the adsorption media 38. In the illustrated construction, the path P has a first section 150 to direct flow in a first direction about the axis A (about 180 degrees), a second section 154 to direct flow in a reverse direction (about 90 degrees), and a third section 158 to direct flow generally in the first direction (about 90 degrees). The path P thus extends for a total travel of about 360 degrees. The entry 110 of the path P is defined by two intermediate portions 112 of the interior wall 106. The exit 116 is also defined along an intermediate portion of the interior wall 106.

Although the adsorption media 38 is positioned in a space along the axis A as in the above-described constructions, the illustrated path P does not include an initial portion extending through this space. Rather, the path P begins near a radially outward portion, extends spirally around the axis, extends to a radially inward spiral portion, across the axially central space, and back to a radially outward portion where the exit 116 is located. Thus, the path P begins and ends at two adjacent positions.

The annular wall 98 extends substantially above the bottom wall 140 to an upper portion of the canister 66 portion and the valve member 102 is positioned adjacent a central or upper portion of the canister portion 66 to further inhibit liquid fuel from entering the inlet opening 94. The porous member 104 (e.g., felt, foam, etc.) is positioned above the valve member 102.

FIGS. 17A-C and FIGS. 18A-D illustrate alternative constructions of the cap 10 shown in FIGS. 16A-E. In these alternatives, an additional interior wall 162 cooperates with the interior wall 106 to define the path P. The additional interior wall 162 has a free end within the space of the canister assembly 34, adjacent the axis A. The additional interior wall 162 has an arcuate portion adjacent the free end, and a substantially straight portion extending to the outer wall 74. The additional interior wall 162 is intertwined with the first interior wall 106 to extend between two adjacent segments of the first interior wall 106.

Figure 19A:
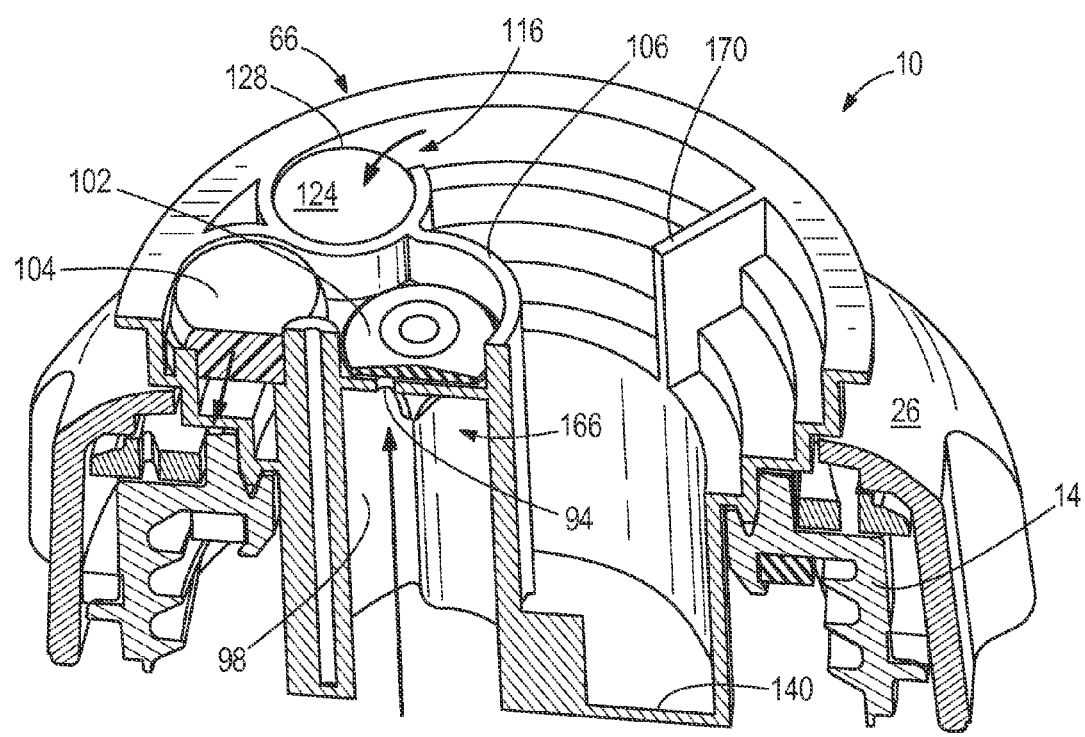
FIGS. 19A-B are views of an alternative construction of a cap.
Figure 19B:
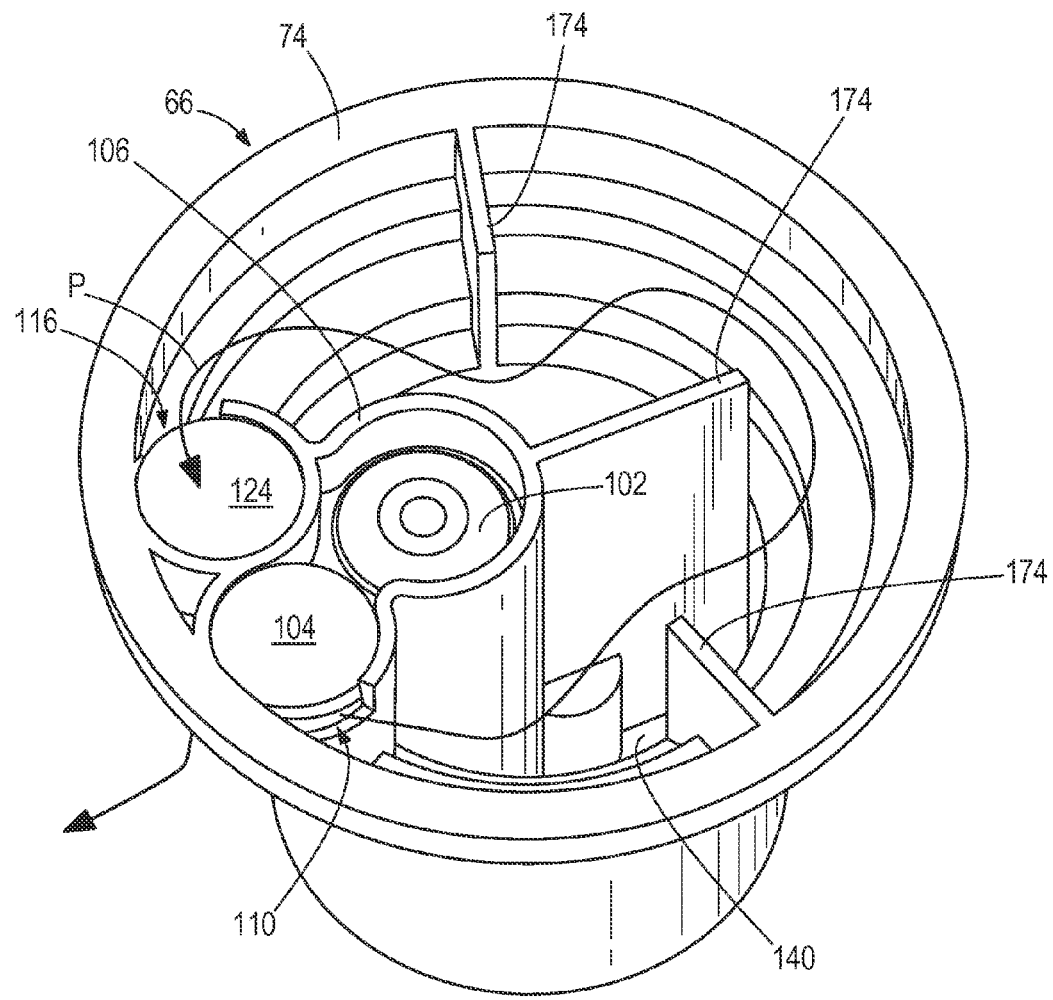
Figure 20A:
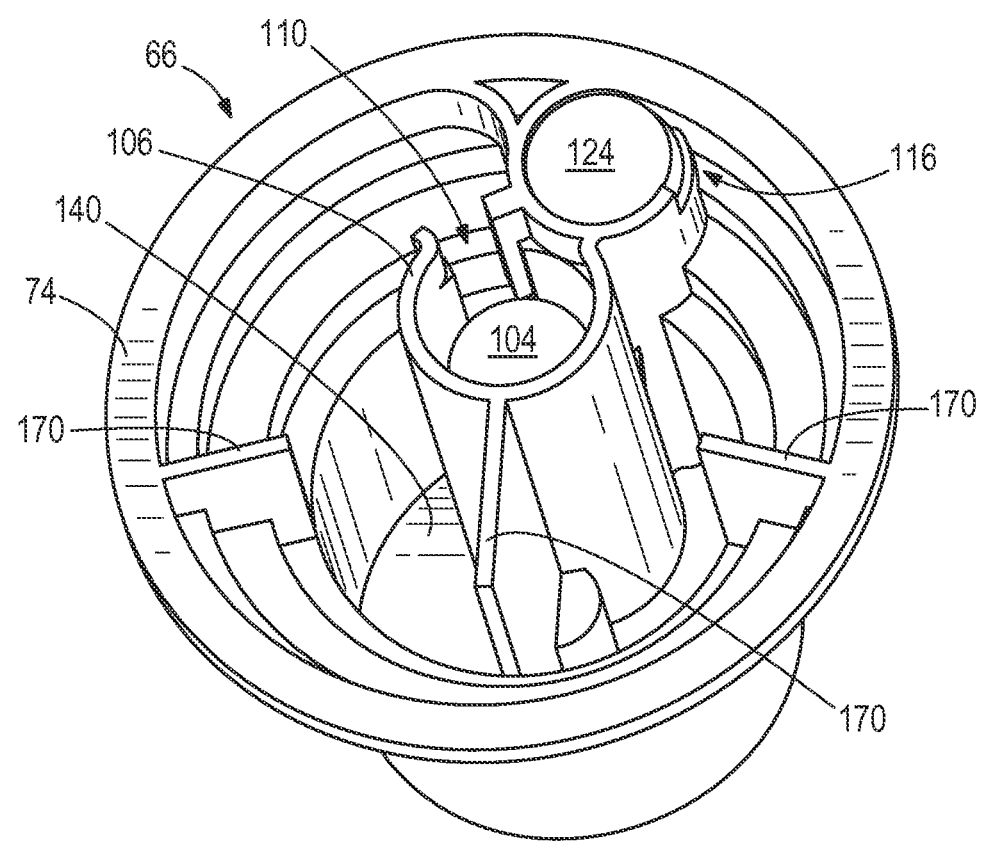
FIGS. 20A-E are views of an alternative construction of the cap shown in FIGS. 19A-B.
Figure 20B:
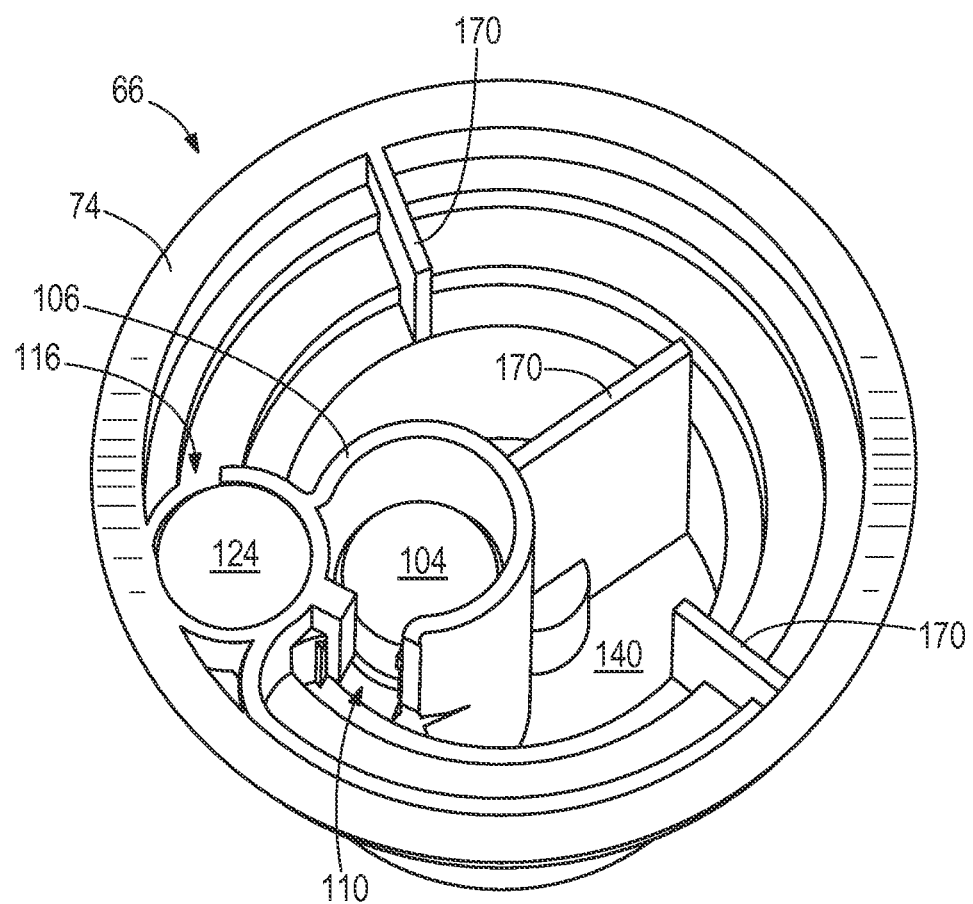
Figure 20C:
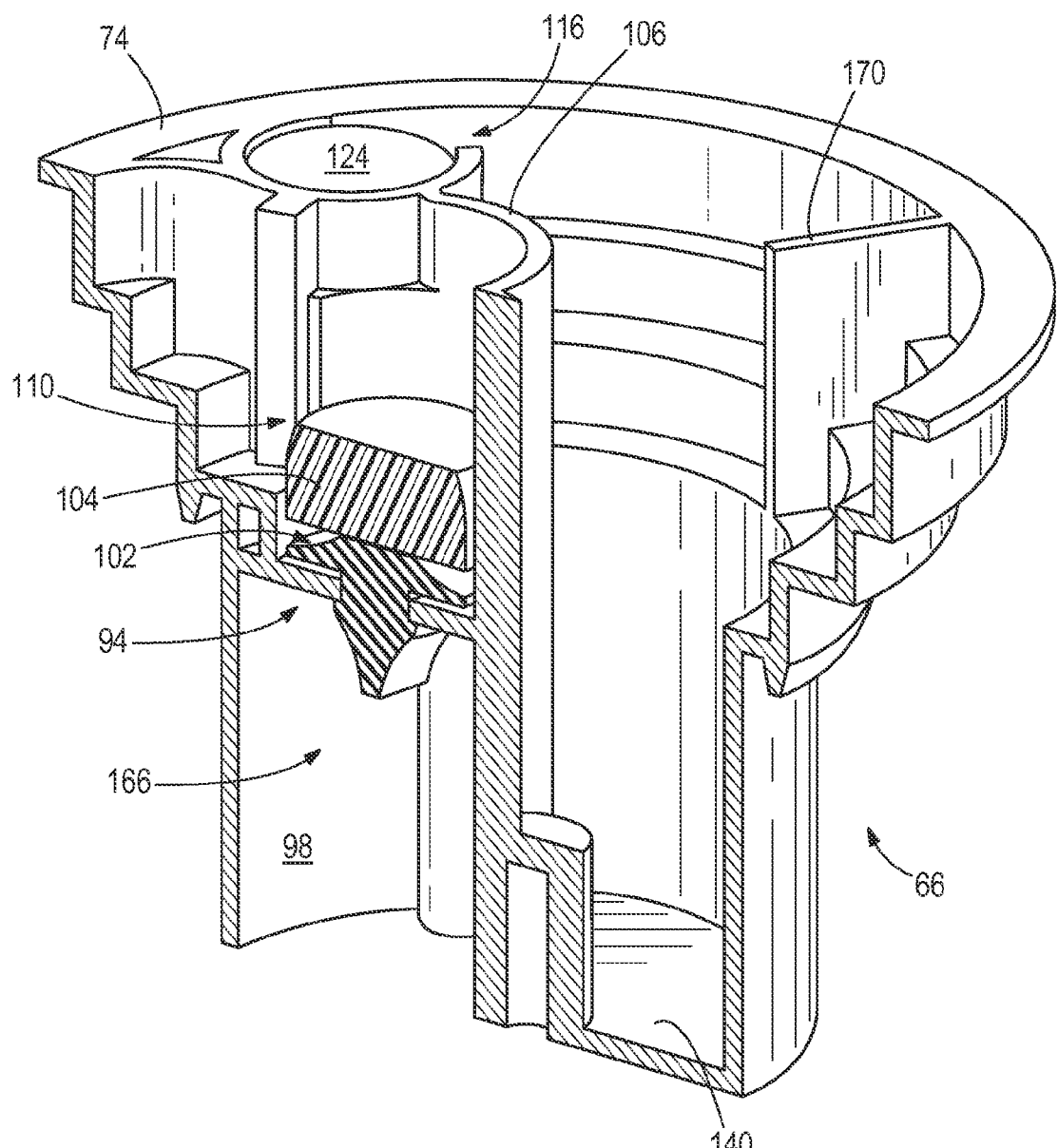
Figure 20D:
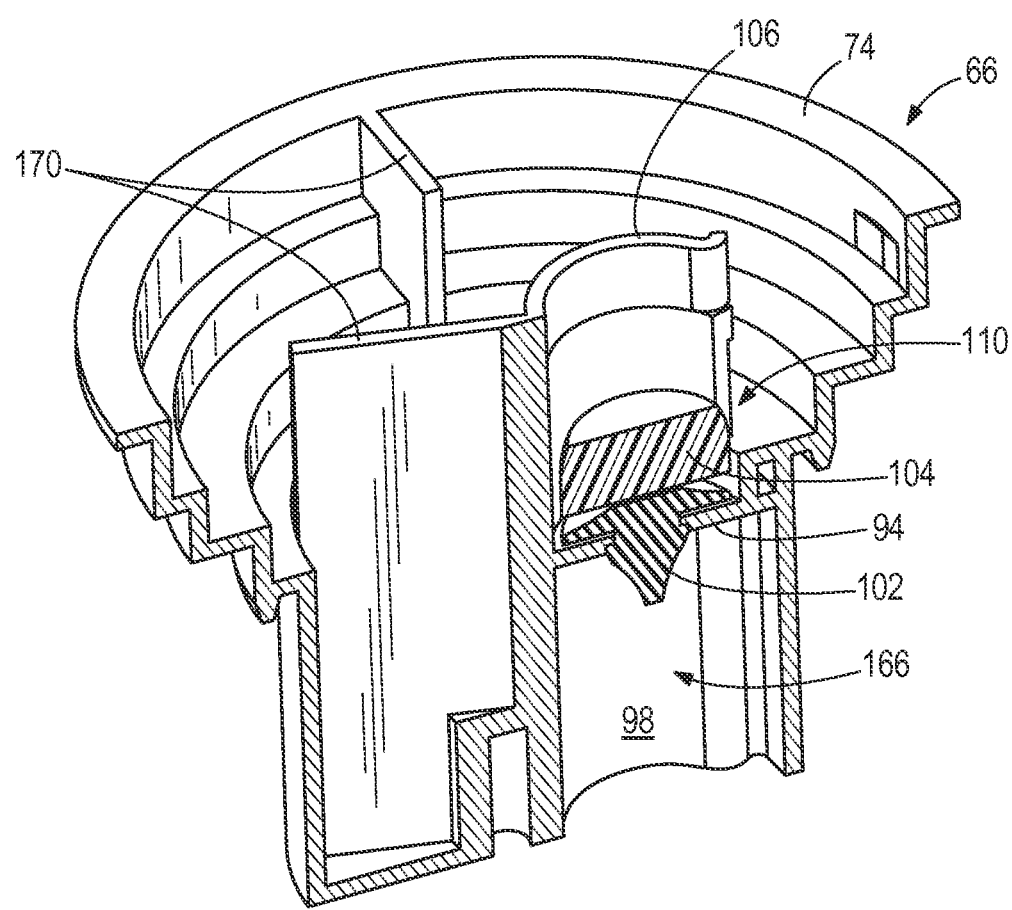
Figure 20E:
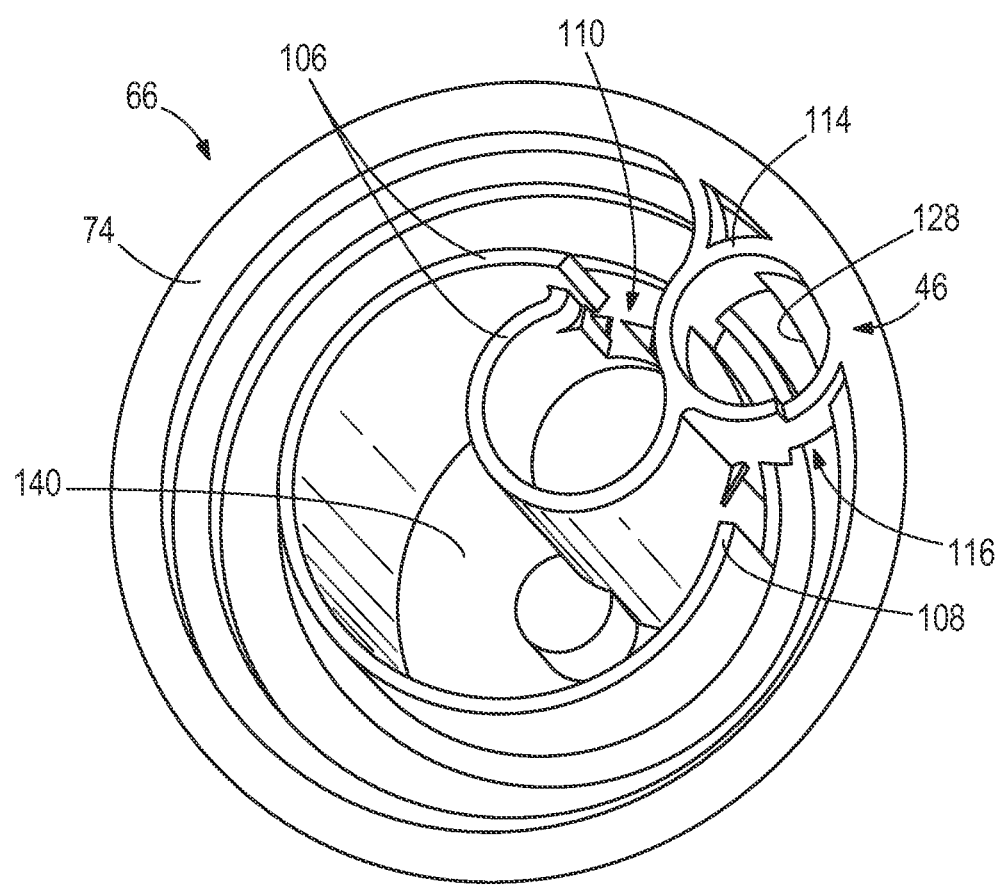

FIGS. 19A-B illustrate an alternative construction of a cap 10. In the illustrated cap 10, the canister portion 66 defines a passage 166 projecting from the bottom wall 140, and the inlet opening 94 is positioned at the remote end of the passage 166 to inhibit contact with liquid fuel in the container C. The inlet opening 94 is positioned at about the same axial position or "height" as that of the outlet opening 128. The porous member 104 is positioned adjacent the valve member 102 at the entry 110 to the path P. A number of walls 170 project transverse to the path P to direct vapor flow radially inwardly and outwardly to extend the distance air with VOC vapor emissions travels through the adsorption media 38. One or more of the walls 170 may extend substantially radially inwardly from the outer wall 74.

FIGS. 20A-E illustrate an alternative construction of the cap 10 shown in FIGS. 19A-B. In the illustrated cap 10, the passage 166 is shortened to lower the inlet opening 94 and the valve member 102. The inlet opening 94 and the valve member 102 are positioned below the outlet opening 128, but not adjacent the interior end or "bottom" of the canister assembly 34. Rather, the inlet opening 94 and the valve member 102 are positioned approximately midway along the axial length of the canister assembly 34. The arrangement of the interior wall 106 is modified in FIG. 20E.

Figure 21A:
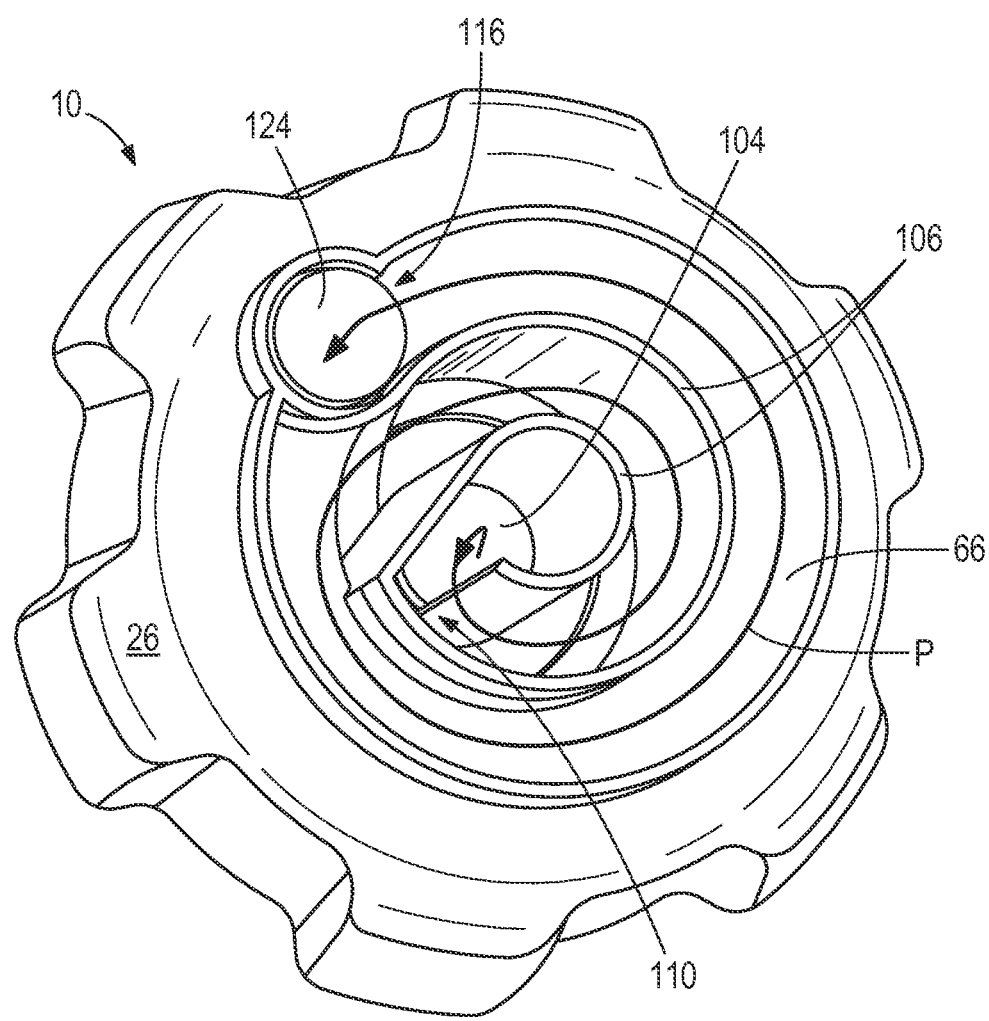
FIGS. 21A-B are views of another alternative construction of a cap.
Figure 21B:
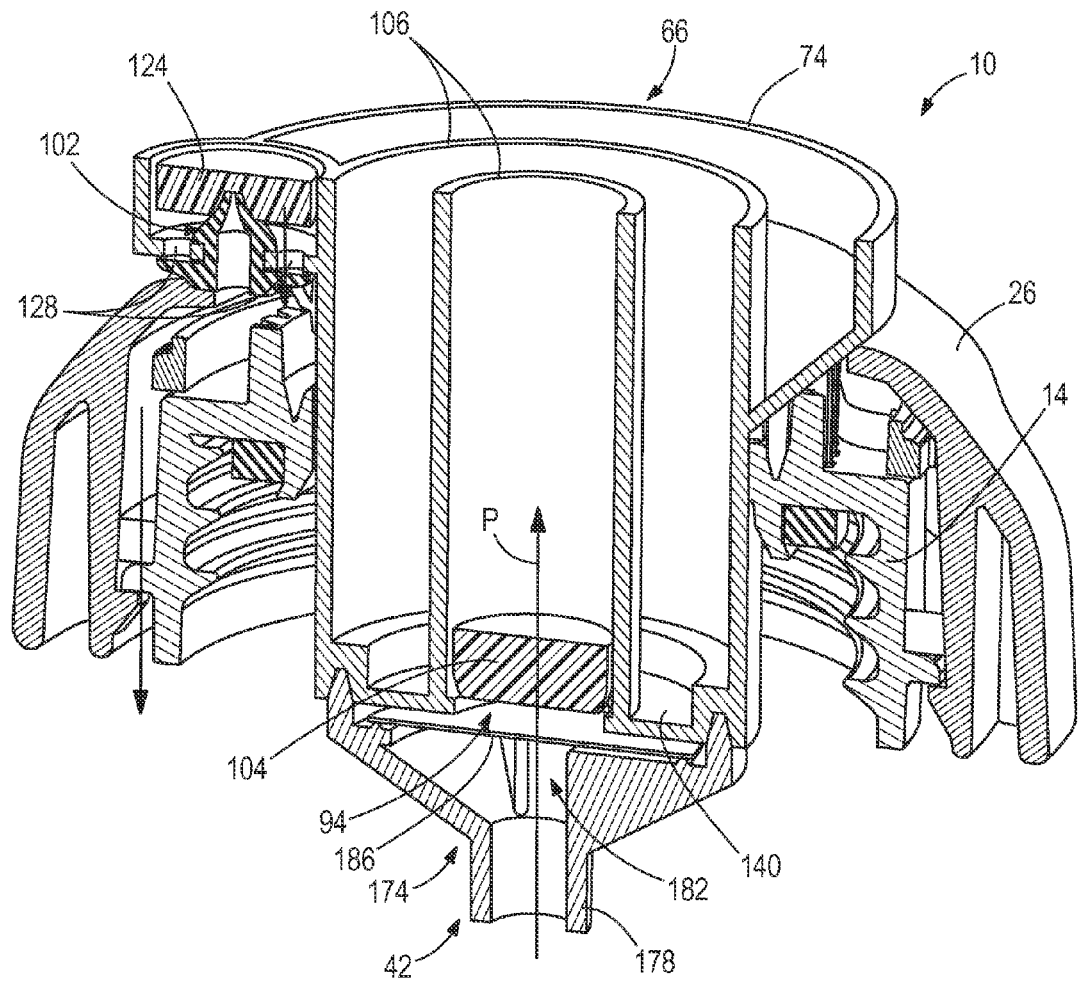

FIGS. 21A-B illustrate another alternative construction of a cap 10. As shown in FIG. 21A, the interior wall 106 spirals around the inlet opening 94 and defines a path P extending at least 540 degrees (e.g., about 630 degrees) around the axis A. Also, an inlet cover 174 (see FIG. 21B) defines an inlet tube 178 and an inlet chamber 182. A separator membrane 186 is positioned across the inlet chamber 182 and allows the flow of gas (e.g., air) while limiting flow of one or more selected fluids (e.g., liquid, fuel, harmful gases, etc.) therethrough. For example, a first portion or fraction of the VOC vapor present at the inlet chamber 182 may be blocked from entering the adsorption media 38 by the separator membrane 186. A porous member 104 is positioned above the inlet opening 94 to retain adsorption media 38. The valve arrangement is provided at the outlet opening 128. The porous member 124 is positioned at the exit 116 upstream of the valve member 102.

Figure 22A:
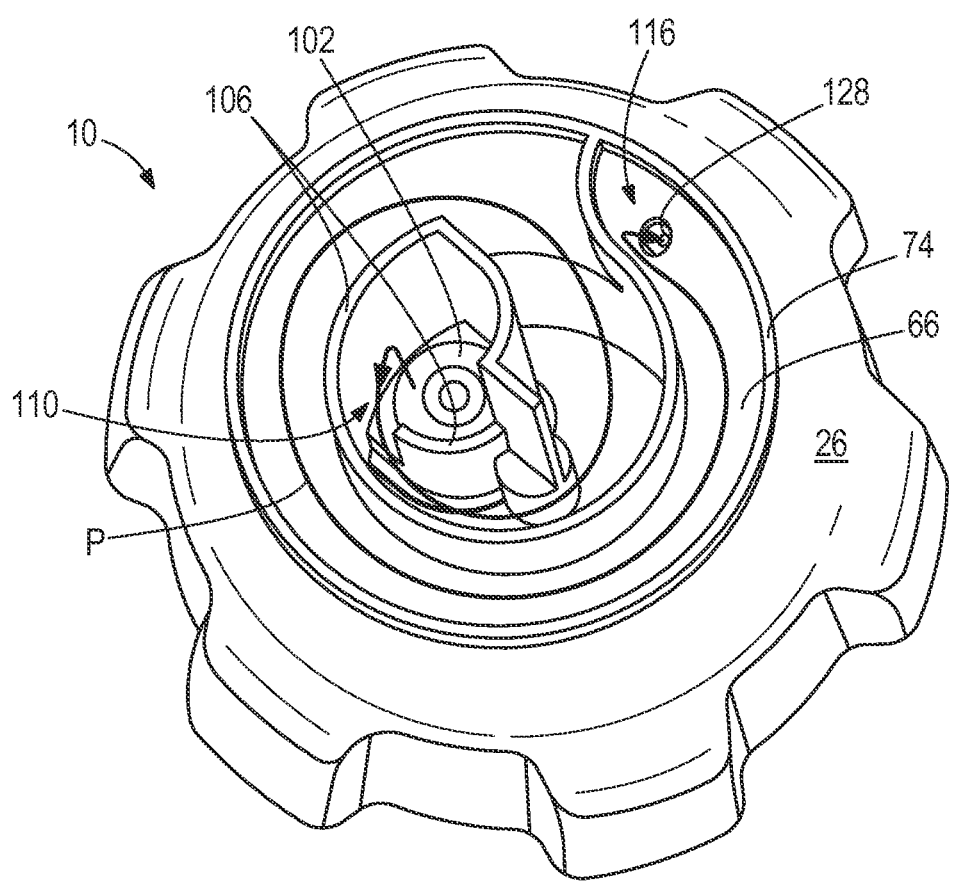
FIGS. 22A-H are views of yet another alternative construction of a cap.
Figure 22B:
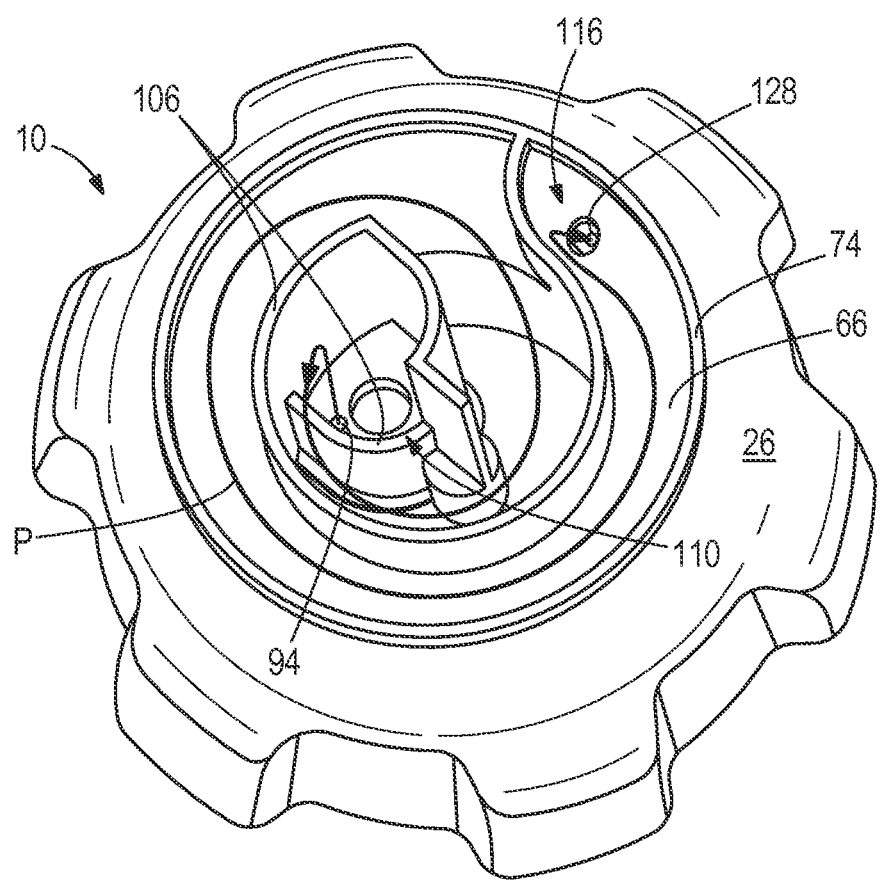
Figure 22C:
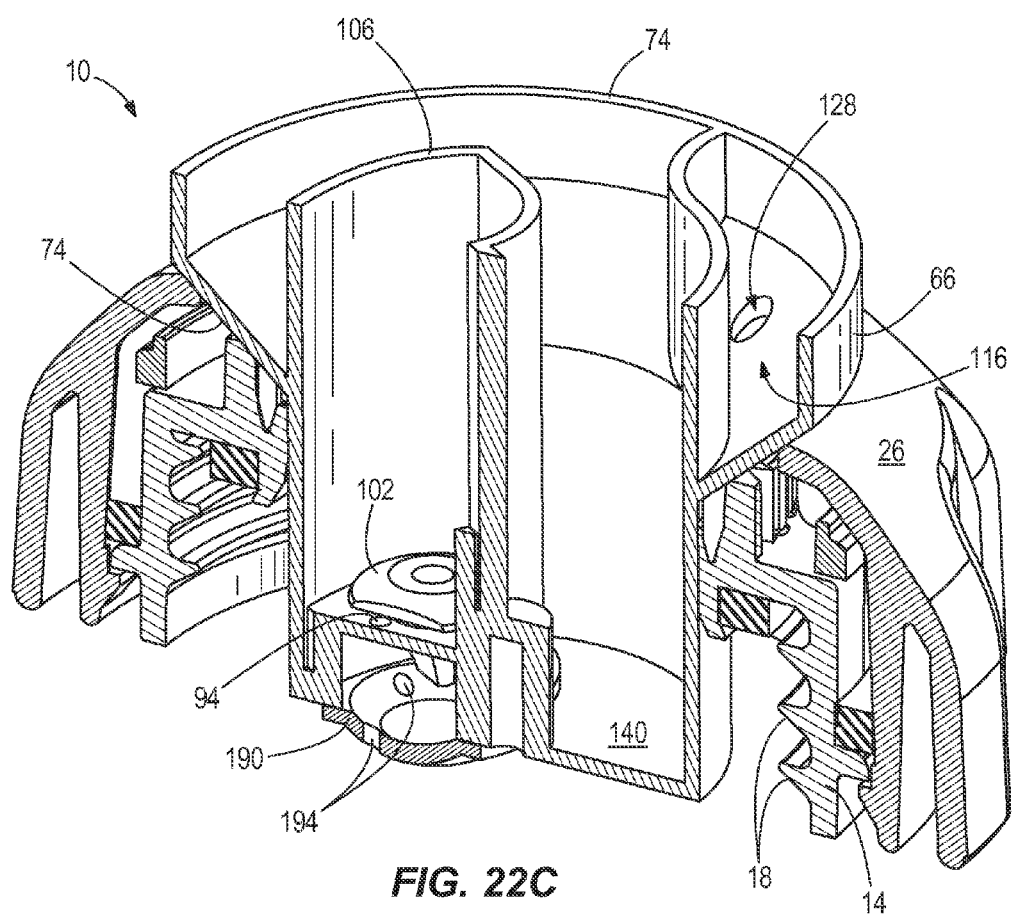
Figure 22D:
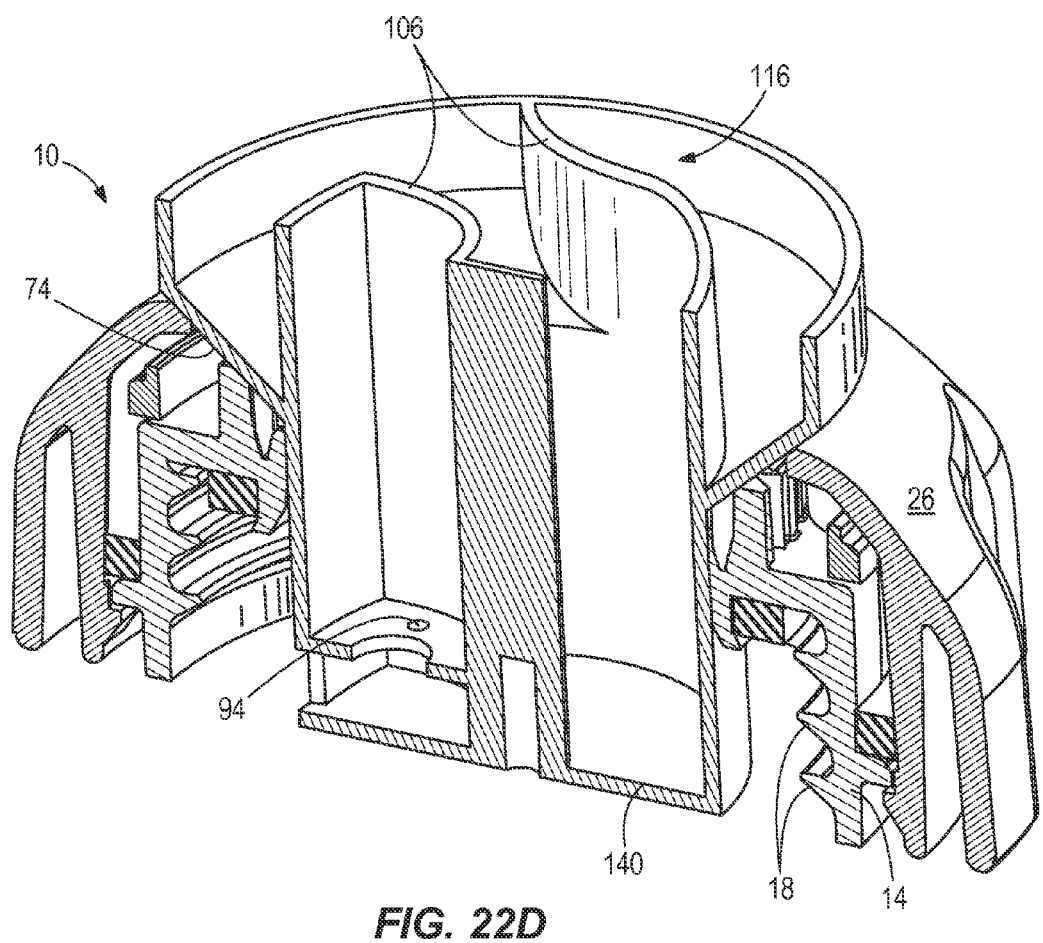
Figure 22E:
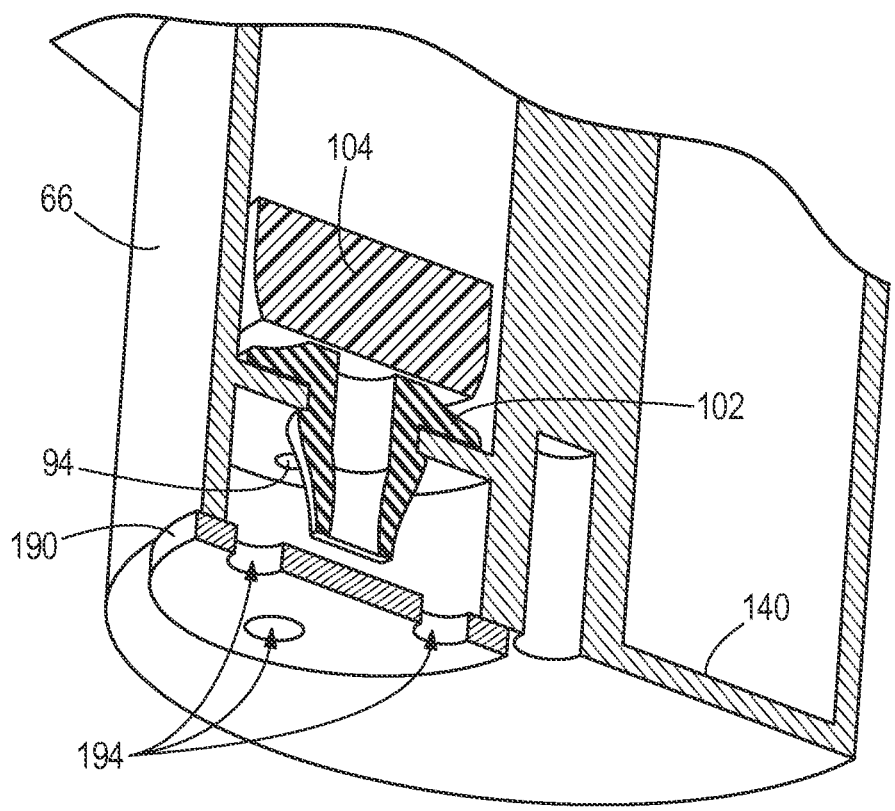
Figure 22F:
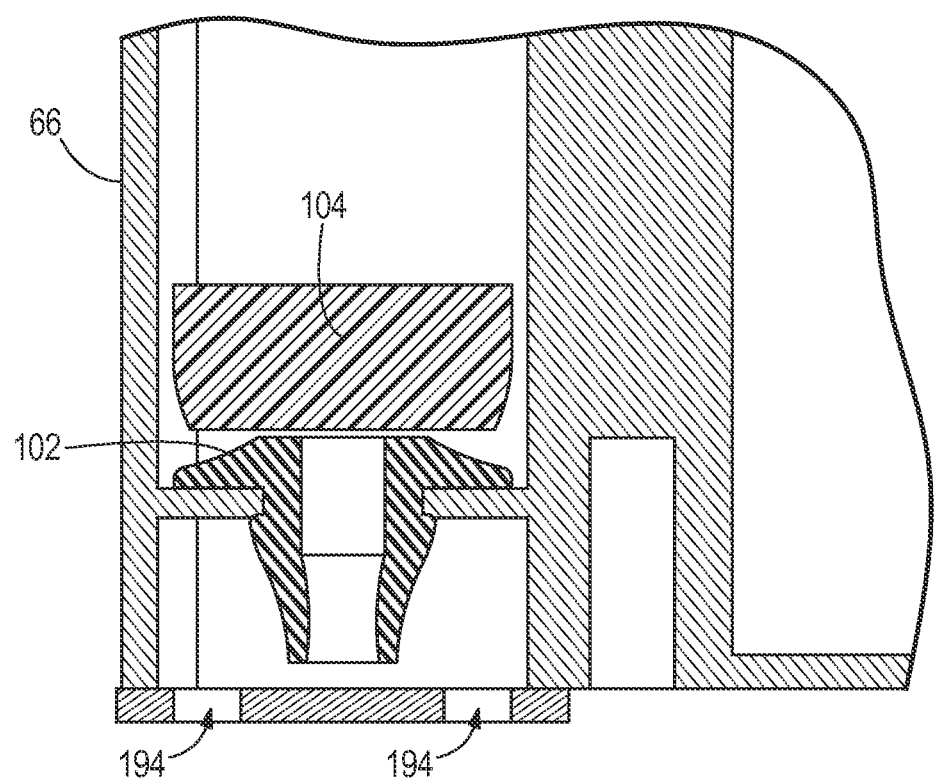
Figure 22G:
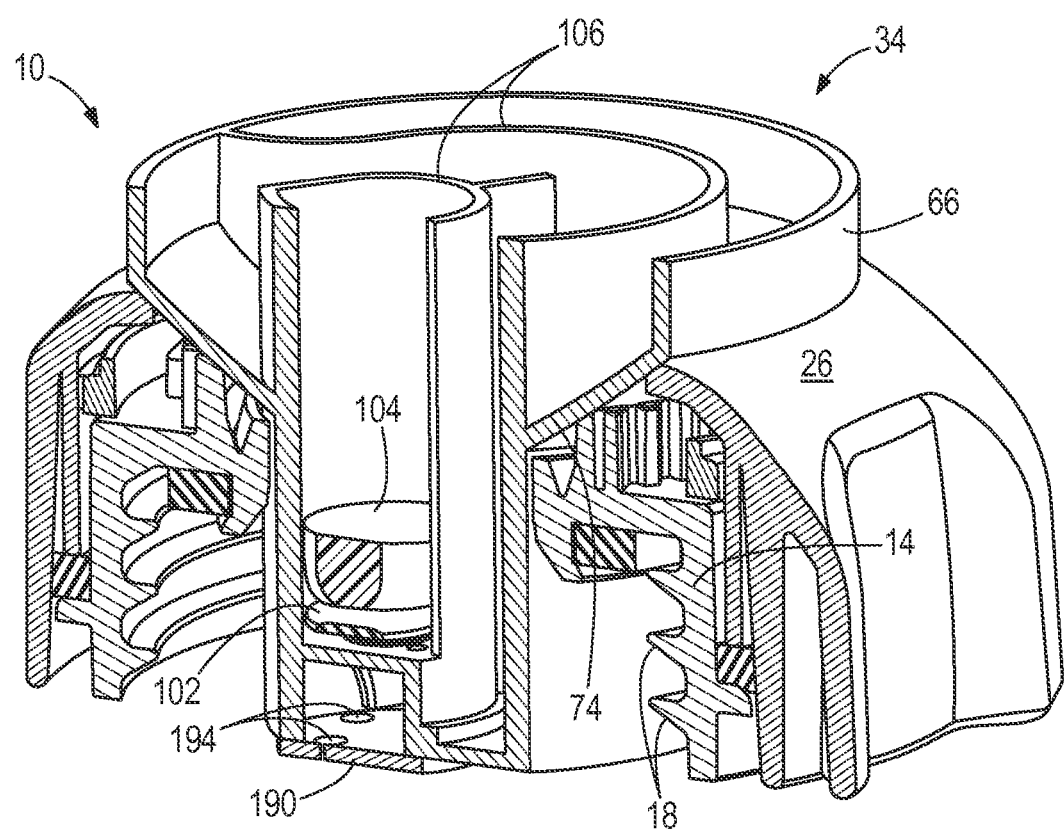
Figure 22H:
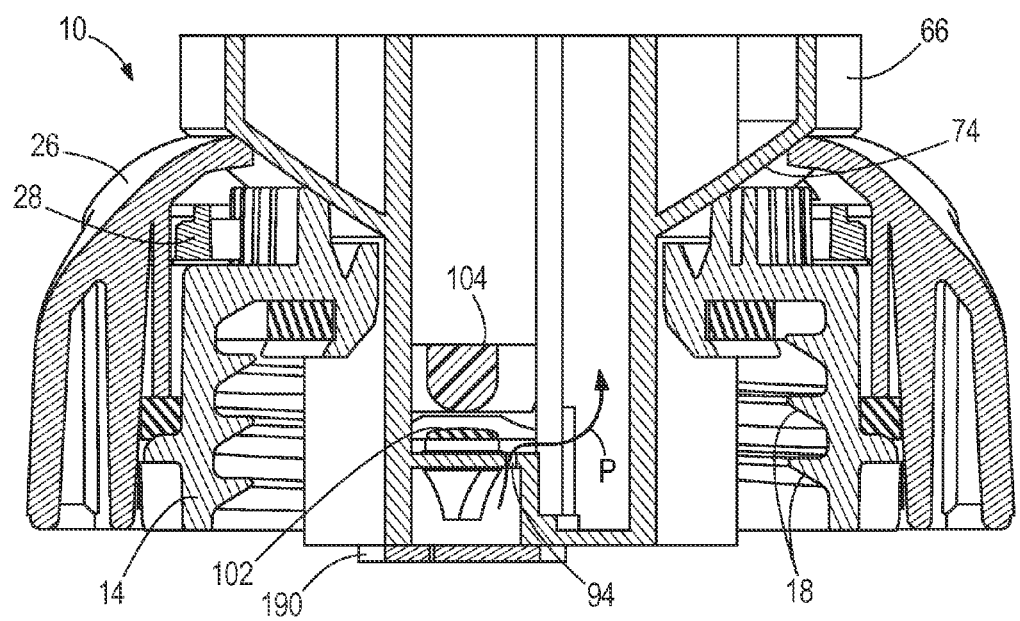

FIGS. 22A-H illustrate yet another alternative construction of a cap 10. In the illustrated construction, the valve member and the inlet opening 94 are spaced from the axis A shared by the cap 10 and the canister portion 66. As shown in FIGS. 22A-B, a portion of the interior wall 106 around the inlet opening 94 is removed so that air passing through the valve member 102 can flow laterally into the adsorption media 38 and does not need to rise over a wall. A cover plate 190 (see FIGS. 22C and 22E-H) with one or a plurality of inlet holes 194 is positioned upstream of the inlet opening 94 (toward the container interior side). In FIG. 22C, the cover plate 190 has a curved portion while in FIGS. 22E-H, the cover plate 190 is substantially flat.

As shown in FIGS. 22A-B, the interior wall 106 spirals around the inlet opening 94 and defines a path P extending at least 450 degrees (e.g., about 540 degrees) around the axis A. Also, the outer wall 74 has a countersink shape with an angled upper portion, and the outlet opening 128 extends through the angled wall.

FIGS. 23A-D illustrate an alternative construction of a cap 10. In the illustrated construction, the canister portion 66 defines a passage 166 projecting from the bottom wall 140, and the inlet opening 94 is positioned at the remote end of the passage 166 to inhibit contact with liquid fuel in the container C. The passage 166 has a diameter substantially smaller than a diameter of the valve member 102. The valve member 102 is positioned at or above (toward the exterior side, away from the container C) the midway axial point of the canister portion 66.

A plurality of walls 198 (e.g., four walls 198 in the illustrated construction) are positioned in the path P such that the walls 198 divide the volume of the canister assembly 34 into a corresponding number of chambers 202. In the illustrated construction, the walls 198 and chambers define substantially equal quarters (i.e., 90 degree sections). An opening 206 is provided through (or around) each wall 198 in an alternating configuration (lower end, upper end, etc.) from the entry 110 to the exit 116. The walls 198 thus also direct the flow back and forth axially, or "up and down", to provide a more tortuous path P and to extend the distance air with VOC vapor emissions travels through the adsorption media 38 (e.g., maximize the length/diameter (L/D) ratio of venting through the adsorption material 38).

In the illustrated construction, one or more of the walls 198 are formed integrally with the canister portion 66, and the remaining walls 198 are formed separately from and are connected to the canister portion 66. In the illustrated construction, the separate walls 198 are formed as a unit 210 that further includes a portion surrounding the inlet opening 94 and providing the interior wall 106 and the entry 110 to the circuitous portion of the path P. The passage 166 and the inlet opening 94 are generally centrally located along the axis A in the illustrated construction, and the walls 198 extend generally radially.

Figure 23A:
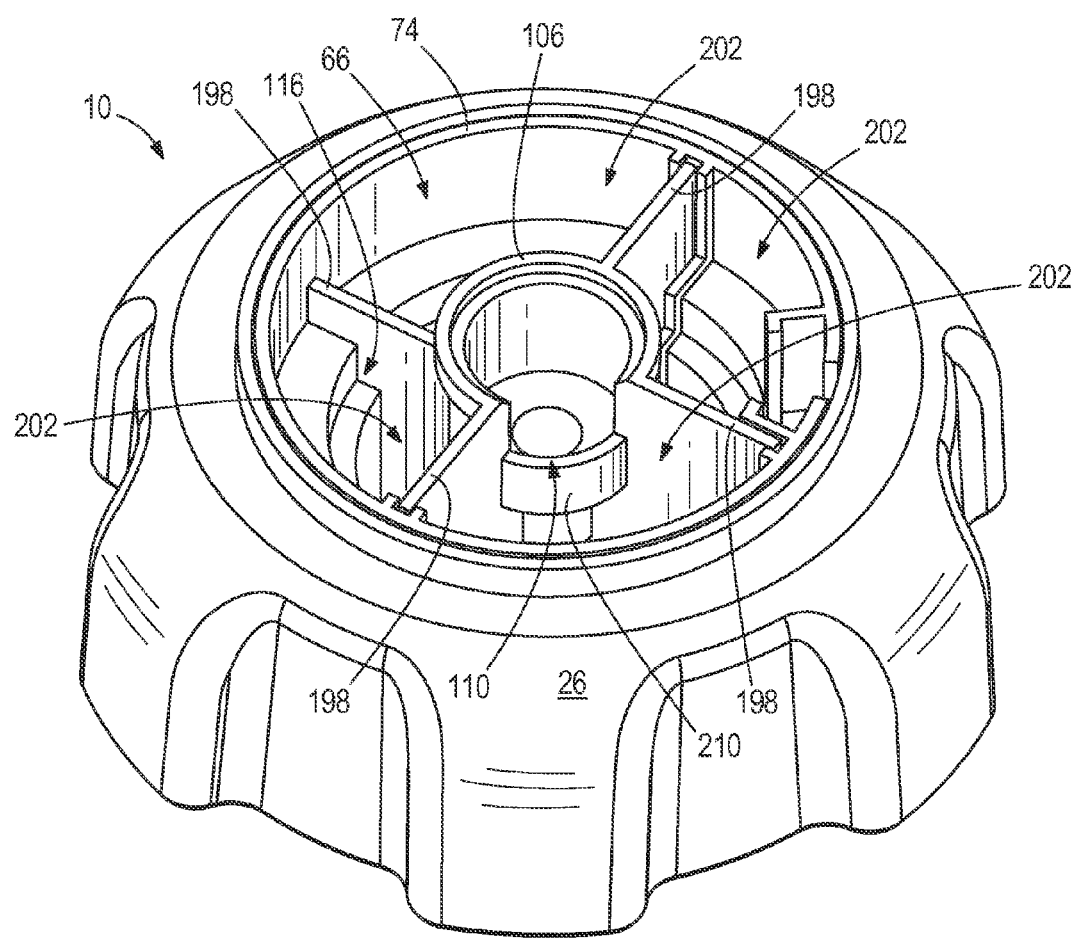
FIGS. 23A-D are views of an alternative construction of a cap.
Figure 23B:
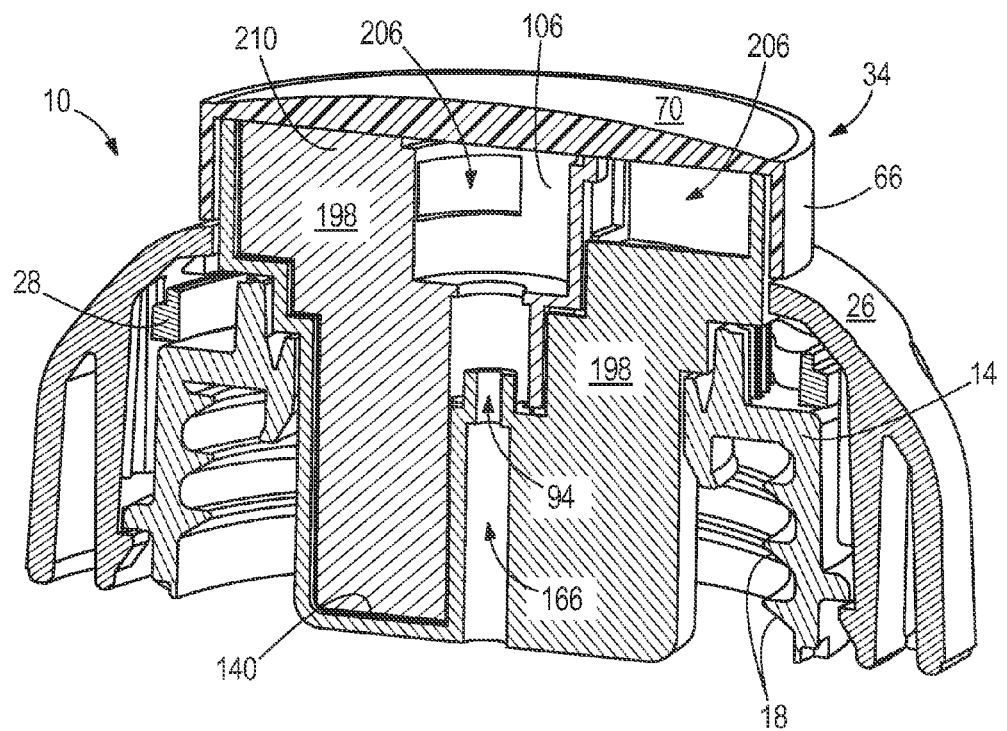
Figure 23C:
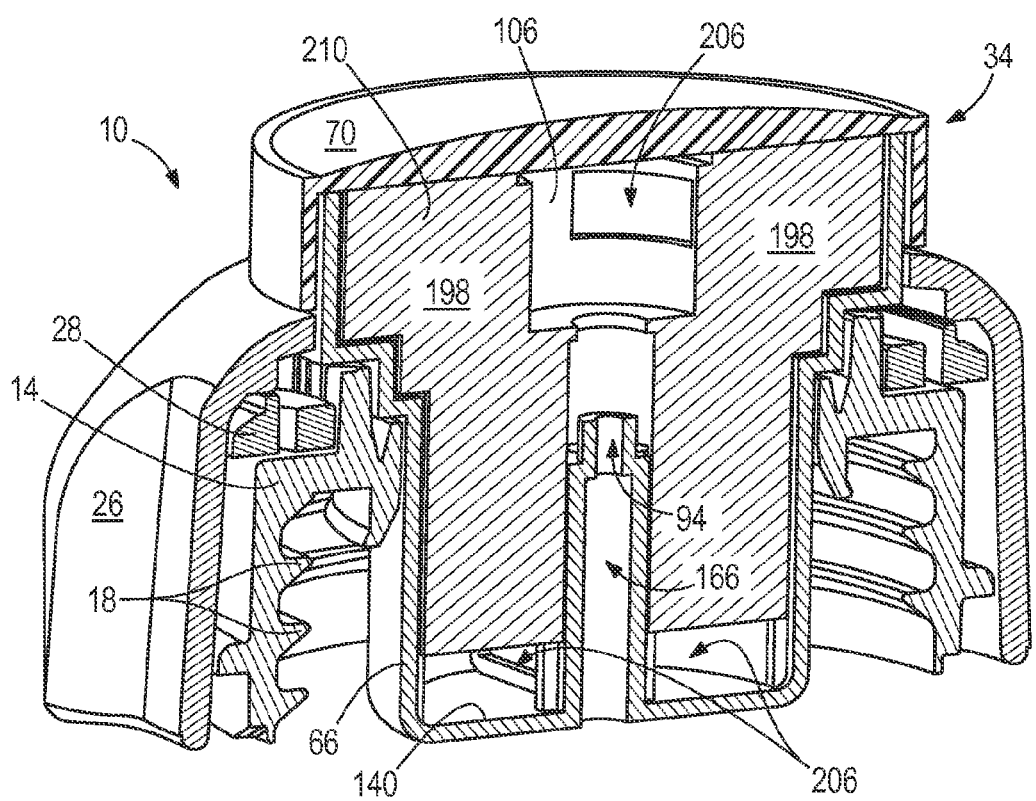
Figure 23D:
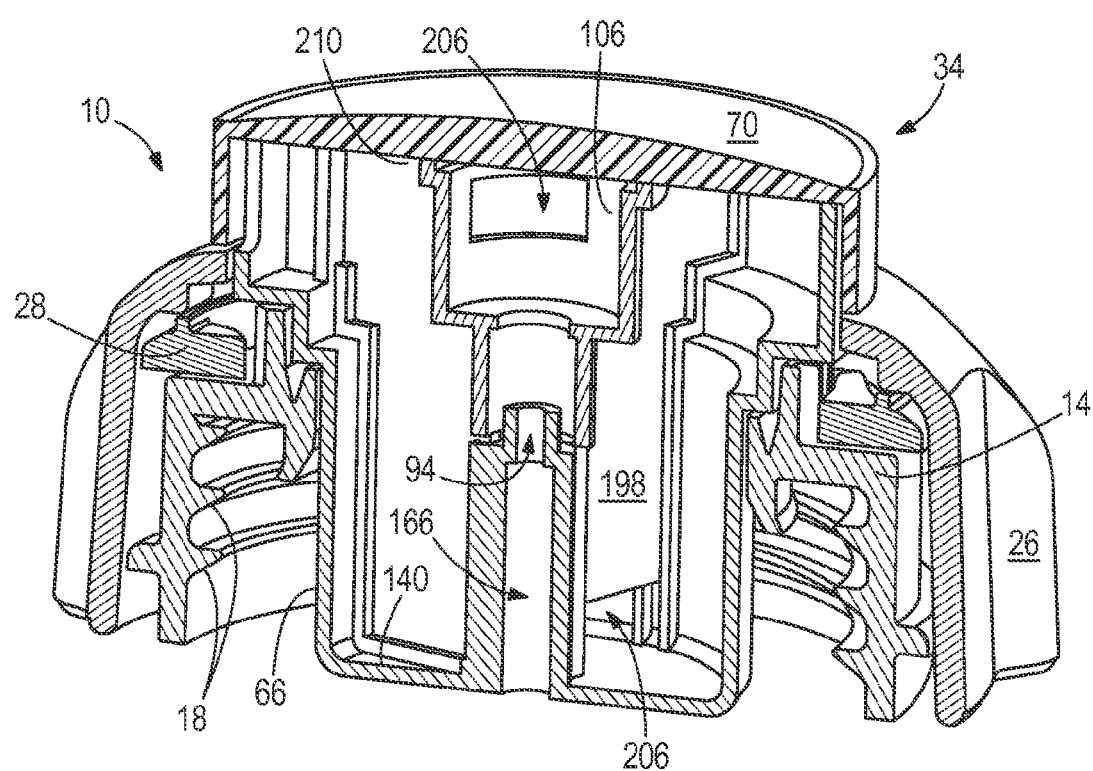
Figure 24A:
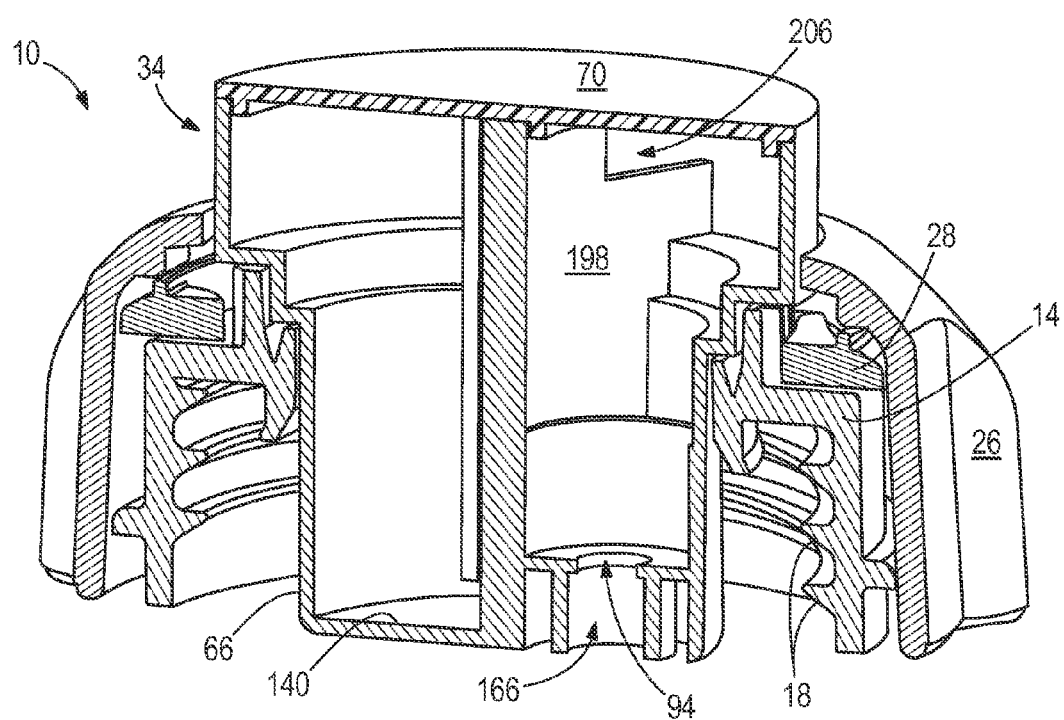
FIGS. 24A-D are views of an alternative to the cap shown in FIGS. 23A-D.
Figure 24B:
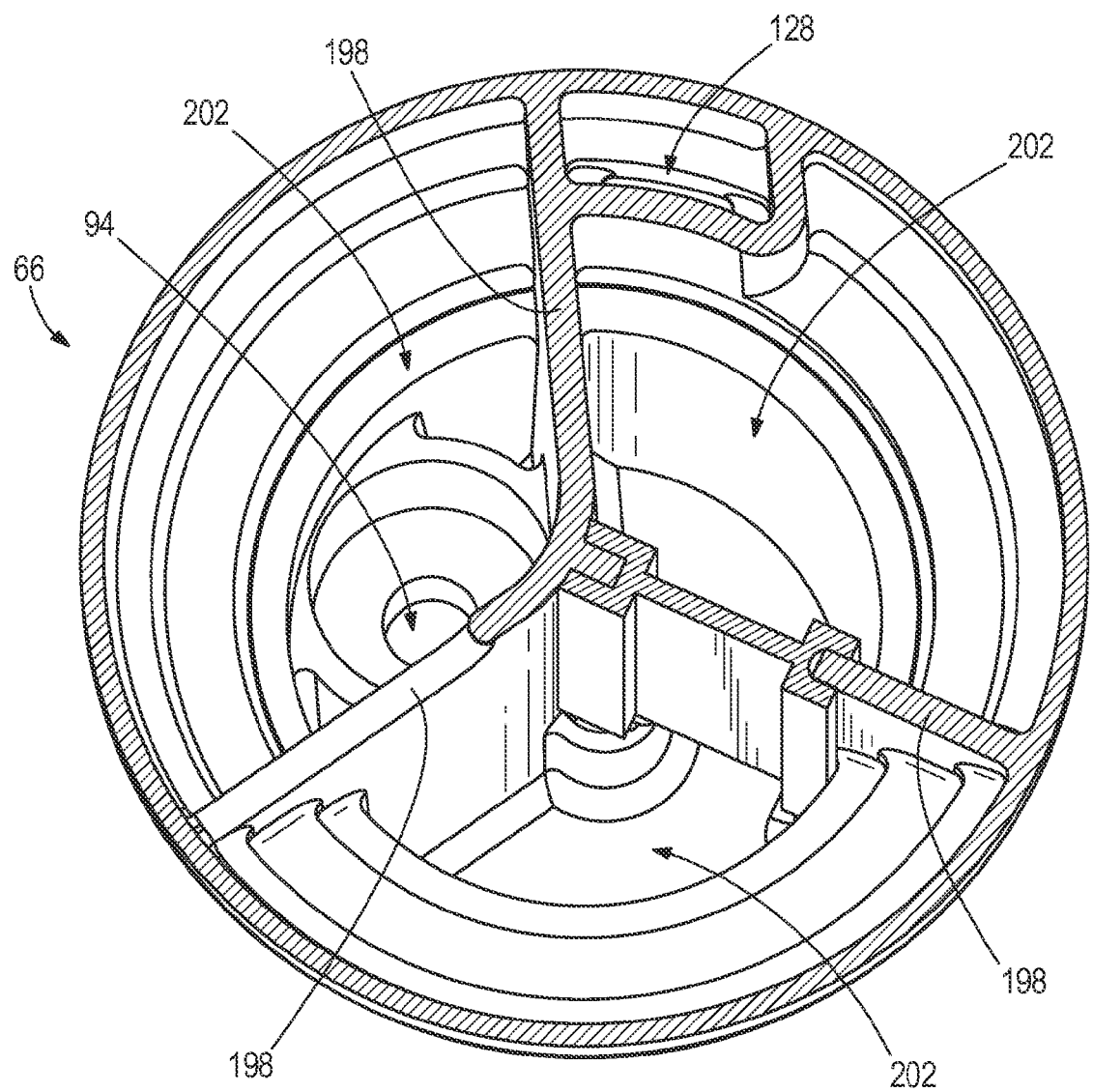
Figure 24C:
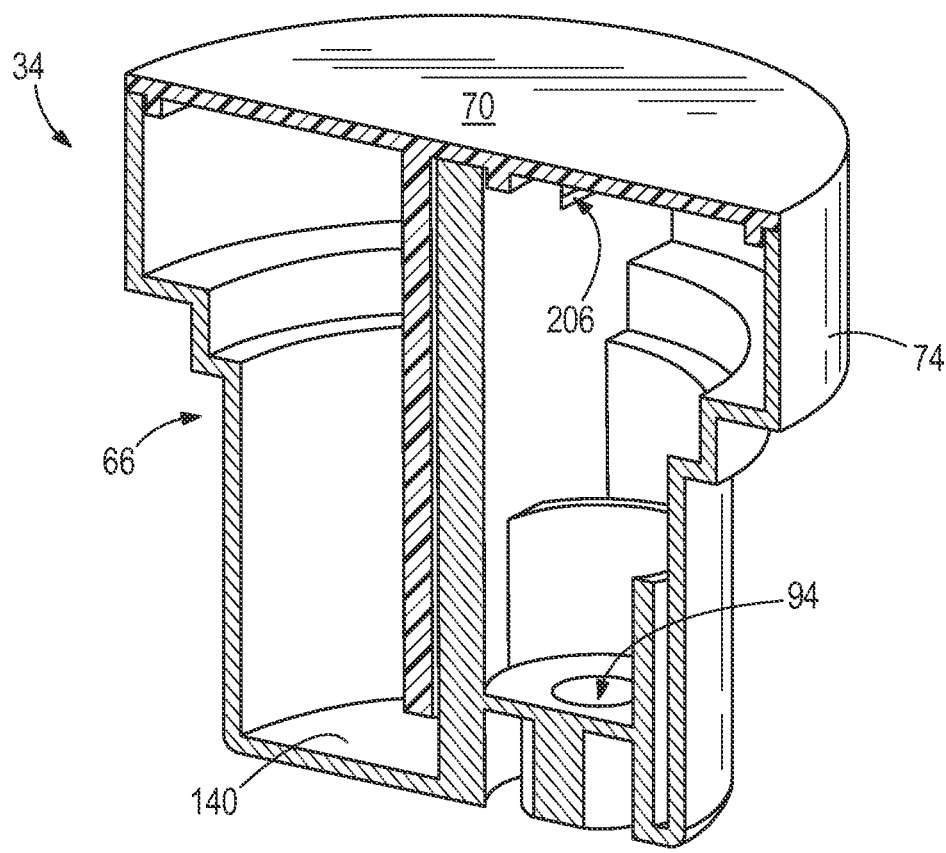
Figure 24D:
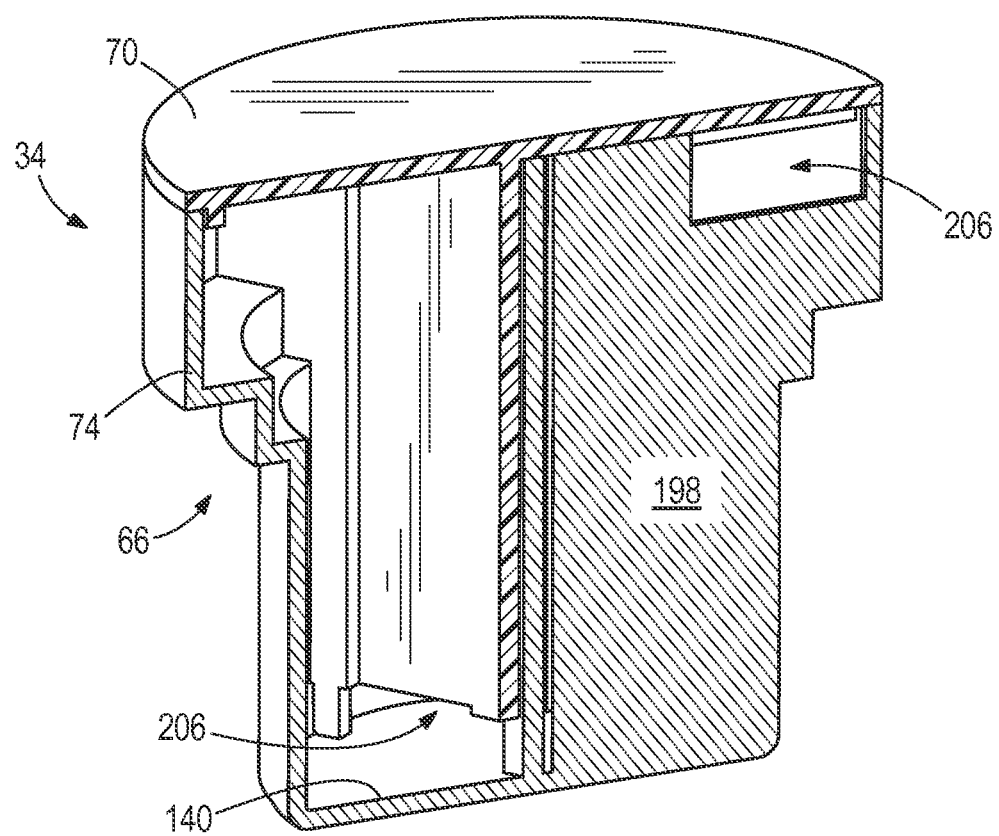

FIGS. 24A-D illustrate an alternative to the cap 10 shown in FIGS. 23A-D. In FIGS. 23A-C, the passage 166 is shortened to lower the inlet opening 94 and the valve member 102 toward the interior end, which may improve manufacturing and/or assembly (easier molding, fewer parts, easier assembly, etc.). The passage 166 and the inlet opening 94 are positioned off-center, spaced from the axis A. Also, three walls 198 with alternating openings 206 are provided in the path P. Also, as shown in FIG. 24B, the outlet opening 128 is oriented to discharge scrubbed vapors downwardly, parallel to the axis, through the outer wall 74.

Figure 25A:
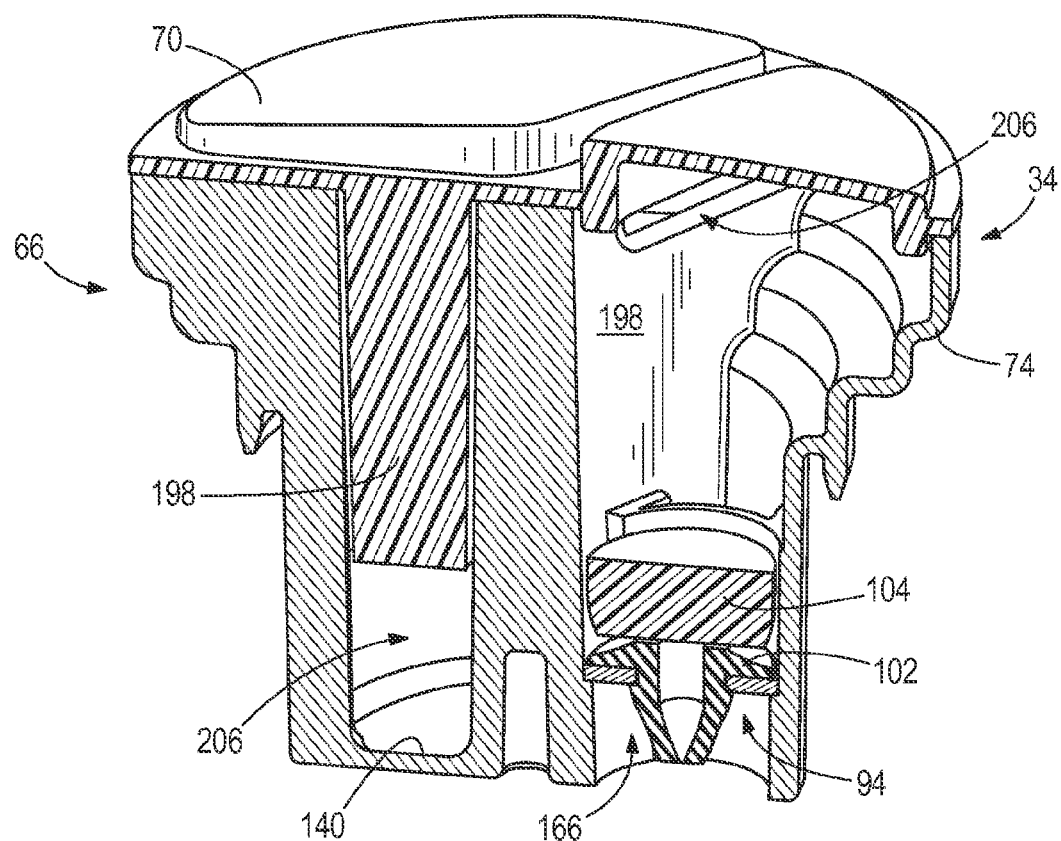
FIGS. 25A-D are views of another alternative to the cap shown in FIGS. 23A-D.
Figure 25B:
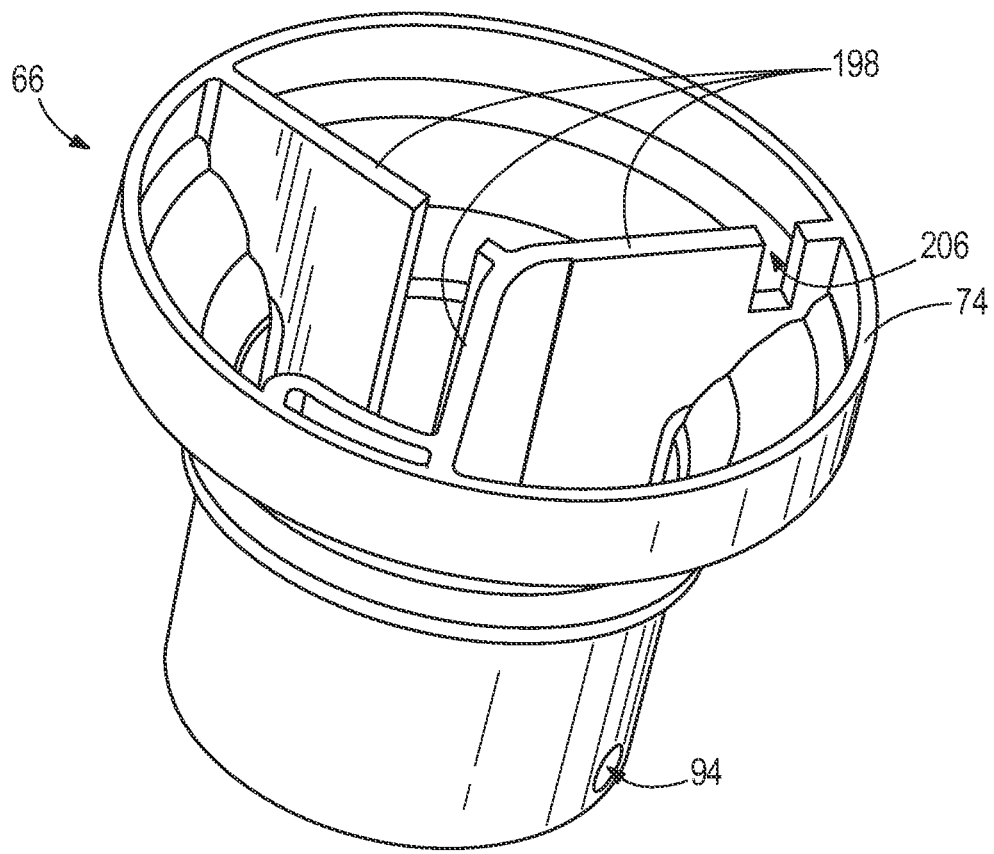
Figure 25C:
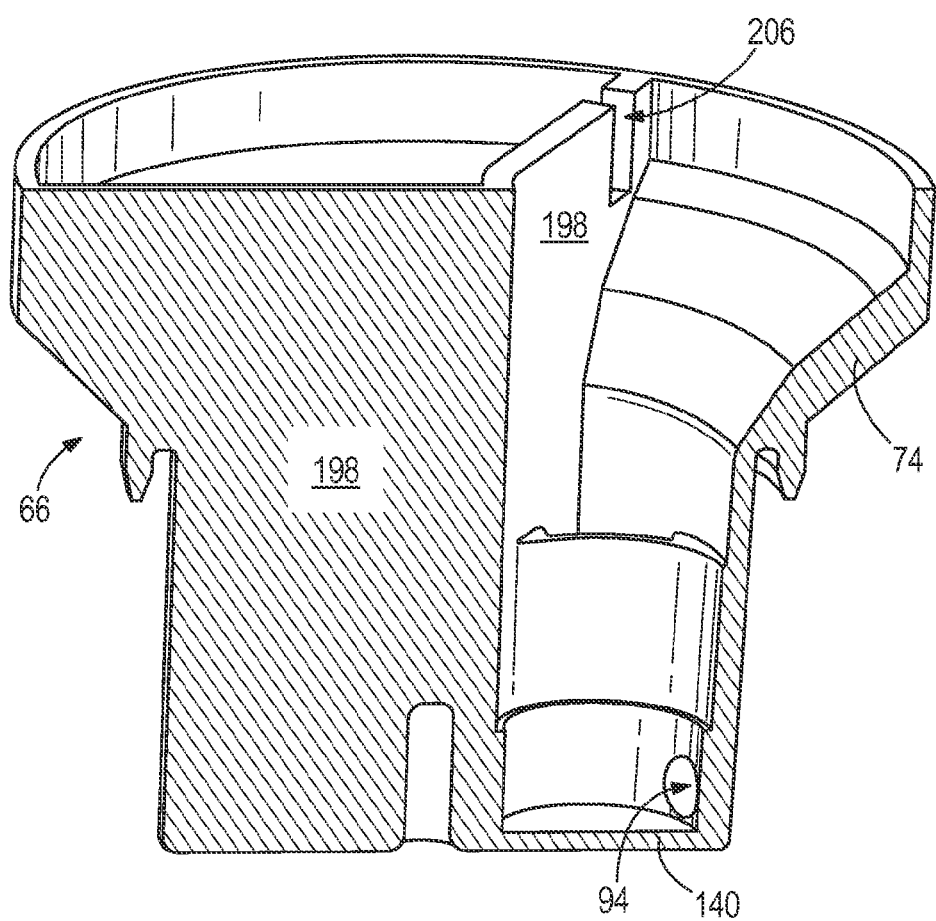
Figure 25D:
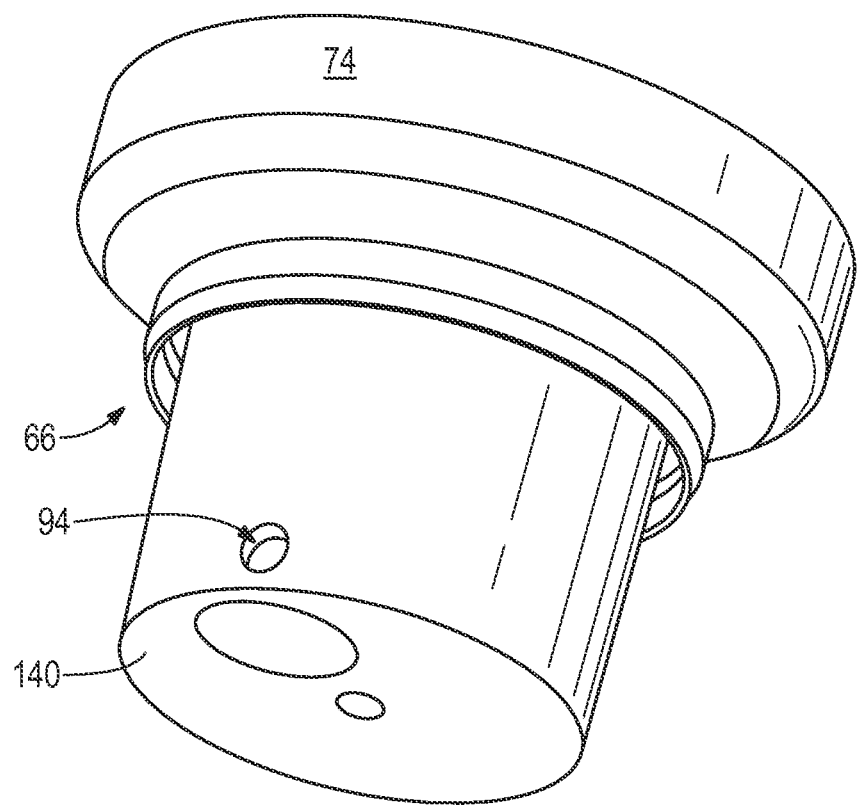

FIGS. 25A-D illustrate another alternative to the cap 10 shown in FIGS. 23A-D. As shown in FIG. 25A, a wall 198 depends from the cover portion 70, and cooperates with the walls 198 of the canister portion 66 to define the circuitous path P. In addition to the openings 206 defined by the canister portion 66 and its walls, an opening 206 is defined at the bottom end of the wall 198 of the cover portion. As shown in FIGS. 25B-D, the inlet opening 94 is oriented to receive vapors from the container C, perpendicular to the axis, through a side of the outer wall 74. Also, the canister portion 66 has a "countersink" shape rather than a stepped cylinder shape.

Figure 26A:
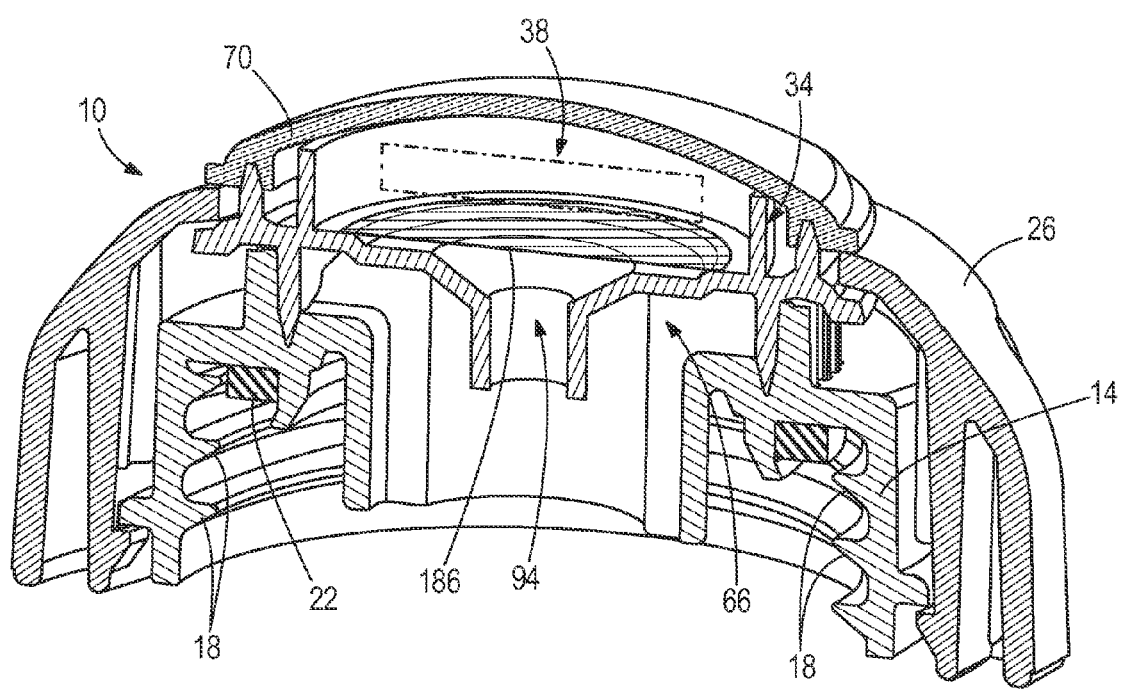
FIGS. 26A-D are views of another alternative construction of a cap.
Figure 26B:
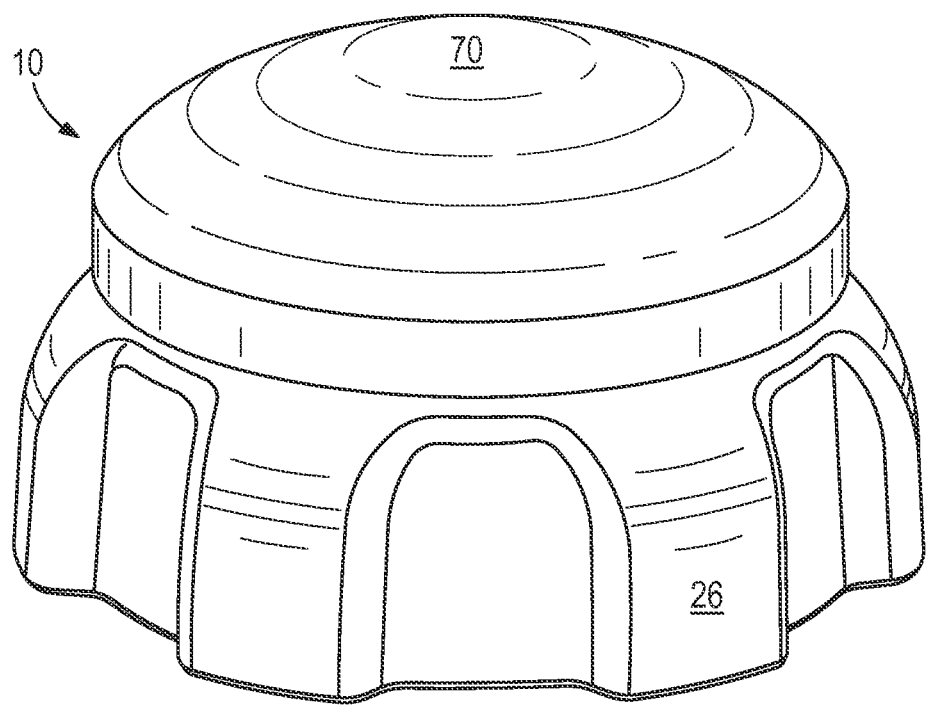
Figure 26C:
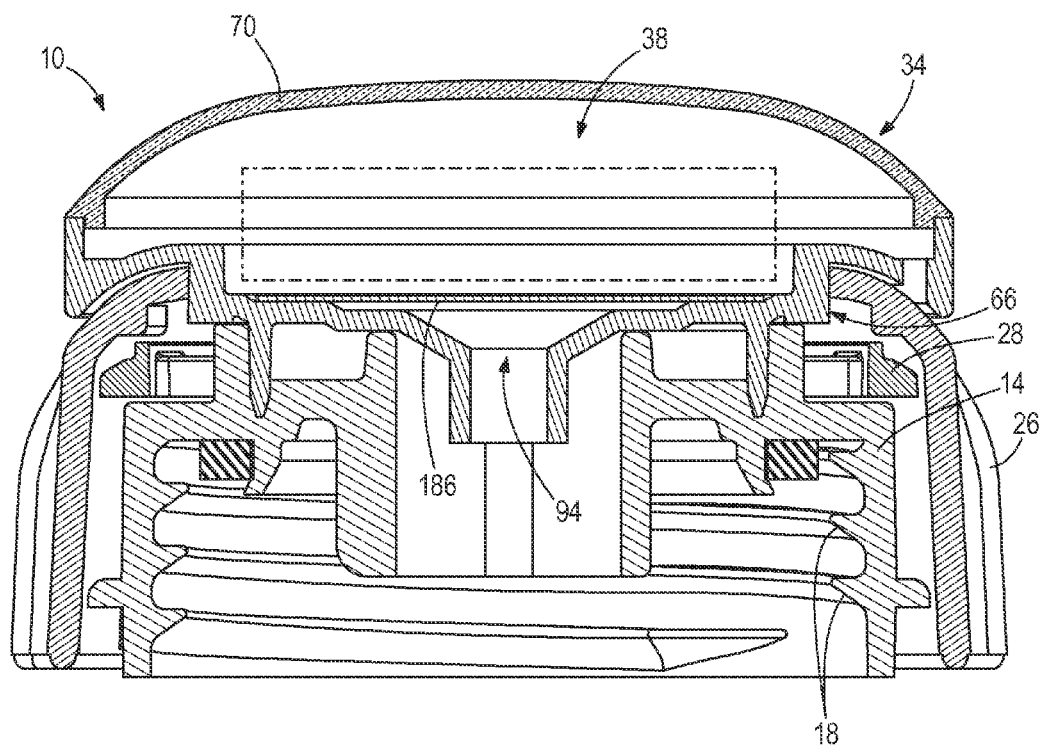
Figure 26D:
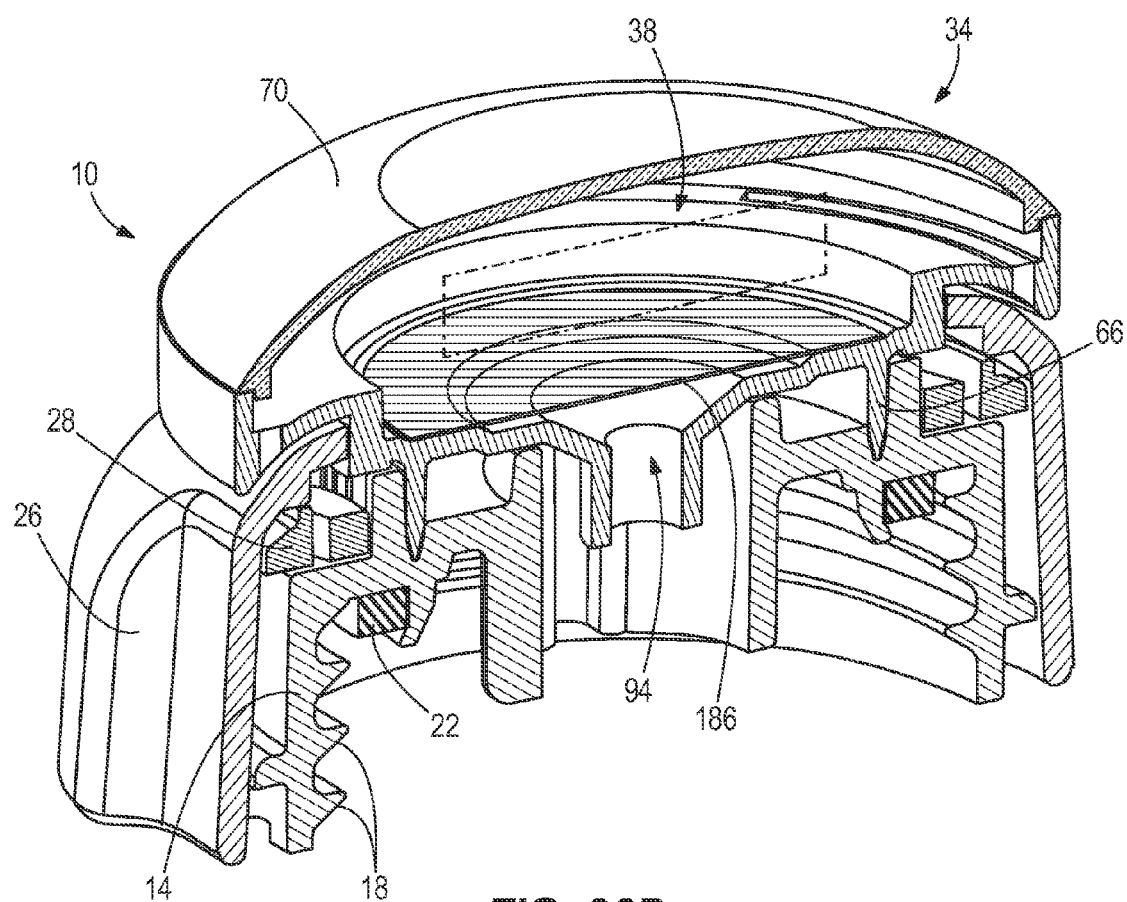

FIGS. 26A-D illustrate another alternative construction of a cap 10. In the illustrated construction, the cap 10 includes a separator membrane 186 positioned above the inlet opening 94, and adsorption media 38 substantially fills the remainder of the canister assembly 34. The canister assembly 34 shown in FIGS. 26B-D provides a larger volume than that shown in FIG. 26A. In FIG. 26A, the cover member 70 may be provided by a crystal which is common to other caps (not shown) which do not include adsorption media.

As shown in FIGS. 26A and 26C-D, a large surface area of the membrane 186 is exposed to air with VOC vapor emissions exiting the container C. The membrane 186 allows the flow of gas (e.g., air) but limits flow of one or more selected fluids (e.g., liquid, fuel, harmful gases, etc.) therethrough. The membrane 186 may provide an oleophobic and/or hydrophobic filter and may be similar to that described and illustrated in U.S. Pat. No. 6,579,342 issued Jan. 17, 2003, or in U.S. Patent Application Publication No. US 2007/1075514 A1, published on Aug. 2, 2007, the entire contents of both of which are hereby incorporated by reference. With the membrane 186, liquid fuel is inhibited or prevented from contacting and saturating any portion of the adsorption media 38. Also, a smaller amount of adsorption media 38 may be necessary. A majority or the entirety of the adsorption media 38 may be positioned axially beyond the outer cover 26, or "above" the outer cover 26, at the exterior end of the cap 10.

One or more independent features or advantages of the invention are set forth in the claims.

What is claimed is:

1. A fuel cap configured to be coupled with the opening of a fuel tank, the fuel tank defining an interior for containing a volume of fuel, the fuel cap comprising:
    an inlet opening configured to establish fluid communication with the fuel tank interior;
    an exit in communication with atmosphere, exterior to the fuel cap;
    an interior wall having a curved, radially outward facing surface that defines at least a portion of a flow path between the inlet opening and the exit, the flow path extending spirally about an axis of the fuel cap from the inlet opening to the exit; and
    adsorption media substantially filling the flow path and configured to reduce the emission of VOC vapors through the exit to the surrounding atmosphere;
    wherein the curved radially outward facing surface of the internal wall and the flow path extend spirally about the axis for at least 300 degrees.

2. The fuel cap of claim 1, wherein the inlet opening is positioned closer to the axis than the exit.

3. The fuel cap of claim 1, wherein the cap defines an interior end and an exterior end, with an upward direction being defined from the interior end toward the exterior end, and wherein the flow path extends spirally upward from the inlet opening toward the exit, wherein the adsorption media is located between the inlet opening and the exit in the upward direction.

4. The fuel cap of claim 1, wherein the flow path extends spirally about the axis for at least 540 degrees.

5. The fuel cap of claim 1, wherein the flow path defines the only path through the fuel cap from the inlet opening to the exit.

6. The fuel cap of claim 1, wherein the exit is formed in a side wall of the cap to direct VOC vapors to exit the flow path in a direction substantially transverse to the axis.

7. The fuel cap of claim 1, wherein the interior wall is a continuous interior wall extending about the axis and extending in a vertical direction from a first end defining an entry to the spirally extending flow path to a second end defining the exit, such that the continuous interior wall extends along substantially the entire flow path.

8. The fuel cap of claim 1, further comprising:
    a body portion having threads formed thereon for attachment to the fuel tank; and
    a canister portion secured to the body portion, the inlet opening, the exit, the flow path, and the adsorption media being provided in the canister portion, wherein the inlet opening is located below the threads.

9. The fuel cap of claim 8, further comprising:
    a first porous member positioned in the canister portion adjacent the inlet opening; and
    a second porous member positioned in the canister portion adjacent the exit to retain the adsorption media.

10. The fuel cap of claim 8, further comprising a deflector coupled to the canister portion adjacent the inlet opening to cover at least a portion of the inlet opening.

11. A fuel cap configured to be coupled with the opening of a fuel tank, the fuel tank defining an interior for containing a volume of fuel, the fuel cap comprising:
    a body connectable to the fuel tank and defining an axis;
    a canister assembly supported by the body;
    adsorption media housed in the canister assembly, the canister assembly defining not more than one predetermined flow path through the adsorption media from an inlet opening in communication with the fuel tank interior to an exit in communication with a surrounding atmosphere, exterior to the fuel cap, wherein the adsorption media is located between the inlet opening and the exit in a direction along the axis; and
    an interior wall having a curved, radially outward facing surface that defines at least a portion of the flow path, wherein the flow path extends about the axis from the inlet opening to the exit, wherein the curved radially outward facing surface and the flow path extend at least 320 degrees about the axis.

12. The fuel cap of claim 11, wherein the flow path extends in a singular direction about the axis from the inlet opening to the exit.

13. The fuel cap of claim 11, wherein the flow path includes at least one reversal of direction from the inlet opening to the exit.

14. The fuel cap of claim 11, wherein the inlet opening is positioned closer to the axis than the exit such that the flow path extends outwardly in the radial direction from the inlet opening to the exit.

15. The fuel cap of claim 11, wherein the flow path extends at least 360 degrees about the axis.

16. The fuel cap of claim 11, wherein the flow path extends at least 540 degrees about the axis.

17. The fuel cap of claim 11, wherein the interior wall is a continuous interior wall extending around the axis from a first end defining an entry to the flow path to a second end defining the exit, such that the interior wall extends along substantially the entire flow path, wherein the first end is located below the second end.

18. The fuel cap of claim 17, wherein the continuous interior wall extends at least 320 degrees about the axis.

19. The fuel cap of claim 11, wherein the cap defines an interior end and an exterior end, with an upward direction being defined from the interior end toward the exterior end, and wherein the flow path extends upward from the inlet opening through the adsorption media in the upward direction toward the exit.

20. The fuel cap of claim 11, further comprising a deflector coupled to the canister portion adjacent the inlet opening to cover at least a portion of the inlet opening.

21. The fuel cap of claim 11, wherein the exit is formed in a side wall of the cap to direct VOC vapors to exit the flow path in a direction substantially transverse to the axis.

22. A fuel cap configured to be coupled with the opening of a fuel tank, the fuel tank defining an interior for containing a volume of fuel, the fuel cap comprising:
- a body connectable to the fuel tank and defining an axis;
- a canister assembly supported by the body; and
- adsorption media housed in the canister assembly, the canister assembly defining a flow path through the adsorption media from an inlet opening in communication with the fuel tank interior to an exit in communication with a surrounding atmosphere, exterior to the fuel cap, the flow path including an initial portion extending from the inlet opening generally along the axis, an entry defined by a continuous interior wall, and a spiral portion defined by a curved portion of the interior wall having a curved radially outward facing surface, the spiral portion in communication with the initial portion via the entry and configured to direct a flow of vapors at least 300 degrees about the axis, wherein the curved radially outward facing surface of the internal wall and the flow path extend spirally about the axis for at least 300 degrees.

23. A fuel cap configured to be coupled with the opening of a fuel tank, the fuel tank defining an interior for containing a volume of fuel, the fuel cap comprising:
- an inlet opening configured to establish fluid communication with the fuel tank interior;
- an exit in communication with atmosphere, exterior to the fuel cap;
- an interior wall having a curved, radially outward facing surface that defines at least a portion of a flow path between the inlet opening and the exit, the flow path extending spirally about an axis of the fuel cap from the inlet opening to the exit; and
- adsorption media substantially filling the flow path and configured to reduce the emission of VOC vapors through the exit to the surrounding atmosphere;
- wherein the interior wall is a continuous interior wall extending about the axis and extending in a vertical direction from a first end defining an entry to the spirally extending flow path to a second end defining the exit, such that the continuous interior wall extends along substantially the entire flow path;
- wherein the curved, radially outward facing surface extends around the axis for at least 180 degrees.

* * * * *